(12) United States Patent
Kumar et al.

(10) Patent No.: US 11,530,327 B1
(45) Date of Patent: Dec. 20, 2022

(54) SALTWATER CORROSION-RESISTANT COMPOSITE COATING

(71) Applicant: KING FAHD UNIVERSITY OF PETROLEUM AND MINERALS, Dhahran (SA)

(72) Inventors: A. Madhan Kumar, Dhahran (SA); Jobin Jose, Dhahran (SA); Mohamed Abdrabou Hussein, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/744,115

(22) Filed: May 13, 2022

(51) Int. Cl.
| | |
|---|---|
| *C09D 5/08* | (2006.01) |
| *C09D 5/24* | (2006.01) |
| *C09D 7/65* | (2018.01) |
| *C09D 7/80* | (2018.01) |
| *C09D 7/40* | (2018.01) |
| *C09D 163/00* | (2006.01) |
| *C09D 7/61* | (2018.01) |

(52) U.S. Cl.
CPC ............... *C09D 5/082* (2013.01); *C09D 5/24* (2013.01); *C09D 7/61* (2018.01); *C09D 7/65* (2018.01); *C09D 7/67* (2018.01); *C09D 7/70* (2018.01); *C09D 7/80* (2018.01); *C09D 163/00* (2013.01)

(58) Field of Classification Search
CPC .......... C09D 5/08; C09D 5/082; C09D 5/084; C09D 50/86; C09D 5/088; C09D 5/002; C09D 5/038; C09D 5/24; C09D 5/086; C08K 3/042; C08K 3/04; C08K 3/041; C08K 3/043; C08K 3/044; C08K 3/045; C08K 3/046; C08L 5/08
See application file for complete search history.

(56) References Cited

FOREIGN PATENT DOCUMENTS

| | | | | |
|---|---|---|---|---|
| CN | 106752764 A | 5/2017 | | |
| CN | 108912785 A | * 11/2018 | ........... | C09D 133/00 |
| CN | 109181469 A | * 1/2019 | ........... | C09D 163/00 |
| CN | 110305565 A | 10/2019 | | |
| CN | 112608601 A | * 4/2021 | | |
| CN | 109346725 B | 8/2021 | | |
| CN | 113429784 A | 9/2021 | | |
| CN | 113683956 A | 11/2021 | | |

OTHER PUBLICATIONS

Machine translation of CN109181469A, published Jan. 2019, Powered by EPO and Google. (Year: 2019).*

Machine translation of CN112608601A, published Apr. 2021, Powered by EPO and Google. (Year: 2021).*

(Continued)

*Primary Examiner* — Monique R Jackson

(74) *Attorney, Agent, or Firm* — Oblon, McClelland, Maier & Neustadt, L.L.P.

(57) ABSTRACT

A saltwater corrosion resistant composite coating is described. The coating includes at least one conductive polymer, chitosan, reduced graphene oxide (rGO), and a cured epoxy. The rGO and chitosan are dispersed in particles of the conductive polymer to form a 3D network. At least a portion of the chitosan is covalently bound to the rGO. At least a portion of the conductive polymer is covalently bound to the chitosan, and the 3D network is dispersed in the cured epoxy.

20 Claims, 30 Drawing Sheets

(56) References Cited

OTHER PUBLICATIONS

Machine translation of CN108912785A, published Nov. 2018, Powered by EPO and Google. (Year: 2018).*

A. Madhan Kumar, et al., "Novel polyaniline/chitosan/reduced graphene oxide ternary nanocomposites: Feasible reinforcement in epoxy coatings on mild steel for corrosion protection", Progress in Organic Coatings, vol. 163, Feb. 2022, pp. 1-16.

Bahram Ramezanzadeh, et al., "Polyaniline-cerium oxide (PAni-$CeO_2$) coated graphene oxide for enhancement of epoxy coating corrosion protection performance on mild steel", Corrosion Science, vol. 137, Jun. 2018, pp. 111-126.

Eman M. Fayyad, et al., "Oleic acid-grafted chitosan/graphene oxide composite coating for corrosion protection of carbon steel", Carbohydrate Polymers, vol. 151, Oct. 20, 2016, pp. 871-878.

* cited by examiner

SALTWATER CORROSION-RESISTANT COMPOSITE COATING

STATEMENT OF PRIOR DISCLOSURE BY INVENTOR

Aspects of the present disclosure are described in A. M. Kumar, J. Jose., M. A. Hussein.; "Novel polyaniline/chitosan/reduced graphene oxide ternary nanocomposites: Feasible reinforcement in epoxy coatings on mild steel for corrosion protection"; Progress in Organic Coatings; 163: 106678. incorporated herein by reference in its entirety.

BACKGROUND

Technical Field

The present disclosure is directed to a corrosion-resistant composite, and particularly to a saltwater corrosion-resistant composite coating, and a method of preparing the saltwater corrosion-resistant composite coating.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Metals and alloys such as mild steel (MS) have applications in various sectors, including marine, oil and gas, petrochemicals, chemical refineries, and automobile industries. However, the degradation of MS components when exposed to marine and industrial environmental conditions limits their practical application in such sectors.

Various corrosion inhibitors such as alkyd-based coatings, oil-based coatings using natural oils, water emulsion-based coatings, urethane-based coatings, chlorinated rubber-based coatings, vinyl-based coatings, and epoxy coatings have been developed in the past to inhibit the effects of corrosion. These polymers work by creating a barrier between a metal surface and the surrounding environment, preventing the penetration of corrosive ions through the coating to the metal surface, thereby protecting the metal from corrosion.

However, such coatings bring harm to human health and the environment. Also, most of the conventionally used corrosion-resistant coatings lack effective corrosion-resistant behaviors. Further high manufacturing cost is a significant drawback of such conventional coatings. Hence, there is a need for an efficient, long-lasting, and inexpensive corrosion-resistant coating that may overcome the aforementioned limitations.

SUMMARY

In an exemplary embodiment, a saltwater corrosion resistant composite coating is described. The coating includes at least one conductive polymer, chitosan, reduced graphene oxide (rGO) and a cured epoxy, where the rGO and chitosan are dispersed in particles of the conductive polymer to form a 3D network. At least a portion of the chitosan is covalently bound to the rGO, and at least a portion of the conductive polymer is covalently bound to the chitosan and the 3D network is dispersed in the cured epoxy.

In some embodiments, the 3D network includes 85-95 wt. % the conductive polymer, 0.5-5 wt. % the rGO, and 1-10 wt. % the chitosan, based on the total weight of the conductive polymer, rGO, and chitosan.

In some embodiments, the coating includes 1-10 wt. % the conductive polymer, rGO, and chitosan. The coating includes 90-99 wt. % the cured epoxy, based on the total weight of the conductive polymer, rGO, chitosan, and cured epoxy.

In some embodiments, the conductive polymer is at least one selected from a group consisting of a polyaniline (PANT), a polypyrrole (PPy), a polythiophene (PTh), a polyphenylene sulfide (PPS), a polyacetylene (PA), a polyphenylene vinylene (PPV), a poly(3,4-ethylenedioxythiophene) (PEDOT), a polycarbazole (PCz), a polyindole (PIn), a polyazepine, a polypyrene (PP), a polyazulene (PAz), and a polynaphthalene.

In some embodiments, the conductive polymer is polyaniline (PANT).

In some embodiments, the rGO has a nanosheet morphology. The nanosheets are 1-20 nanometers (nm) thick.

In some embodiments, the cured epoxy is a blend of at least one epoxy resin and at least one hardener. The blend includes 80-95 wt. % the epoxy resin and 5-20 wt. % the hardener, based on the total weight of the epoxy resin and the hardener.

In some embodiments, the epoxy resin is at least one selected from a group consisting of bisphenol A, and bisphenol F.

In some embodiments, the hardener is at least one selected from a group consisting of phenols, aromatic amines, aliphatic amines, and thiols.

In some embodiments, the coating includes at least 50 parts per million (ppm) sulfur and/or chloride.

In some embodiments, a saltwater corrosion resistant surface is also referred to as the surface. A layer of the saltwater corrosion resistant composite coating is at least partially coated on the surface.

In some embodiments, the layer has a thickness of 10 to 500 micrometers (μm).

In some embodiments, the surface is made from at least one material selected from a group consisting of iron, steel, copper, aluminum, nickel, zinc, cobalt, lead, chromium, tantalum, titanium, zirconium, silver, and niobium.

In some embodiments, the surface is more hydrophobic than the same surface not coated with the saltwater corrosion resistant composite coating.

In some embodiments, the coating has an adhesion strength of 5-7 megapascals (MPa).

In some embodiments, the coating has an open circuit potential (OCP) value of 0.2-0.4 volts (V).

In some embodiments, the coating has an impedance modulus ($|Z|$) of $1 \times 10^{8-10}$ ohm square centimeter ($\Omega cm^2$).

In some embodiments, the saltwater corrosion resistance is maintained for at least 45 days in a solution of 1-10% salt dissolved in water.

In some embodiments, a method of making the saltwater corrosion resistant composite coating includes mixing the chitosan and rGO in an acid to form a dispersion. The method includes adding a conductive polymer monomer to the dispersion to form a mixture, and further adding an oxidizing agent into the mixture and stirring for at least 2 hours at a temperature of 15-25 degrees Celsius (° C.) to form a reaction mixture. The method further includes filtering and washing the reaction mixture with a polar protic solvent to form a wet powder and drying the wet powder at a temperature 50-80° C. for at least 10 hours to form a dry powder. Furthermore, the method includes sonicating the dry powder in an aprotic solvent for at least 5 minutes to form a suspension; mixing the suspension with a hardener and sonicating for at least 5 minutes to form a uniform suspension. The method further includes evaporating the aprotic solvent from the uniform suspension to leave a paste; and mixing the paste with an epoxy resin and degassing at a temperature greater than 25° C. for at least 10 minutes to form the saltwater corrosion resistant composite.

In some embodiments, a method of inhibiting corrosion on a surface in a saltwater environment includes at least partially coating at least one layer of the saltwater corrosion resistant composite coating onto the surface.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
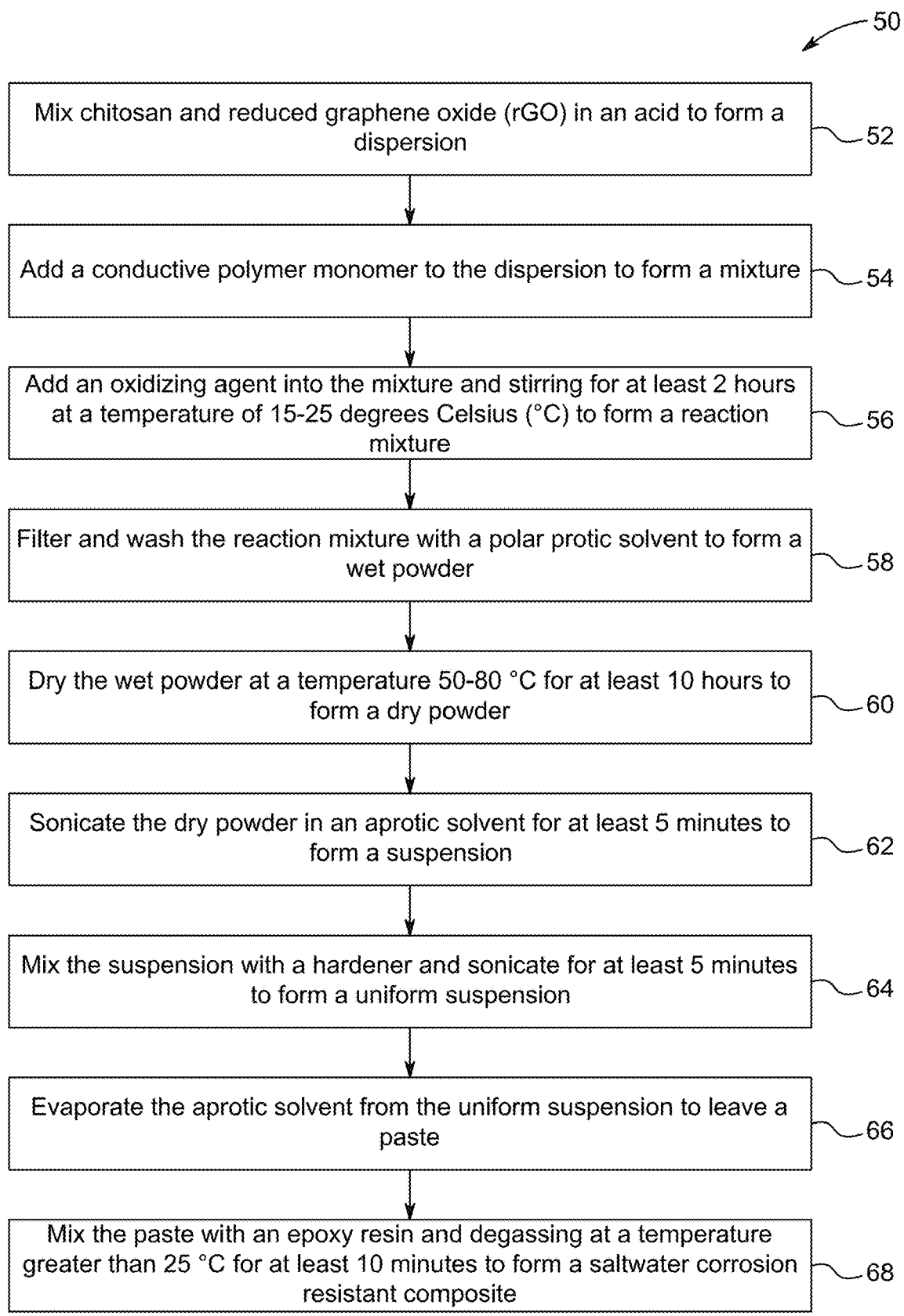
FIG. 1 is a schematic flowchart of a method of making a saltwater corrosion resistant composite coating, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed towards a saltwater corrosion resistant composite coating, otherwise referred to as the 'coating'. The coating can be applied to surfaces or substrates, such as steel, carbon steel, stainless steel, and any other metallic substrate used or known to be susceptible to corrosion, particularly in marine environments. Experimental results with the coating on the surfaces or substrates demonstrated a significant increase in anticorrosion behavior. In addition, the coating exhibits more extended service life at low cost, thereby circumventing the drawbacks such as high manufacturing cost and low corrosion resistance properties of the prior art.

The coating of the present disclosure includes at least one conductive polymer, also referred to as the polymer. A conductive polymer is a polymer that conducts an electrical current through one or more valence states of the polymer. In a preferred embodiment, the conductive polymer is an intrinsic conducting polymer. In some embodiments, the conductive polymer is at least one selected from a group consisting of polyaniline (PANT), polypyrrole (PPy), polythiophene (PTh), polyphenylene sulfide (PPS), polyacetylene (PA), polyphenylene vinylene (PPV), poly(3,4-ethylenedioxythiophene) (PEDOT), a polycarbazole (PCz), polyindole (PIn), polyazepine, polypyrene (PP), polyazulene (PAz), and polynaphthalene. In some embodiments, the conductive polymer may be poly(para-phenylene) (PPP), poly (3-alkyl-thiophenes) such as poly (3-hexyl thiophene), poly (3-methyl thiophene), and poly-(3-octyl thiophene), polyisothianapthene, poly-(3-thienylmethylacetate), polyquinoline, polyheteroarylenvinylene, in which the heteroarylene group may include, but is not limited to thiophene, furan or pyrrole, poly-(3-thienylethylacetate), and derivatives, copolymers, and mixtures thereof. In some embodiments, the conductive polymer is PANI.

The coating further includes chitosan (CS). CS is a bio-natural polysaccharide that may be extracted from chitin. Chitin is an abundant biopolymer and is a primary component of the exoskeleton of many invertebrates, such as the shells of marine arthropods, and in the cell wall of most fungi. CS is obtained from chitin through deacetylation with a base, such as sodium hydroxide. It is composed of randomly distributed (3-linked D-glucosamine and N-acetyl-D-glucosamine, with two types of reactive groups, the free amine groups on deacetylated units, and the hydroxyl groups. CS is moldable, non-toxic, and exhibits high chemical resistance. In some embodiments, the CS may be combined with other bio-natural polymers like cellulose. In some embodiments, the coating can include a combination of cellulose and chitosan.

The coating further includes reduced graphene oxide (rGO). In an embodiment, compared with graphene oxide a peak related to the presence of —OH groups at 3500-3000 cm$^{-1}$, preferably 3400-3100 cm$^{-1}$, or 3300-3200 cm$^{-1}$, in the FT-IR spectrum of the rGO is significantly reduced. In an embodiment, the rGO is 1-10 wt. % oxygen, preferably 2-8 wt. %, or 4-6 wt. %, based on the atomic weights of the atoms in the rGO. In some embodiments, the rGO has an XRD peak (200) at 20-25°, preferably 21-24°, or 22-23°. In some embodiments, the rGO d-spacing is 0.34-0.40 nm, preferably 0.35-0.39 nm, 0.36-0.38 nm, or approximately 0.37 nm demonstrating the removal of oxygen functionality and a partial restoration of the sp$^2$ carbon network. Morphological analysis shows that the rGO has a nanosheet-like structure. In some embodiments, the nanosheets have a thickness of around 1-20 nm and preferably lie in a range of about 5 nm to about 15 nm, or approximately 10 nm. The rGO is made of single or more layers of graphite sheets of high electrical conductivity and has a wide range of applications. In some embodiments, the coating may optionally include one or more conductive additives such as graphite, activated carbon (AC), carbon nanotubes (CNTs), carbon nanofibers (CNFs), carbon black, carbide-derived carbon (CDC), carbon aerogel, and graphene.

Furthermore, the coating includes a cured epoxy. In some embodiments, the cured epoxy is a blend of at least one epoxy resin and at least one hardener. The blend contains or consists of 80-95 wt. % the epoxy resin and 5-20 wt. % the hardener, based on the total weight of the epoxy resin and the hardener. In some embodiments, the blend includes 85-90 wt. % epoxy resin and 10-15 wt. % hardener, based on the total weight of the epoxy resin and the hardener. In some embodiments, the epoxy resin is at least one selected from a group consisting of bisphenol A and bisphenol F. In some embodiments, the bisphenols may be replaced by or optionally used in combination with polyurethane, phenolic resins, alkyd resins, aminoplast resins, vinyl alkyds, silicone alkyds, uralkyds, urethane resins, unsaturated polyester resins, silicones, vinyl acetates, vinyl acrylics, acrylic resins, vinyl resins, polyimides, unsaturated olefin resins, fluorinated olefin resins, or a combination thereof. In some embodiments, the hardener is at least one selected from a group consisting of phenols, aromatic amines, aliphatic amines, and thiols.

In some embodiments, the cured epoxy acts as a binding agent. Hereinafter, binding agent refers to materials that convert to adherent membranes on a metal surface and may provide a non-thermoplastic matrix for a conducting polymer blended therein. The binding agent makes the coating capable of being directly applied to a metal surface. In some embodiments, the binding agent may be an inorganic compound which may include but is not limited to zirconate, silicate, and titanate.

The rGO and CS are dispersed in particles of the conductive polymer to form a 3D network. At least a portion of the CS is covalently bound to the rGO. At least a part of the conductive polymer is covalently bound to the CS, and the 3D network is dispersed in the cured epoxy to form the coating. In some embodiments, the CS acts as bridge to promote interaction between the conductive polymer and the rGO by being covalently bonded to both, thereby creating a 3D network.

The TEM image (FIG. 6J) of the coating has low opacity indicating that the rGO, CS, and conductive polymer are dispersed throughout and tend not to form singular composites. In some embodiments, the coating exhibits globular particles and nanofibrillar particles of the chitosan/conductive polymer at least partially enfolding the sheets of the rGO. In some embodiments, the globular and nanofibrillar particles are greater than 500 nm in size, preferably 600 nm, 700 nm, 800 nm, 900 nm, 1 μm, 1.5 μm, or 2 μm. In some embodiments, the chitosan/conductive polymer enfold 10%, preferably 20%, 30%, 40%, 50%, 60%, 70%, 80%, 90% or 100% of the rGO. This network improves anticorrosion properties by preventing a direct path for permeation of electrolyte species to a metal surface.

In some embodiments, the FT-IR spectrum (FIG. 2D) of the coating shows a shift of the rGO C—O peak from 1200-1165 cm$^{-1}$, preferably 1190-1170 cm$^{-1}$, or approximately 1180 cm$^{-1}$ to 1165-1140 cm$^{-1}$, preferably 1160-1145 cm$^{-1}$, or 1155-1150 cm$^{-1}$ due to the intercalation of PANI/CS on the surface of the rGO.

In some embodiments, the conductive polymer is PANI and the PANI component of the coating has peaks at (001) 8.5-9.0°, preferably 8.6-8.9°, or 8.7-8.8°, (010) 14.5-15°, preferably 14.6-14.9°, or 14.7-14.8°, (100) 20-21°, preferably, 20.2-20.8°, or 20.4-20.6°, (110) 25-25.5°, preferably 25.1-25.4°, or 25.2-25.3°, (111) 26.5-27°, preferably 26.6-26.9°, or 26.7-26.8° and (020) 29-30°, preferably 29.2-29.8°, or, 29.4-29.6°. In some embodiments, the polymer has less than 50%, preferably 40%, 30%, 20%, or 10% crystallinity. In some embodiments, at least 50%, preferably 60%, 70%, 80%, 90% or 100% of the polymer is crystalline. In some embodiments, the polymer is PANI and has an emeraldine form. In some embodiments, the PANI has a leucoemeraldine, or a pernigraniline form. In some embodiments, the peaks related to CS appear at 8-12°, preferably 8.5-11.5°, 9-11°, 9.5-10.5°, or approximately 10°, and 17-21°, preferably 17.5-20.5°, 18-20°, 18.5-19.5°, or approximately 19°. In some embodiments, no peak linked to rGO was found in the coating due to increased spacing between the graphene layers due to the intercalation of the conductive polymer and CS.

In some embodiments, the N is XPS spectrum of the coating shows that the coating has 1-5%, preferably 2-4%, or approximately 3% =N-, 60-70%, preferably 62-68%, or 64-66% —NH-, 15-20%, preferably 16-19%, or 17-18% N+, and 5-10%, preferably 6-9%, or 7-8% —NH+, based on the total nitrogen content. The high percentage (at least 20%) of charged nitrogen species improves the coatings properties for corrosion resistance due to its ability to accept and then contribute free electrons.

In some embodiments, the 3D network includes 85-95 wt. %, preferably 87-93 wt. % or 89-91 wt. % the conductive polymer, 0.5-5 wt. %, preferably 1-4 wt. %, or 2-3 wt. % the rGO, and 1-10 wt. %, preferably 2-8 wt. %, or 4-6 wt. % the CS, based on the total weight of the conductive polymer, rGO, and CS.

In some embodiments, the coating includes 1-10 wt. %, preferably 2-8 wt. %, or 4-6 wt. % the conductive polymer, rGO, and CS and 90-99 wt. %, preferably 92-98 wt. %, or 94-96 wt. % of the cured epoxy, based on the total weight of the conductive polymer, rGO, CS, and cured epoxy. In some embodiments, the coating includes at least 50 ppm sulfur and/or chloride. In another embodiment, the coating includes impurities such as but not limited to bromine, iodine, sodium, phosphorus, and magnesium. In some embodiments, the sulfur and chloride are impurities from the polymerization process using ammonium persulfate and hydrochloric acid. In some embodiments, 50 ppm of ammonium persulfate is present in the coating.

The present disclosure also provides a saltwater corrosion resistant surface, referred to as the surface. In some embodiments, the surface is made from at least one material selected from a group consisting of iron, steel, copper, aluminum, nickel, zinc, cobalt, lead, chromium, tantalum, titanium, zirconium, silver, and niobium. In some embodiments, a layer of the saltwater corrosion resistant composite coating is at least partially coated, at least 50%, preferably 60%, 70%, 80%, or 90% on the surface. In some embodiments, a layer of the saltwater corrosion resistant composite coating is completely coated on the surface. Components of the coating may even provide corrosion protection in the presence of gaps in the coating on the surface. In some embodiments, the coating may be applied over exposed surfaces of metal substrates. In some embodiments, the coating may be applied as an interlayer between a pair of exposed metal surfaces. In some embodiments, the layer may be coated on the surface with an electrospray deposition. In some embodiments, the layer may be coated on the surface by one or more methods, including, but not limited to, coater, spray coater, or painting by using a brush.

In some embodiments, the layer thicknesses are 10 to 500 μm, preferably 50-450 μm, 100-400 μm, 150-350 μm, 200-300 μm, or approximately 250 μm. In some embodiments, the surface is more hydrophobic than the same surface not coated with the saltwater corrosion resistant composite coating. The hydrophobic nature prevents the surface from water exposure. In some embodiments, the water contact angle of the surface is 115-130°, preferably 118-127°, or approximately 125°. In some embodiments, the coating has an adhesion strength of 5-7 MPa. In some embodiments, the adhesion strength maybe about 5.5 MPa to about 6.5 MPa. The addition of the CS and rGO to the polymeric coating improves the capacity to seal the coating's micro defects, including pores, cracks, and voids, thereby enhancing the adhesion strength. In some embodiments, the surface is devoid of micro defects. In some embodiments, less than 20%, preferably 10%, or 5% of the surface area of the surface has a microdefect.

In some embodiments, the coating has an open circuit potential (OCP) value of 0.2-0.4 V. In some embodiments, the OCP value may be in a range of about 0.25 V to about 0.35 V. As used herein, the OCP value refers to the potential value that exists in an open circuit. In some embodiments, the OCP value is at least 50 mV higher than a coating with only the cured epoxy. In some embodiments, the coating has an impedance modulus (|Z|) of $1\times10^{8-10}$ Ωcm$^2$. In some embodiments, the impedance modulus is at least an order of magnitude higher than a coating with only the cured epoxy. In some embodiments, the saltwater corrosion resistance is maintained at least 45 days, preferably 100 days or 1,000 days in a solution of 1-10% salt dissolved in water.

Referring to FIG. 1, a schematic flow diagram of a method 50 of making the saltwater corrosion resistant composite coating is illustrated. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing the CS and rGO in an acid to form a dispersion. In some embodiments, the acid is acetic acid (AA). In some embodiments, the acid may include but is not limited to malic acid, tartaric acid, oxalic acid, uric acid, formic acid, and citric acid. In some embodiments, the acid may further include but is not limited to hydrochloric acid (HCl) and sulfuric acid (H$_2$SO$_4$).

At step 54, the method 50 includes adding a conductive polymer monomer to the dispersion to form a mixture. In some embodiments, the conductive polymer monomer may include, but is not limited to, aniline (ANI), pyrrole (Py), thiophene (Th), phenylene sulfide (S), acetylene (A), phenylene vinylene (PV), 3,4-ethylene dioxythiophene (EDOT), a carbazole (Cz), indole (In), azepine, pyrene, azulene (Az), and naphthalene. In some embodiments, the conductive polymer monomer is aniline.

At step 56, the method 50 includes adding an oxidizing agent into the mixture and stirring for at least 2 hours, preferably 2-10 hours, 4-8 hours, or approximately 6 hours, at a temperature of 15-25° C., preferably 17-23° C., or approximately 20° C. to form a reaction mixture. In some embodiments, the oxidizing agent may include but is not limited to sodium hypochlorite, bromine, periodate, permanganate, hydrogen peroxide, and ammonium persulfate (APS). In some embodiments, the oxidizing agent is APS. In some embodiments, the APS is added to the mixture and stirred for 4 hours at the temperature of 20° C. is performed to form the reaction mixture.

At step 58, the method 50 includes filtering and washing the reaction mixture with a polar protic solvent to form a wet powder. In some embodiments, the polar protic solvent may include but is not limited to water, methanol, ethanol, isopropyl alcohol, and AA. In some embodiments, the polar protic solvent is ethanol.

At step 60, the method 50 includes drying the wet powder at a temperature 50-80° C., preferably 60-70° C., or approximately 65° C. for at least 10 hours, preferably 10-24 hours, 15-20 hours, or 16-17 hours to form a dry powder. In some embodiments, the wet powder is dried at a temperature of 60° C. to form the dry powder.

At step 62, the method 50 includes sonicating the dry powder in an aprotic solvent for at least 5 minutes, preferably 10-30 mins, or approximately 20 minutes, to form a suspension. In some embodiments, the aprotic solvent may include, but is not limited to, dimethylsulfoxide (DMSO), acetone, dimethyl fumarate (DMF), and benzene. In some embodiments, the aprotic solvent is acetone. In some embodiments, the dry powder in the acetone is sonicated for 10 minutes to form the suspension.

At step 64, the method 50 includes mixing the suspension with a hardener and sonicating for at least 5 minutes, preferably 10-30 mins, or approximately 20 minutes, to form a uniform suspension. In some embodiments, the hardener is polyamine. In some embodiments, sonication is performed for 10 minutes to form the uniform suspension.

At step 66, the method 50 includes evaporating the aprotic solvent from the uniform suspension to leave a paste. In some embodiments, the uniform suspension may be heated at 50° C.

At step 68, the method 50 includes mixing the paste with an epoxy resin and degassing at a temperature greater than 25° C., preferably 30-50° C., or 35-45° C. for at least 10 minutes, preferably 10-30 mins, or 20-25 mins, to form the saltwater corrosion resistant composite. In some embodiments, degassing may be performed in a vacuum pump. In some embodiments, degassing is performed for 15 minutes to form the saltwater corrosion resistant composite.

The present disclosure also provides a method of inhibiting corrosion on a surface in a saltwater environment. The method includes at least partially coating at least one layer of the saltwater corrosion resistant composite coating onto the surface. In some embodiments, the surface may be completely coated with one layer of the coating. In some embodiments, the surface is coated with 2-10, preferably 3-8, or approximately 5 layers of the coating.

EXAMPLES

The following examples describe and demonstrate exemplary embodiments of the saltwater corrosion resistant composite coating described herein. The examples are provided solely for the purpose of illustration and are not to be construed as limitations of the present disclosure, as many variations thereof are possible without departing from the spirit and scope of the present disclosure.

Materials and Chemicals

Aniline, CS, APS, AA, HCl, and hydrazine hydrate ($N_2H_4.H_2O_4$) were used. GO with thickness ranging from 5 to 10 nm and a diameter of 10-20 μm was used. Bisphenol A, diglyceryl ether based epoxy resin, and hybrid aliphatic polyamine hardener (Razeen LR1150 [epoxy equivalent weight (EEW)-180-189 gram per equivalent (g/eq), and viscosity at 25° C.-10,000-12,000 mPa·s] and Razeencure 91618 [amine hydrogen equivalent weight (AHEW)-265 g/eq, and viscosity at 25° C.-300-650 millipascal second (mPa·s)] were used. MS panels [composition (wt. %)—0.040 C, 0.350 Mn, 0.022 P, 0.036 S and balance Fe] were used as base substrates for the present study. The MS panels were ground using different grades of emery paper and then splashed with deionized (DI) water and ultrasonicated with ethanol and dried in air.

Example 1: Preparation of Binary and Ternary Nanocomposites

To prepare rGO, 500 mg of pristine GO was added to 250 milliliters (ml) of DI water and ultra-sonicated for 1 hour to form a mixture. Further, 5 ml of $N_2H_4.H_2O_4$ was added to the mixture, and the mixture remained at 95° C. for 8 hours. The mixture was then filtered and thoroughly cleaned with ethanol and DI water and dried at 70° C. for 12 hours. To prepare ternary composite such as PANI/CS/rGO, 0.25 g of the CS and 50 mg of the rGO were dispersed in 100 ml of AA, and the mixture was stirred for 12 hours at room temperature (RT).

4.65 g of the aniline was dissolved in 100 ml of 1 M HCl solution and was added to the mixture of the CS and rGO. 11.40 g of the APS was dissolved in 100 ml of 1 M HCl solution and was gradually drizzled into the mixture at 20° C. with stirring for 4 h. The resultant solution was allowed without any stirring for 2 h. And then filtered and cleaned with ethanol. The sample was dried in an oven at 60° C. until a constant weight was obtained. For comparative studies, the binary composites such as PANI/rGO and PANI/CS were also prepared using similar experimental conditions without adding the CS and rGO, respectively. Hereinafter, composites are also referred to as nanocomposites.

Example 2: Preparation of Epoxy Nanocomposites Coatings on MS Substrates

To reinforce the synthesized binary and ternary nanocomposite into epoxy coatings, 2.5 wt. % of PANI/rGO, PANI/CS, and PANI/CS/rGO were individually added to acetone, and the resultant mixtures were probe sonicated for 10 minutes. To get homogeneous dispersion of composites into the epoxy resin, the subsequent mixture was probe sonicated with the polyamine hardener for about 10 minutes and slow heating at 50° C. with stirring to eliminate the solvent. The proper quantity of the epoxy resin was added into the resultant hardener mixture with stirring for 15 minutes. Then, degassing was done in a vacuum oven for 15 minutes.

A draw-down bar coater with a target thickness of 100 μm was utilized to coat the resultant mixture on the MS panels, and the wet-coated MS panels were kept at RT for about 24 hours to have better curing reactions. For comparison, epoxy coatings with the rGO and without any reinforcement were prepared following the same routes. The MS panel with the epoxy coating without or with 2.5 wt. % of the rGO, PANI/rGO, PANI/CS, and PANI/CS/rGO was symbolized as the PE, PE/rGO, PANI/rGO, PANI/CS and PANI/CS/rGO, respectively. A thickness gauge (Elcometer) was employed in measuring the thickness of the prepared coatings, and the thickness of the prepared epoxy coatings was estimated to be around 100±5 μm.

Example 3: Structural Characterizations

Attenuated Total Reflectance Fourier Transform Infrared (FT-IR) spectral analysis investigated the structural information on the binary and ternary composites. FT-IR spectral analysis was performed in the IR region of 4000-400 cm$^{-1}$ using the Thermal analysis (TA) instrument. X-ray diffraction (XRD) analysis (Rigaku, Japan) at 40 kilovolts (kV) and 30 milliamperes (mA) was performed to examine the crystalline structure of synthesized composites in the region of 5-80°. Surface-enhanced Raman spectral (SERS, Yvon Jobin Horiba Raman spectrometer) analysis was performed using green type at 532 nm in a region of 200-2000 cm$^{-1}$. X-ray Photoelectron Spectroscopic (XPS, Thermo ESCALAB 250) analysis was accomplished using a monochromatic Al Kα irradiation to analyze constituent elements on the composite surface and chemical bonding in the synthesized nanocomposite.

Example 4: Surface Characterizations

Synthesized binary and ternary nanocomposites were examined using Field Emission Scanning Electron Microscopy (FE-SEM, Tescan instruments) attached with an Energy-dispersive X-ray diffraction spectroscope (EDS) to study surface morphology with elemental composition of the synthesized binary and ternary nanocomposites. Transmission Electron Microscopic (TEM) analysis of the prepared nanocomposites was performed using a JEM-2100F electron microscope at a voltage of 200 kV. Water contact angle (WCA) of coated MS panels, also referred to as the coated MS substrates, was recorded using a contact angle meter (VCA OPTIMA, AST products Inc. USA) through a sessile drop method. To evaluate the adhesion strength between the prepared coatings and MS panels, a hydraulic adhesion test (Albuquerque Inc., U.S.A) was performed based on ASTM standard D4541. A metallic dolly with an epoxy adhesive joined the coated MS panels and was kept for complete curing (24 hours). And then, the dolly was dragged, and the maximum force required for the metallic dolly to detach the coating from the MS panel was recorded as a magnitude of the adhesion between the coatings and MS panel.

Example 5: Electrochemical Corrosion Tests

Gamry Reference 3000 potentiostat was used to conduct a corrosion analysis using the desired three-electrode cell arrangement. The coated MS substrates with an exposure area of 1.76 cm$^2$ act as working electrodes, whereas saturated calomel and graphite plates act as a reference and auxiliary electrodes. The OCP was monitored for about 1 hour in the 3.5% NaCl solution to attain a stable, steady-state before the corrosion test. Linear polarization resistance (LPR) was observed for 45 days by applying the potential of ±20 mV from the monitored OCP with the scan rate of 0.197 mV/s. Electrochemical impedance spectroscopic (EIS) measurements were performed in the frequency region of 100 Kilohertz (kHz) to 1 millihertz (mHz) using an alternating current (AC) amplitude of 10 mV.

Example 6: Structural Characterization of Prepared Ternary Composites

Figure 2A:
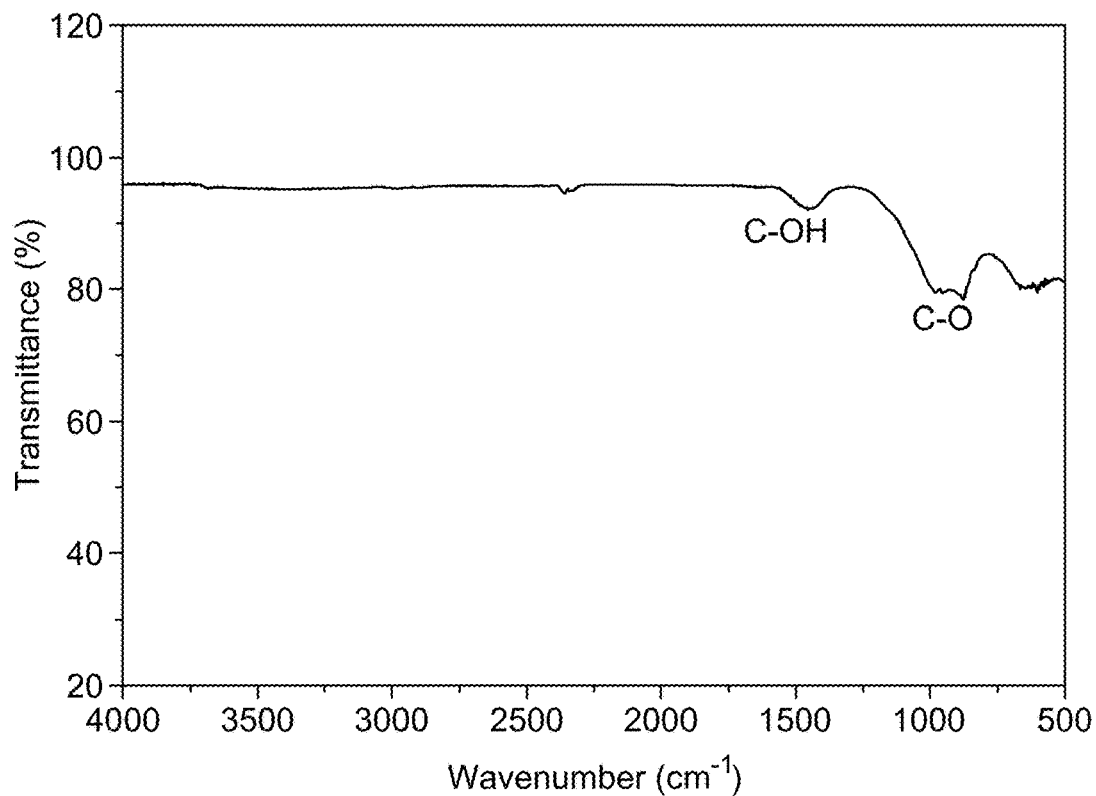
FIG. 2A is a graph depicting a Fourier transform infrared (FT-IR) spectrum of reduced graphene oxide (rGO), according to certain embodiments.
Figure 2B:
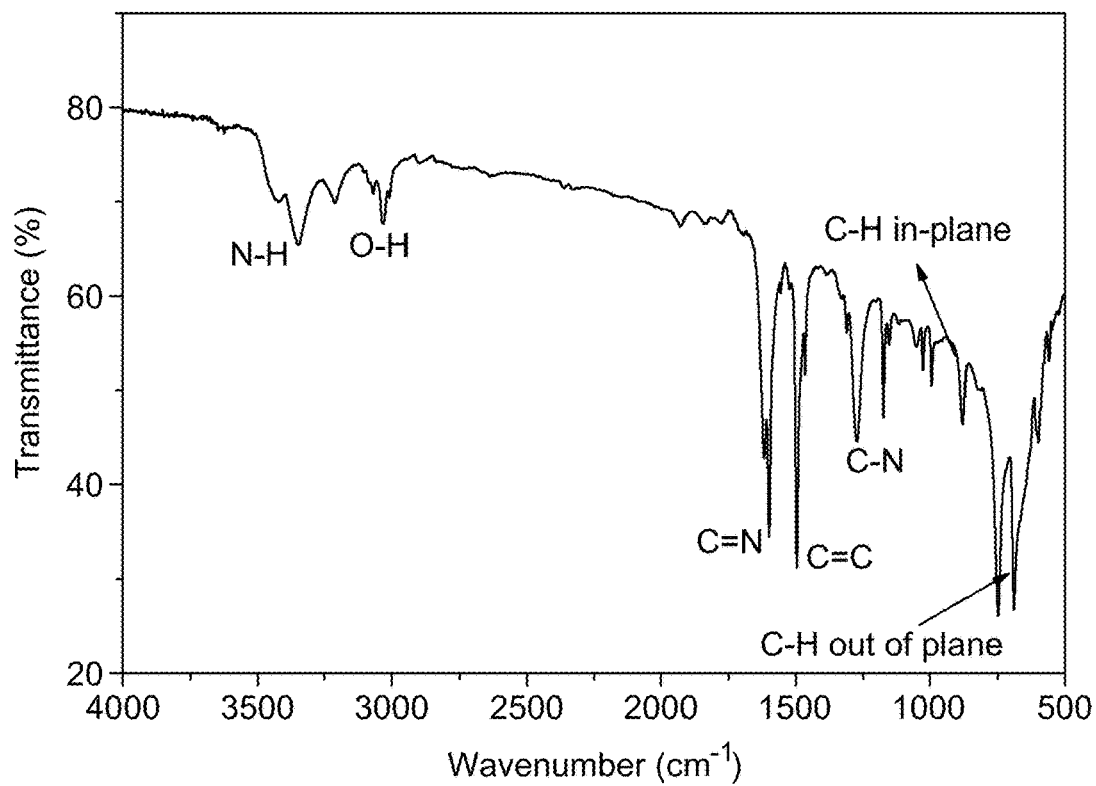
FIG. 2B is a graph depicting the FT-IR spectrum of PANI/rGO, according to certain embodiments.
Figure 2C:
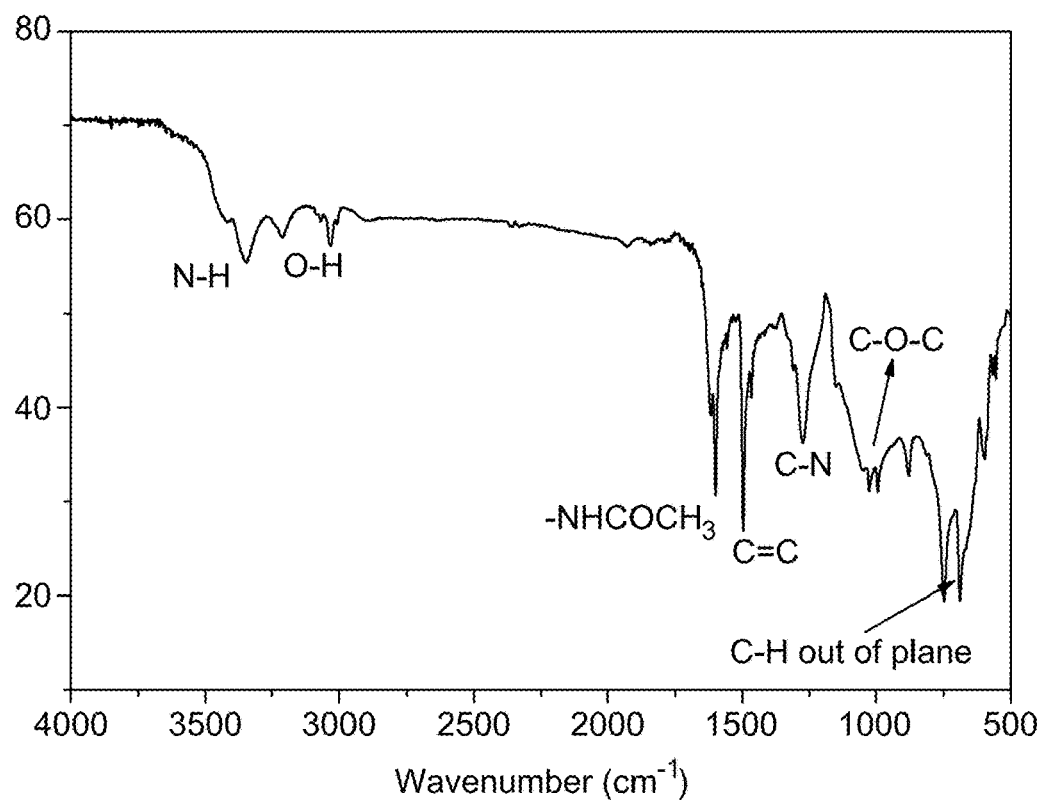
FIG. 2C is a graph depicting the FT-IR spectrum of PANI/CS, according to certain embodiments.
Figure 2D:
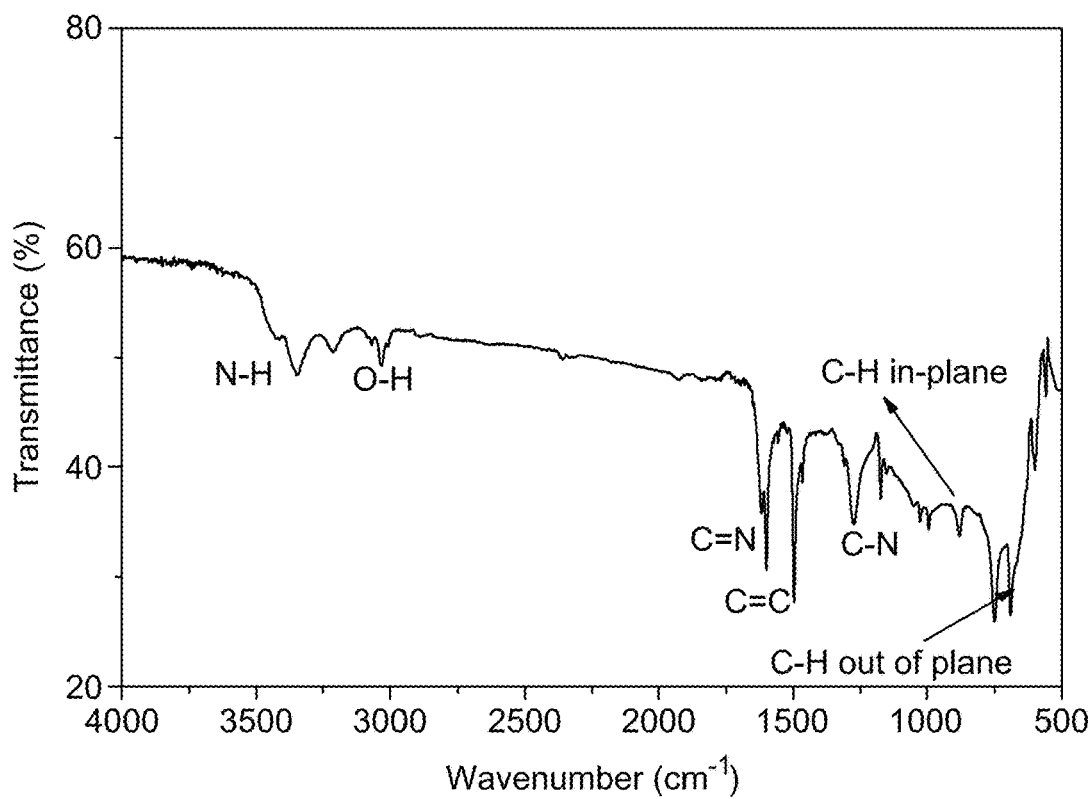
FIG. 2D is a graph depicting the FT-IR spectrum of PANI/CS/rGO, according to certain embodiments.
Figure 2E:
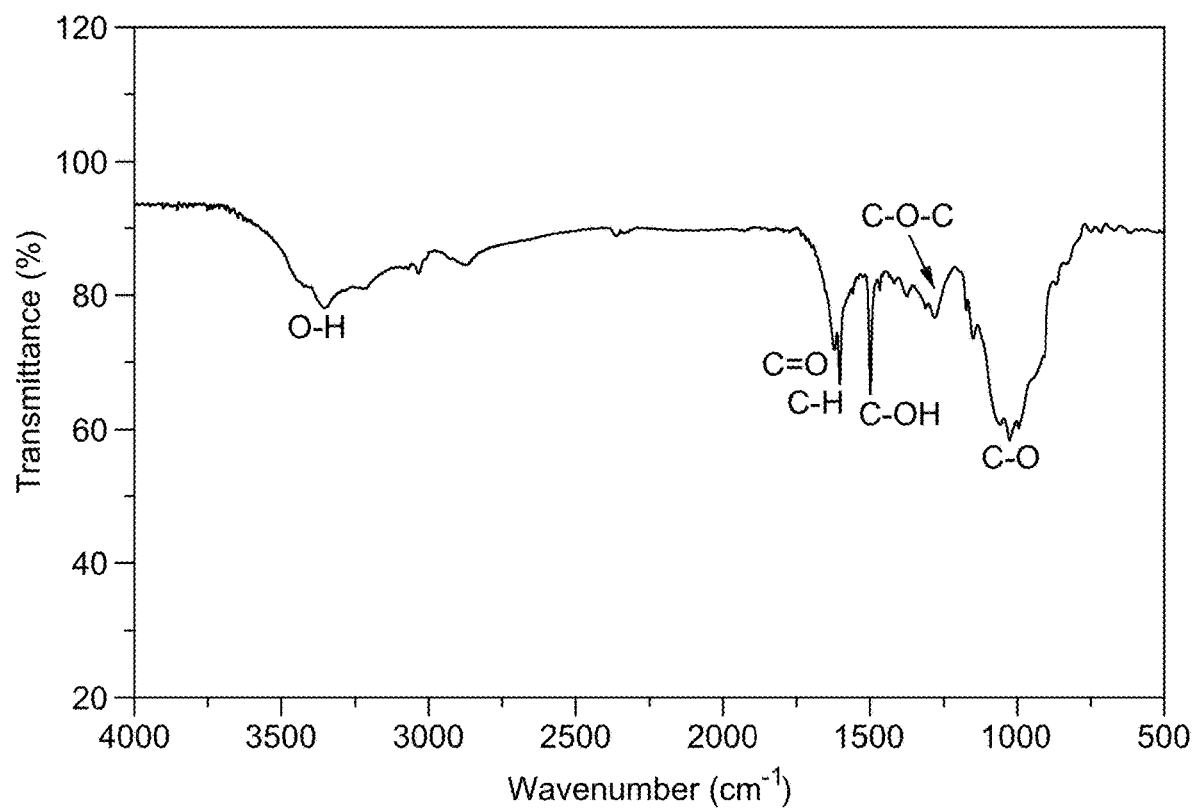
FIG. 2E is a graph depicting the FT-IR spectrum of pristine GO, according to certain embodiments.

FIGS. 2A-2D refer to the FT-IR spectra of the binary and ternary nanocomposites. The prominent peaks of rGO, PANI, and CS agree with the literature values. In the pristine GO (FIG. 2E), the prominent absorption peak at 3398 cm$^{-1}$ was ascribed to the stretching mode of the O—H group. The peaks obtained at 1022, 1272, 1488, 1601, and 1647 cm$^{-1}$ correspond to the stretching vibrations of C—O, C—O—C, C—OH, C—H, and C=O, respectively. When compared with the pristine GO (FIG. 2E), the peak related to —OH (around 3400 cm$^{-1}$) almost vanished in the IR curve of the rGO (FIG. 2A). In contrast, the intensity of the peaks at 1488 cm-1 and 1022 cm-1 was considerably lessened, specifying that the GO was effectively reduced to the rGO. For the PANI/rGO (FIG. 2B), peaks that appeared around 3250-3650 cm$^{-1}$ correspond to the stretching modes of O—H and N—H groups. The peaks at 1590 and 1487 cm$^{-1}$ correspond to C=N (quinonoid) and C=C (benzenoid), stretching vibrations of the PANI moieties. The peak at 1378 cm$^{-1}$ corresponds to the stretching mode of C—N in the vicinity of a quinonoid unit.

The peaks at 1164 cm$^{-1}$, and 695 cm$^{-1}$ correspond to the aromatic C—H in-plane, and the vibration of the C—Cl group, peaks at 987 and 772 cm$^{-1}$ correspond to the out-of-plane deformations of the C—H bond in 1, 2, 4-disubstituted benzene and 1, 4-disubstituted benzene, respectively. In the IR curves for PANI/CS (FIG. 2C), including peaks relevant to the PANI, a peak around 2900 cm$^{-1}$ was attributed to the C—H stretching vibrations. A peak around 1620 cm$^{-1}$ corresponds to an NH deformation of amide I (—NHCOCH$_3$); peaks around 1490 and 1290 cm$^{-1}$ are due to the coupling of axial C—N stretching and angular N—H deformation, respectively. The peaks at 1026, 1046, and 1171 cm$^{-1}$ signified C—O—C linkages in glucosamine units. The IR peaks continue to be almost similar for the ternary composite except for an additional peak at 1170 cm$^{-1}$, merely owing to the existence of the rGO in the composite. However, the respective peak was slightly moved since the peak for the rGO arises at 1155 cm$^{-1}$. The slight movement of the present peak was ascribed to the intercalation of the PANI/CS on the rGO surface. The CS facilitates the creation of active spots for embedding the PANI chains on the rGO sheets and performing as a stabilizer of the rGO-PANI interfaces. The FT-IR results validate the effective interaction between the PANI, CS, and rGO in the ternary composite.

Figure 3A:
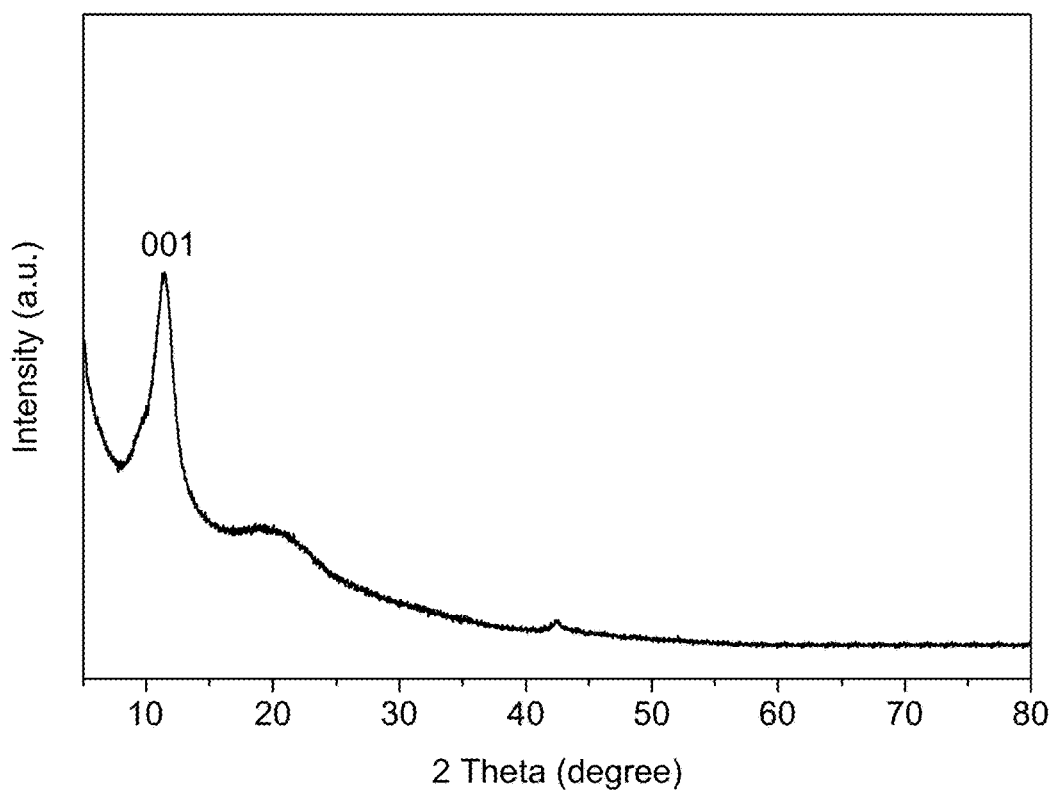
FIG. 3A is an X-Ray Diffraction (XRD) pattern of the pristine GO, according to certain embodiments.
Figure 3B:
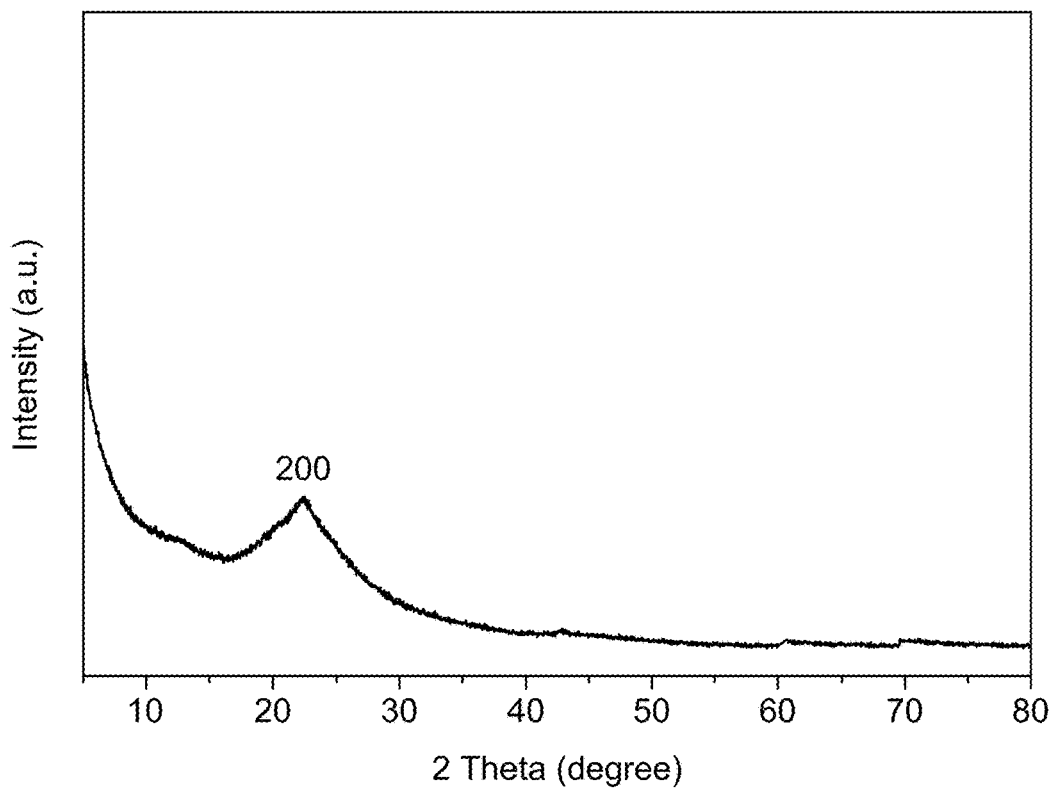
FIG. 3B is the XRD pattern of the rGO, according to certain embodiments.

FIGS. 3A-3D refer to the XRD patterns of the GO, rGO, PANI/rGO, and PANI/CS/rGO, respectively. FIG. 3A shows a strong peak at 11.50° (001) that relates to a large d-spacing of 0.81 nm [JCPDS No. 89-8490], revealing complete oxidation. Generally, an interlayer distance value of the GO may be governed by factors such as the quantity of absorbed water among the GO layers and functional groups containing oxygen on the GO surface. Reduction of the GO into the rGO leads to the disappearance of the peak at 11.5° with the appearance of a broad reflection peak at 22.50° (200) [JCPDS No. 89-7213] (FIG. 3B). Reduction of the value of d-spacing for the rGO to 0.38 nm demonstrated the removal of oxygen functionality and a partial restoration of the sp$^2$ carbon network. The XRD spectra of the PANI/rGO and PANI/CS/rGO composite (FIGS. 3C-3D) displayed a broad diffraction peak, revealing an amorphous structure of PANI chains near an interplanar van der Waals distance for aromatic groups.

Figure 3C:
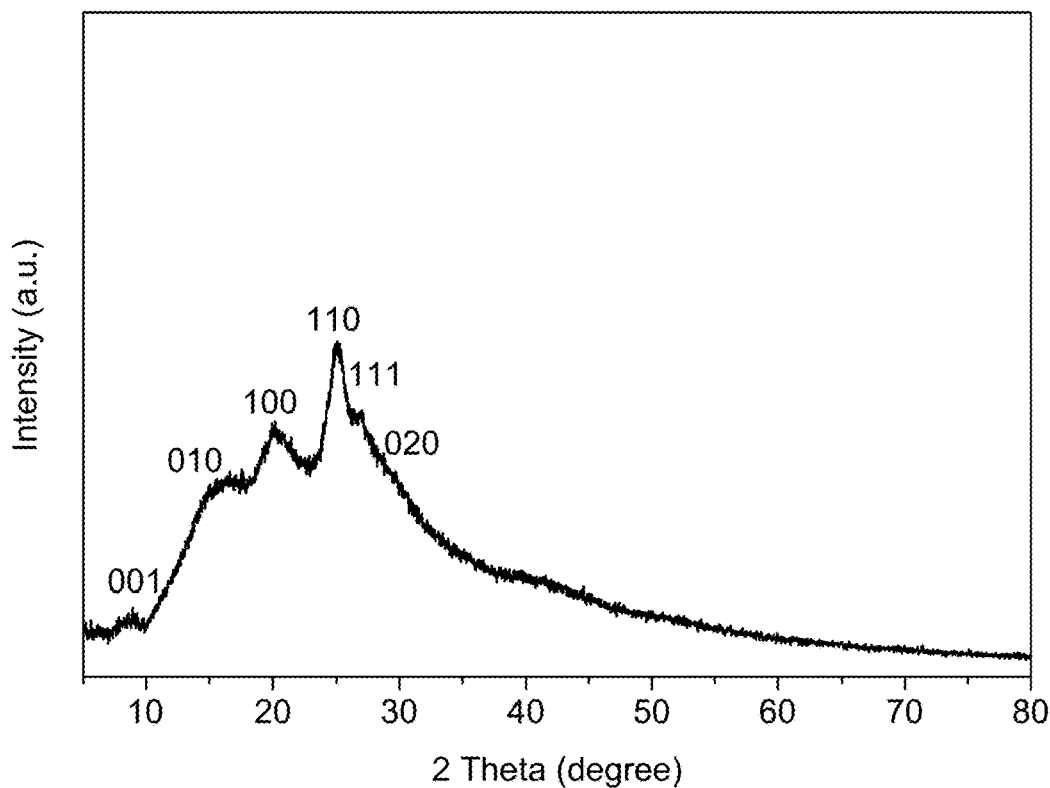
FIG. 3C is the XRD pattern of the PANI/rGO, according to certain embodiments.
Figure 3D:
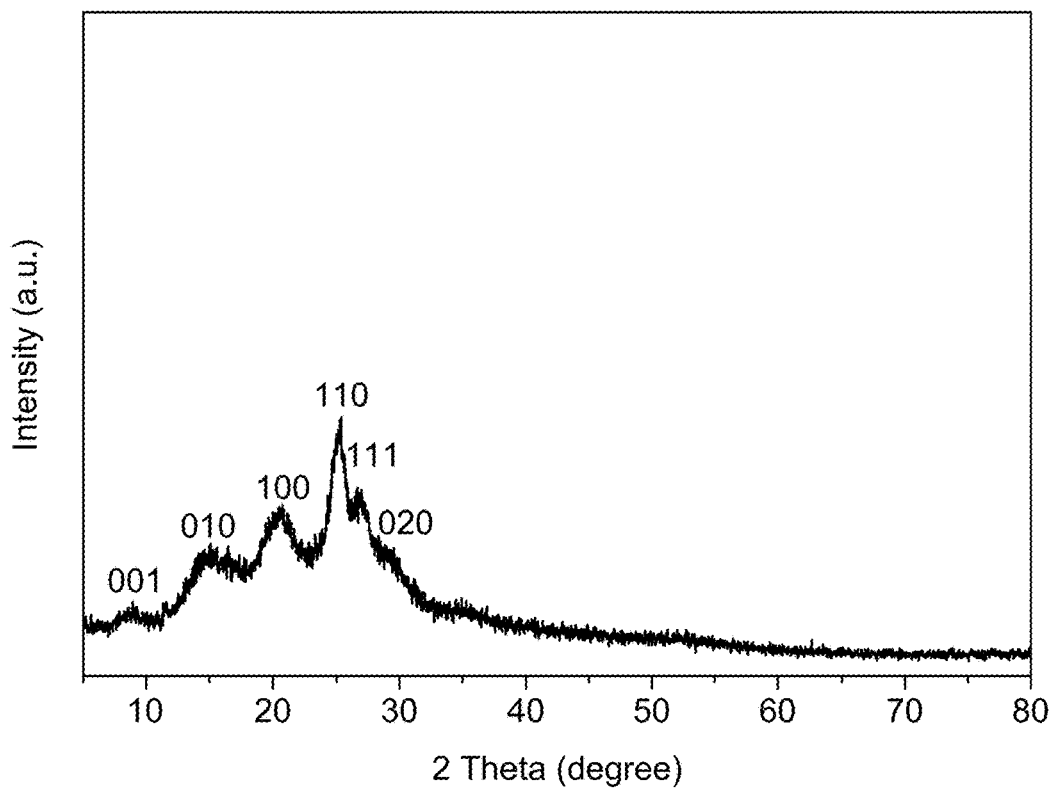
FIG. 3D is the XRD pattern of the PANI/CS/rGO, according to certain embodiments.

FIG. 3C-FIG. 3D shows characteristic peaks for the binary and ternary composites. Peaks appeared at 8.8°, 14.8°, 20.5°, 25.3°, 26.8°, and 29.5°, corresponding to (001), (010), (100), (110), (111) and (020) planes respectively, confirm that the PANI [JCPDS card No. 03-0869] in the prepared nanocomposites is in an emeraldine form with low crystallinity owing to the periodicity parallel and perpendicular in the PANI backbone. Further, peaks related to the CS [JCPDS card No. 39-1894] generally appearing around 10 and 20° were overlaid with the PANI peaks and slightly shifted to 11.55 and 17.25°, respectively, which validated the formation of the composites. In addition, no pronounced peak linked to the rGO was found in the prepared composites, which may be ascribed to more spacing between the GO layers, which may further be ascribed to the intercalation of the PANI and the low quantity of the rGO. Comparing the obtained XRD results of the binary and ternary composites validated that a crystal form of the PANI was not altered by reinforcing the rGO.

Figure 4A:
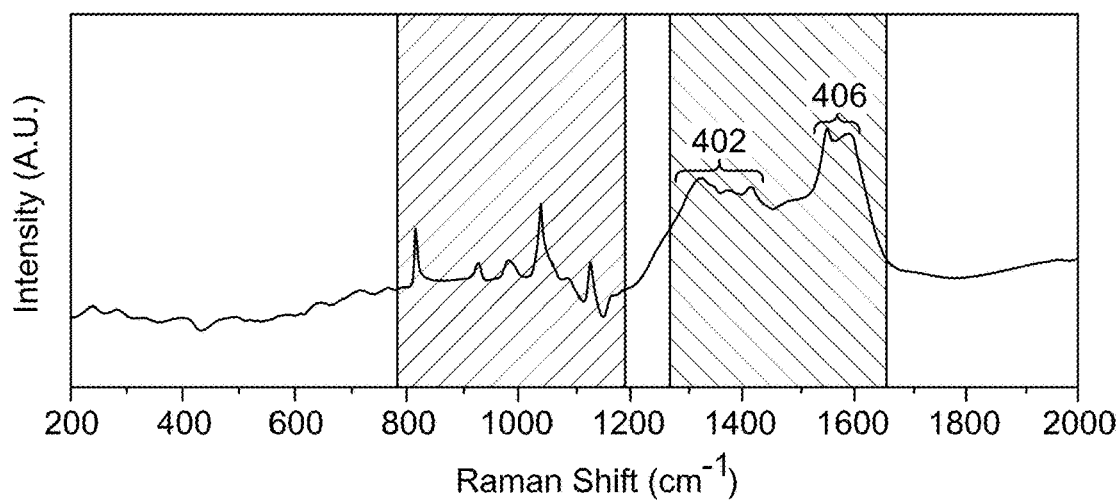
FIG. 4A is a Raman spectrum of the PANI/CS/rGO, according to certain embodiments.
Figure 4B:
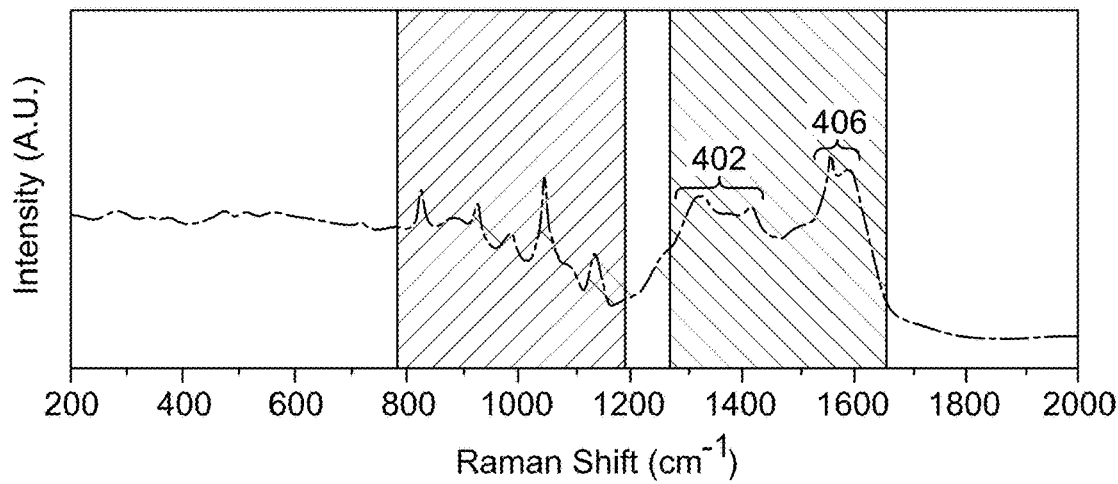
FIG. 4B is the Raman spectrum of the PANI/rGO, according to certain embodiments.
Figure 4C:
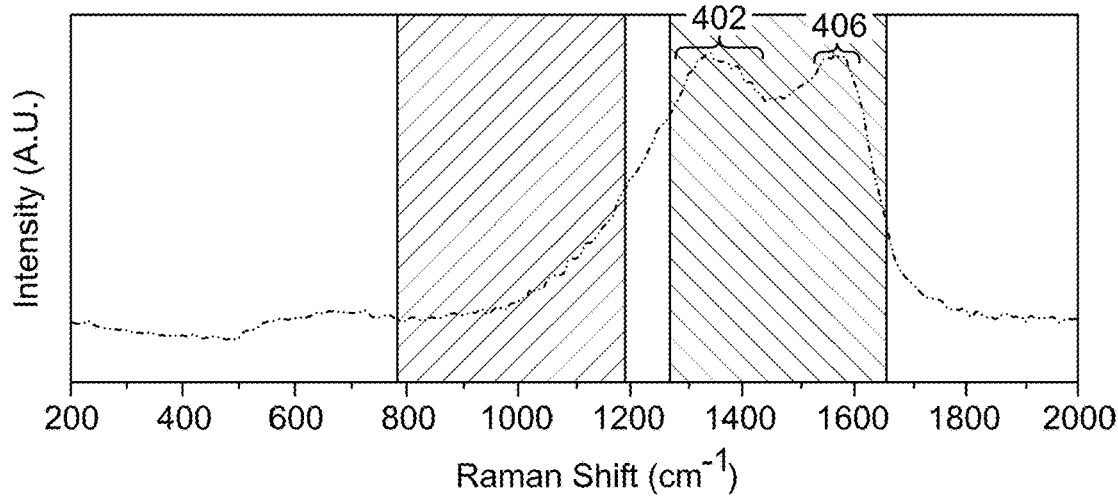
FIG. 4C is the Raman spectrum of the rGO, according to certain embodiments.

FIG. 4A-FIG. 4C refer to the Raman spectral results for the PANI/CS/rGO, PANI/rGO, and rGO. Peaks observed at 1337 and 1558 cm$^{-1}$ in the Raman spectra of the rGO were accompanied by D (402) and G (404) bands, respectively. Generally, the D band (402) provides information about edges, disordered features, and structural defects corresponding to the transformation of a hybridized carbon from a sp$^2$ to a sp$^a$ and other carbon. However, the G band (404) arises from a zone center E2g mode, revealing the vibration of ordered sp$^2$-bonded carbon atoms. The magnitude of disorderliness in graphite structure can be easily assessed by monitoring an intensity ratio (ID/IG) between the D and G bands (402, 404) when such bands exhibit equal intensity, specifying a higher level of structural defects. Herein, the value of ID/IG is estimated to be 0.82 for the pristine GO.

The value of ID/IG was increased to 0.99 for the rGO, which designates a high quantity of disorder in the rGO layers. The high quantity of disorder of the rGO layers may be attributed to eliminating the most oxygen functional groups resulting from the improved carbon lattice structure. The pure PANI exhibited the desired peaks at around 822, 1138, 1322, 1418, and 1591 cm$^{-1}$, which were ascribed to ring deformation of benzene/quinoid rings, C—H bending of the benzene ring, protonated C—N stretching, C=N stretching, and C—C stretching of the benzene/quinoid ring, respectively. The D and G band (402, 404) in the Raman spectra of the ternary composite was slightly shifted to 1326 and 1551 cm$^{-1}$, revealing π-π interaction between the PANI/CS and the rGO nanosheets. In addition, a broad peak at 1043 cm$^{-1}$ and two minor peaks appeared at 926, and 983 cm$^{-1}$ are the representative peaks of the PANI and CS molecules.

Figure 5A:
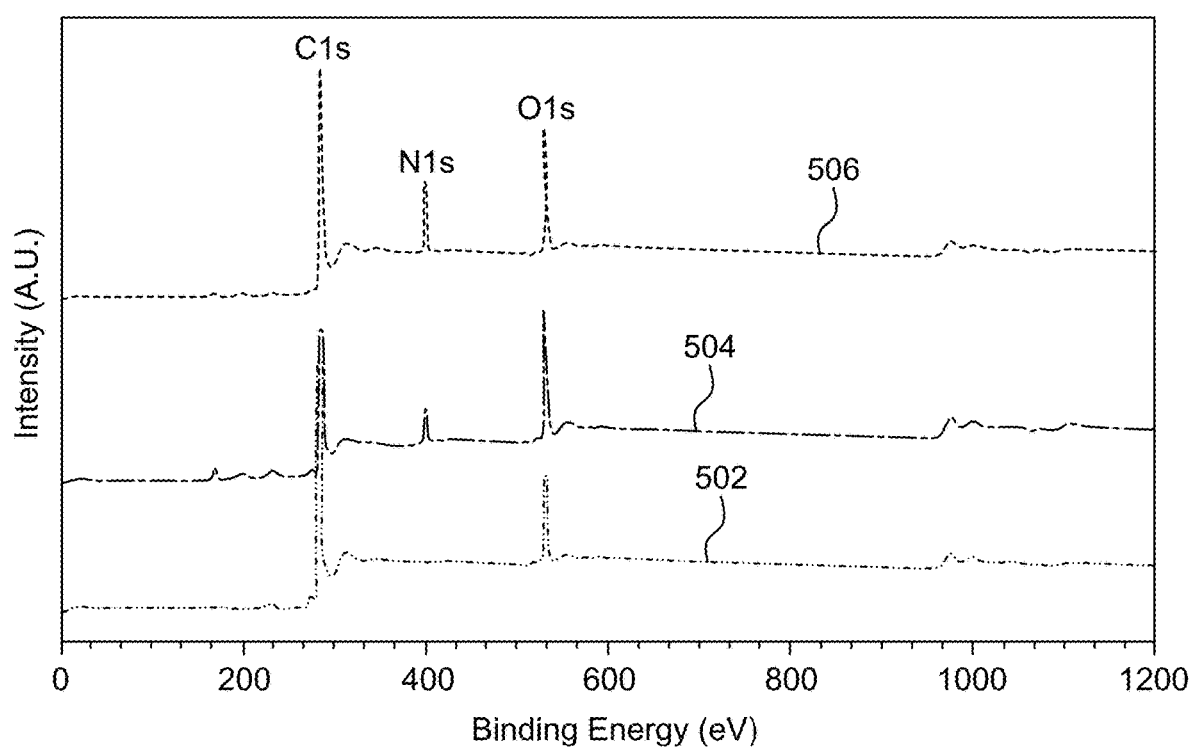
FIG. 5A is a wide scan X-ray Photoelectron Spectroscopic (XPS) spectrum of the rGO, PANI/rGO, and the PANI/CS/rGO, according to certain embodiments.

The constituent elements on the composite surface and chemical bonding in the synthesized binary and ternary nanocomposite were also inspected by the XPS analysis. FIG. 5A presents a wide scan XPS spectra of the rGO (502), PANI/rGO (504), and the PANI/CS/rGO (506) composites. FIG. 5A shows that the rGO spectrum (502) includes C and O as essential components. However, PANI/rGO spectrum (504) and PANI/CS/rGO spectrum (506) show N, attributed to the PANI and CS integration. In addition, the oxygen peak in the wide scan spectrum of the rGO (502) indicated the residual oxygen functionalities even after reducing into the rGO.

Figure 5B:
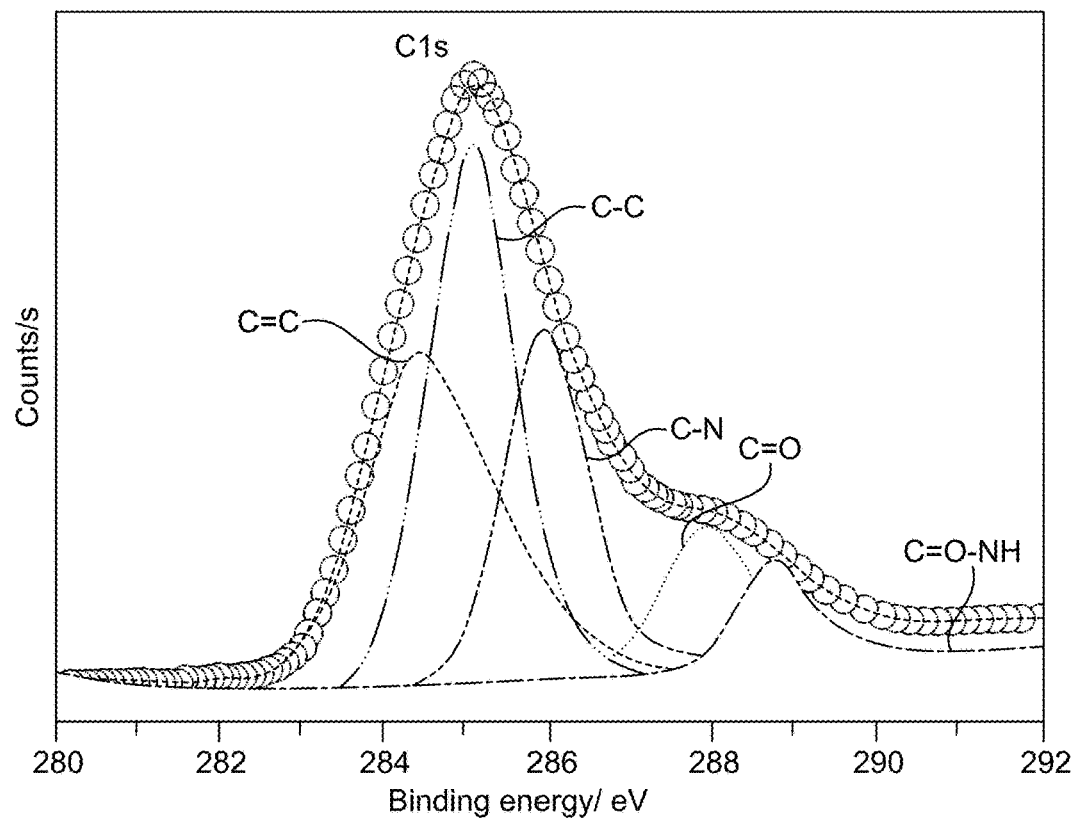
FIG. 5B is an C1s core-level XPS spectrum of the PANI/rGO, according to certain embodiments.
Figure 5C:
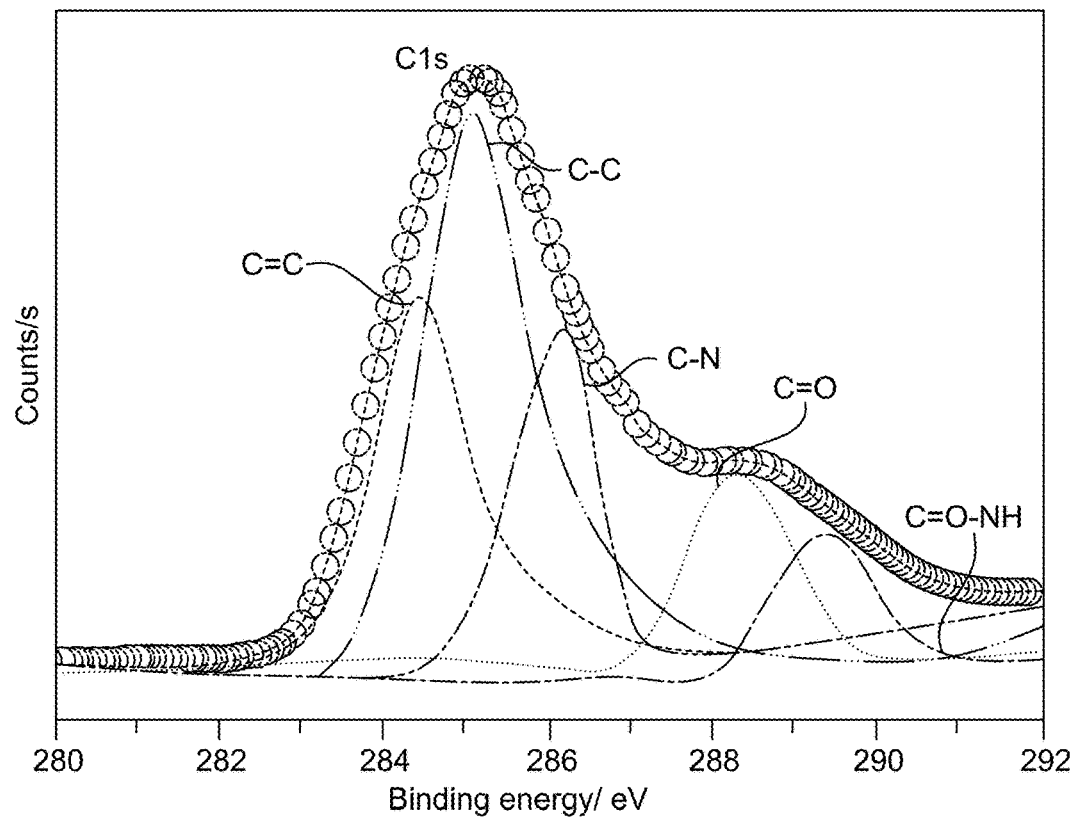
FIG. 5C is the C1s core-level XPS spectrum of the PANI/CS/rGO, according to certain embodiments.

Characteristically, excluding C, N, and O components, additional constituents such as sulfur and chloride are observed in the PANI/rGO and the PANI/CS/rGO composite, attributed to dopants from in situ oxidative polymerization of the aniline using the APS and HCl. The existence of a Cl peak specifies that the PANI in the synthesized nanocomposites was doped with Cl ions. C1s core-level spectra of the PANI/rGO and PANI/CS/rGO (FIG. 5B and FIG. 5C, respectively) were further deconvoluted into five peaks at 284.35, 285.07, 285.94, 287.96, and 288.75 eV, attributed to the C=C, C—C, C—N, C—O, C=O—NH, respectively.

Figure 5D:
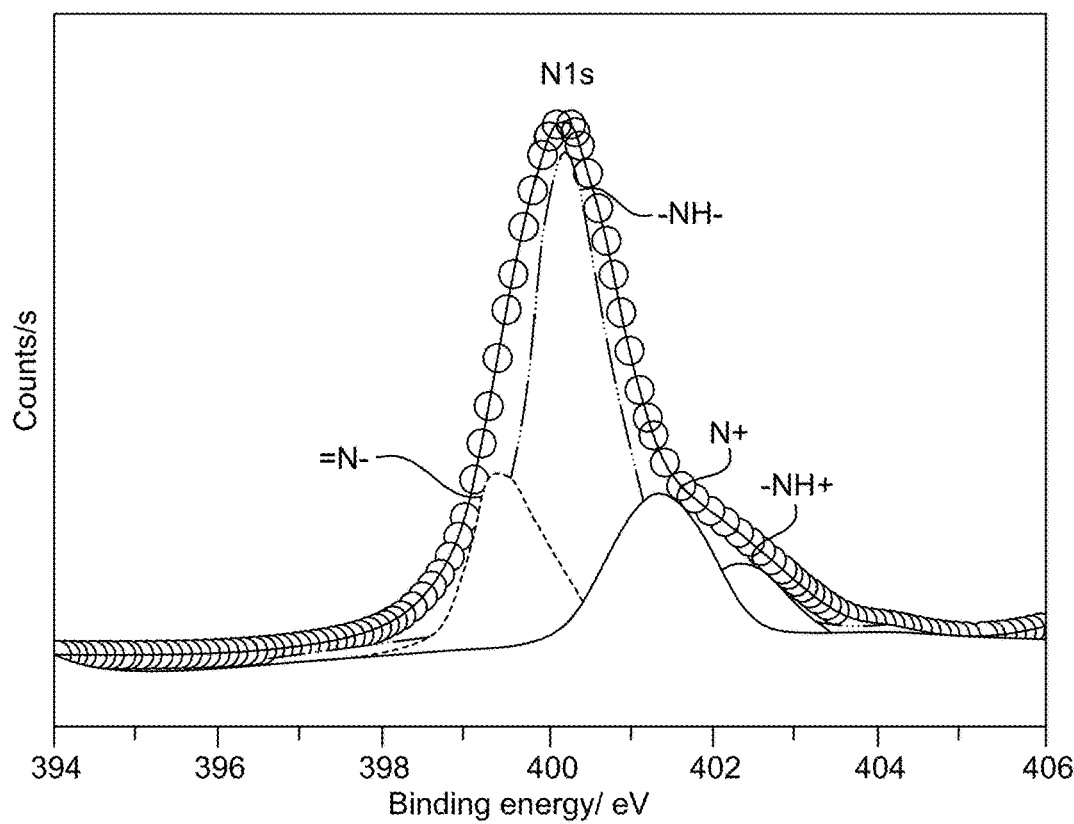
FIG. 5D is an N 1s XPS spectrum of the PANI/rGO, according to certain embodiments.
Figure 5E:
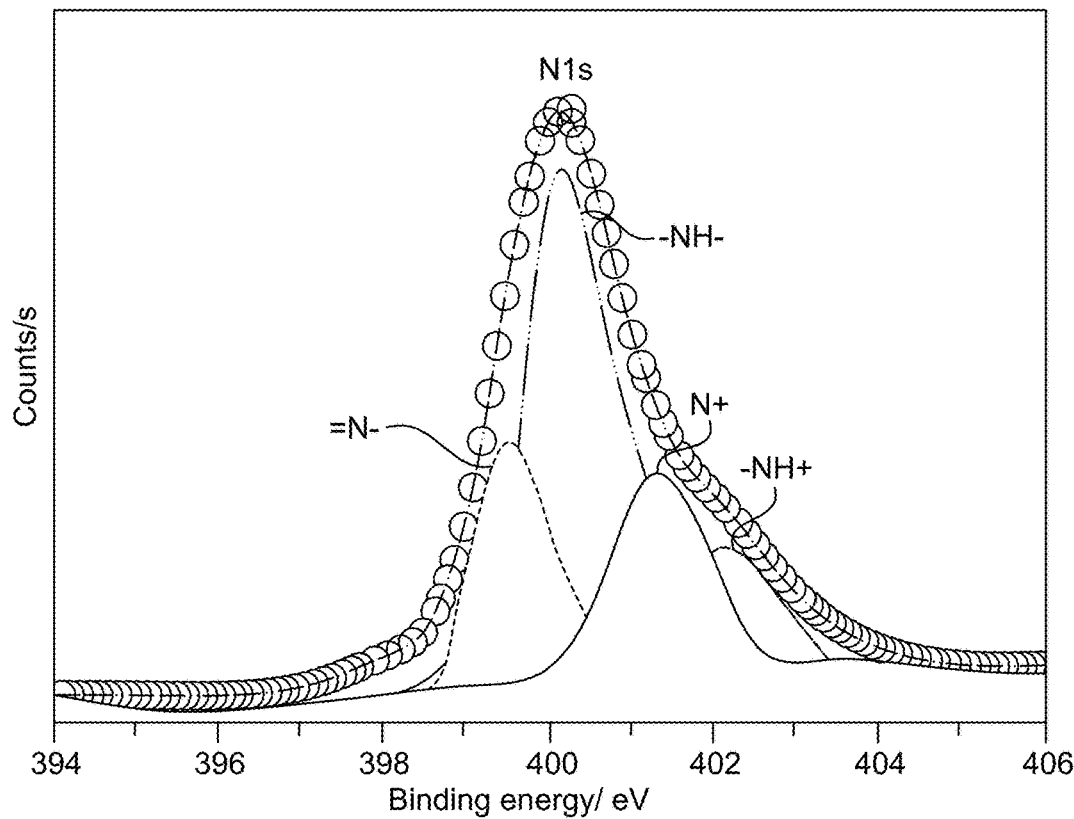
FIG. 5E is the N 1s XPS spectrum of the PANI/CS/rGO, according to certain embodiments.

Moreover, N 1s of the PANI/rGO (FIG. 5D) was further deconvoluted into four peaks at 399.30 eV (=N—, 2.15%), 400.18 eV (—NH—, 74.24%), 401.35 eV (N+, 17.31%), and 402.35 eV (—NH+, 6.30%). Observed amine structures were also obtained in the N 1s spectrum of the PANI/CS/rGO (FIG. 5E) with different quantities of 2.05%, 66.52%, 21.08, and 10.35%, respectively. The amount of positively charged nitrogen in the ternary composite was higher than that of the binary composite, revealing a comparatively higher doping level of the PANI and interactions between the PANI/CS and GO in the ternary composite. Furthermore, the higher doping level of the PANI in the ternary composite is highly desired to improve the corrosion-resistant performance of the PANI chain at the metal/coating interface through doping and de-doping chemistry.

Example 7: Surface Characterization of Prepared Ternary Composites

Figure 6A:
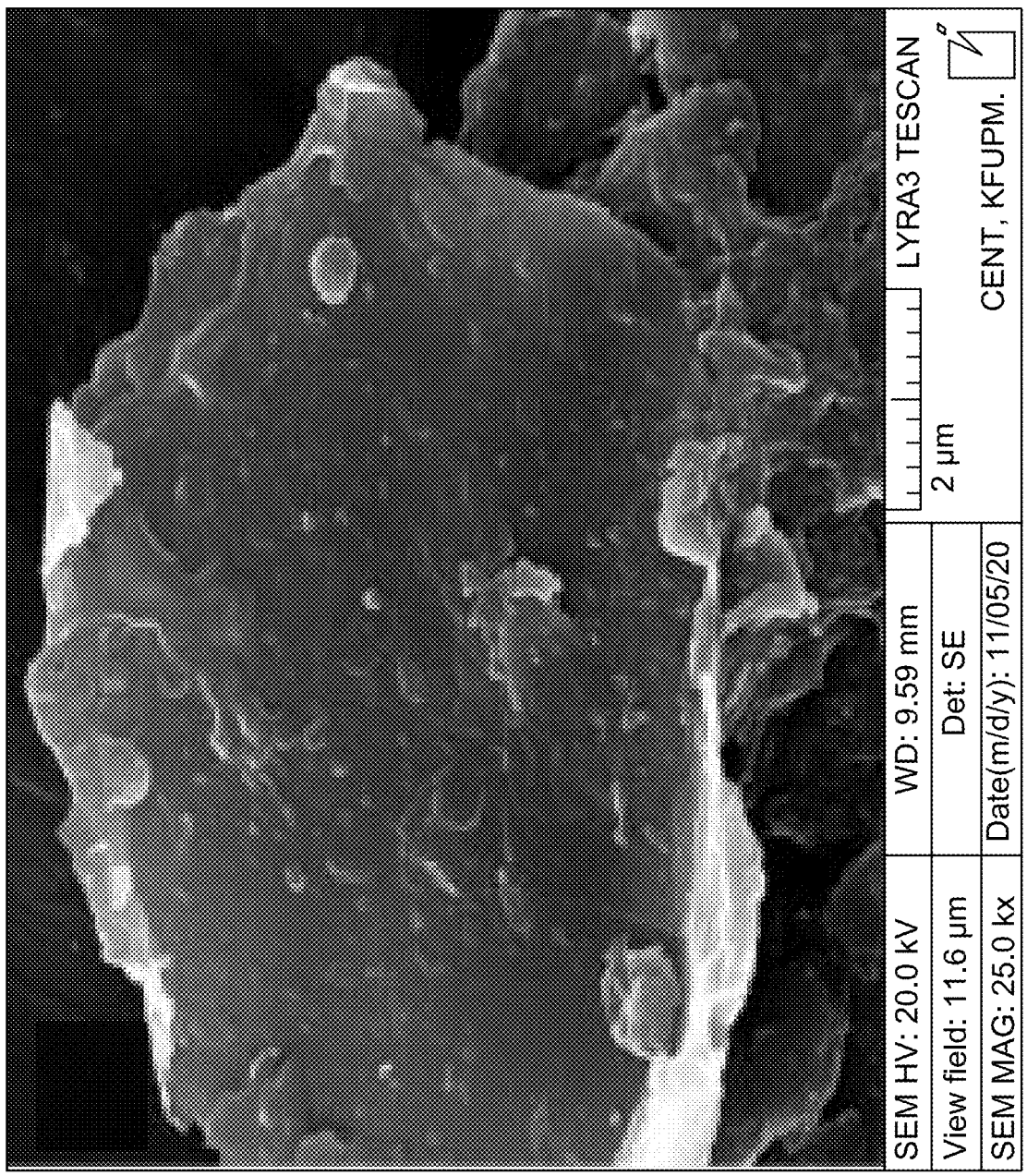
FIG. 6A is a scanning electron microscopy (SEM) image of the rGO, according to certain embodiments.
Figure 6B:
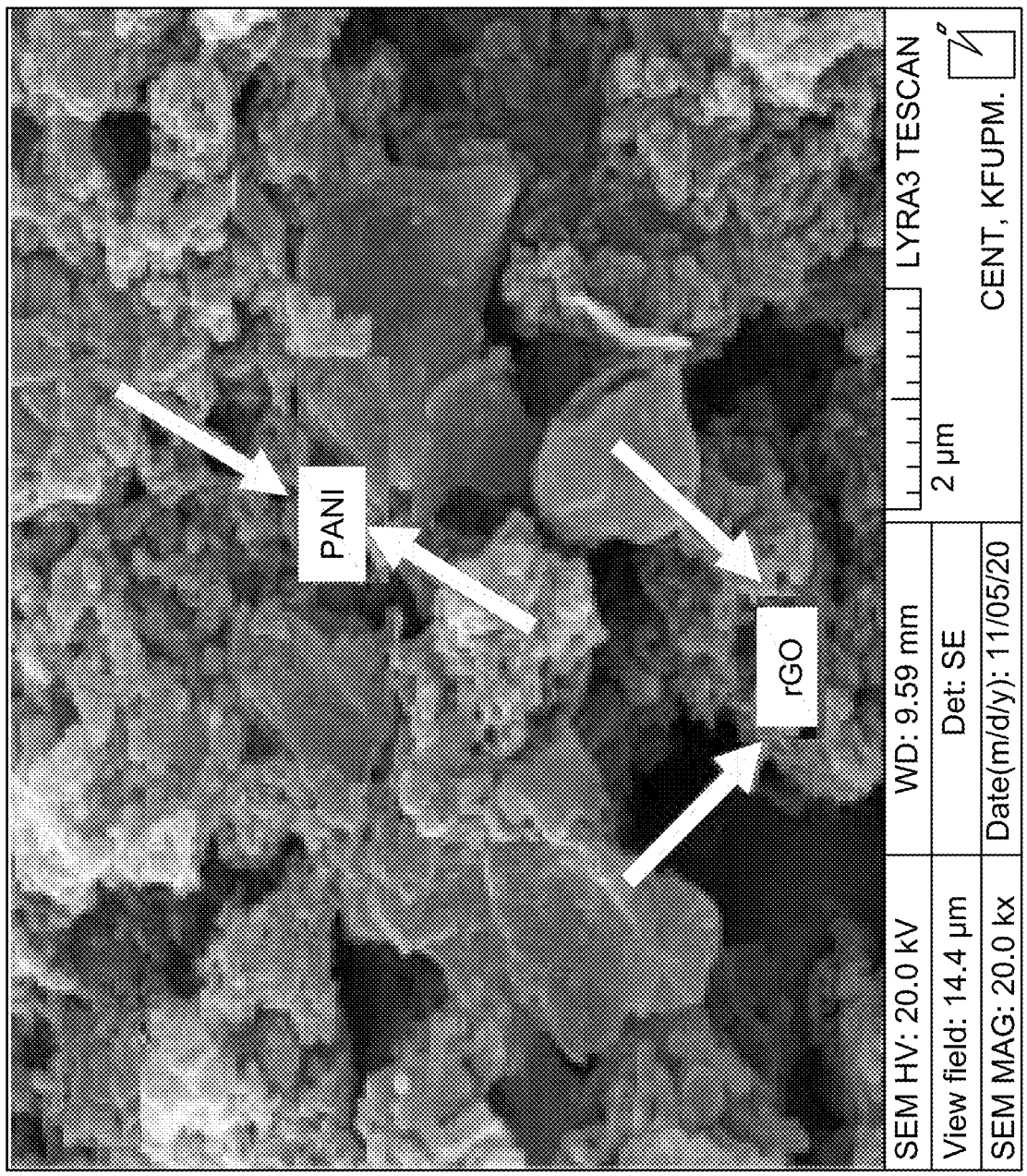
FIG. 6B is the SEM image of the PANI/rGO, according to certain embodiments.
Figure 6C:
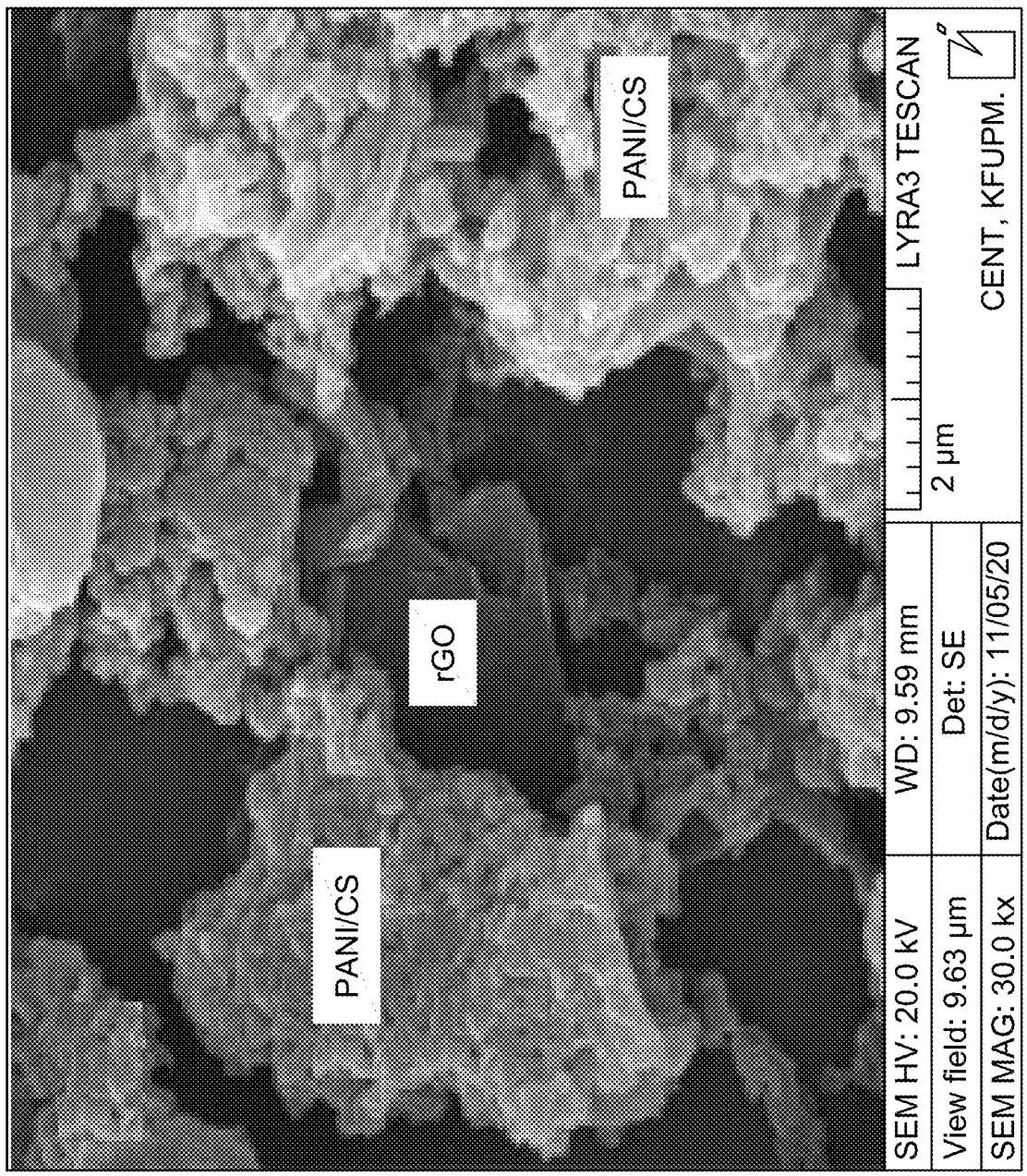
FIG. 6C is the SEM image of the PANI/CS/rGO, according to certain embodiments.
Figure 6D:
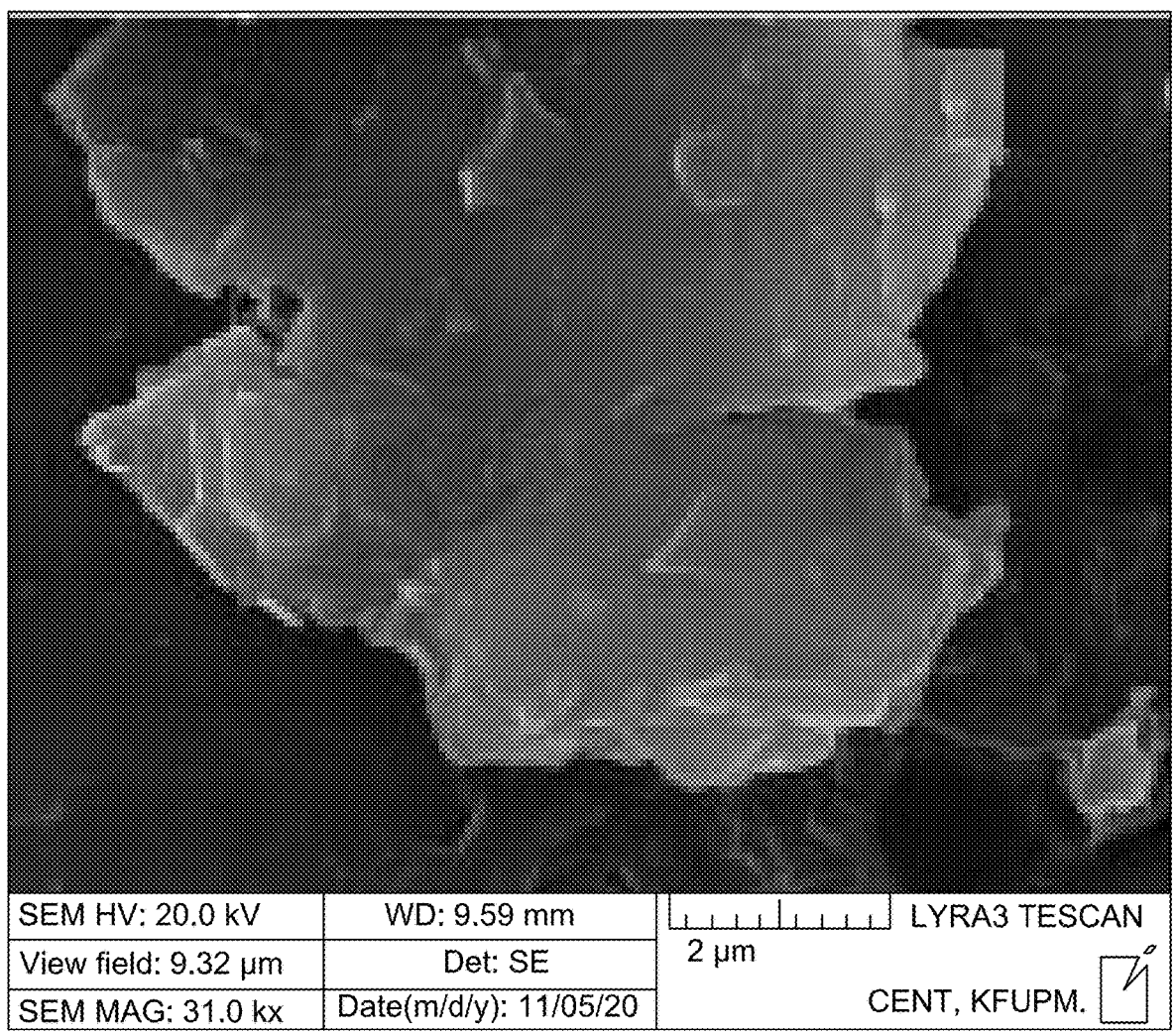
FIG. 6D is the SEM and Energy-dispersive X-ray diffraction spectroscope (EDS) image of the rGO, according to certain embodiments.
Figure 6D:
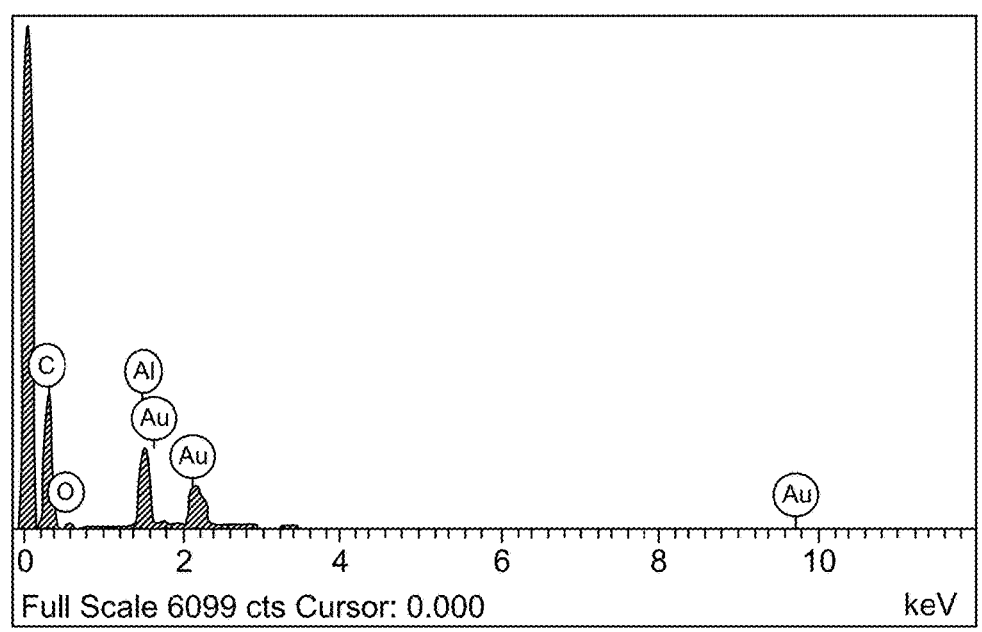
Figure 6E:
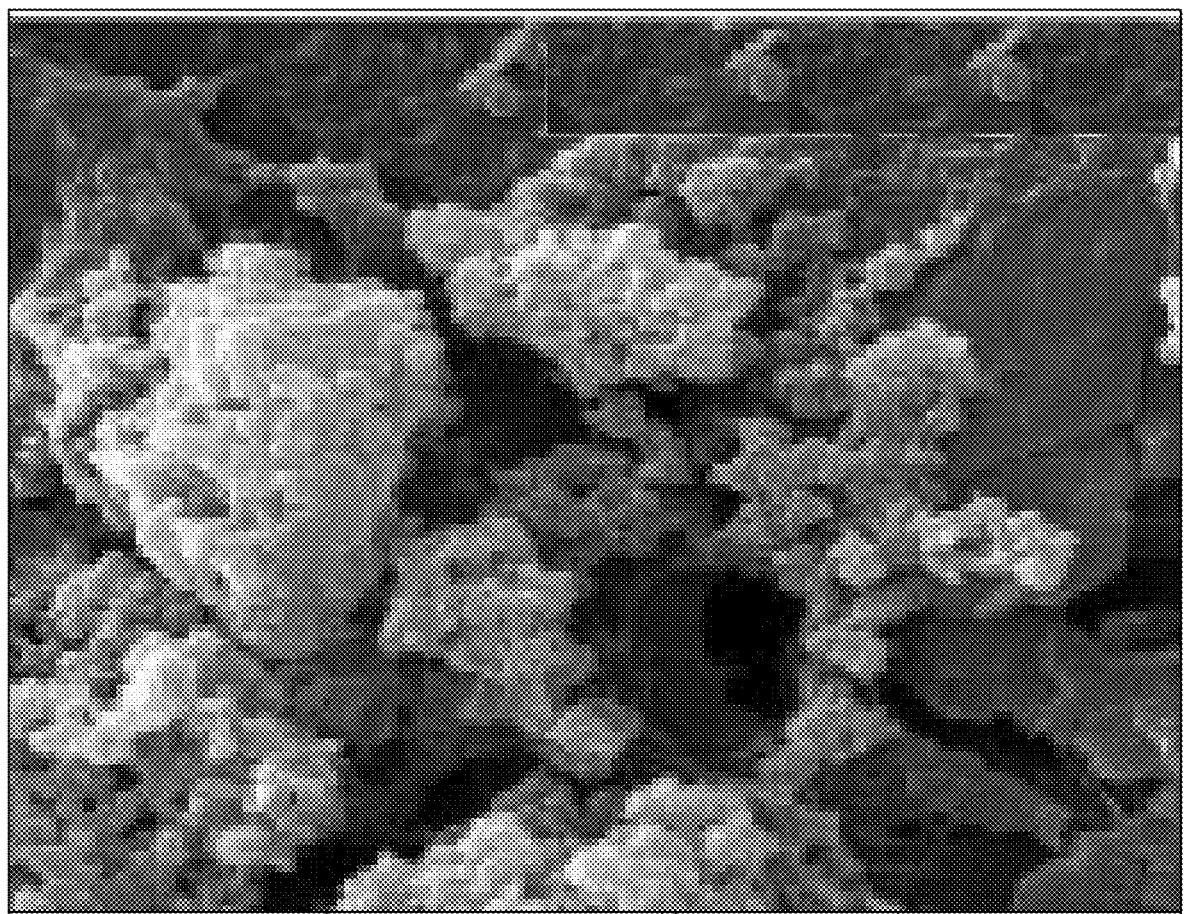
FIG. 6E is the SEM and EDS image of the PANI/rGO, according to certain embodiments.
Figure 6E:
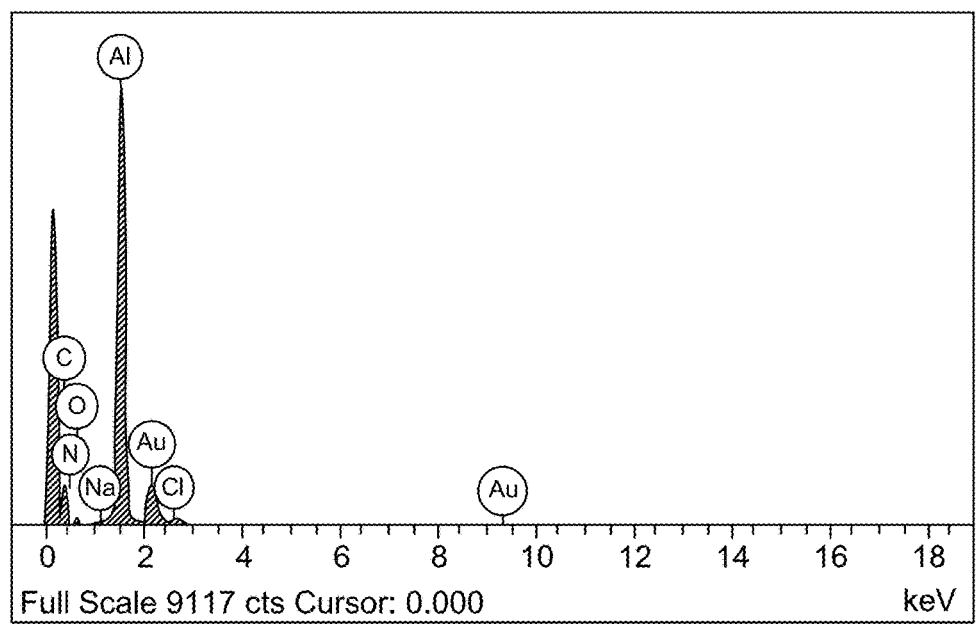
Figure 6F:
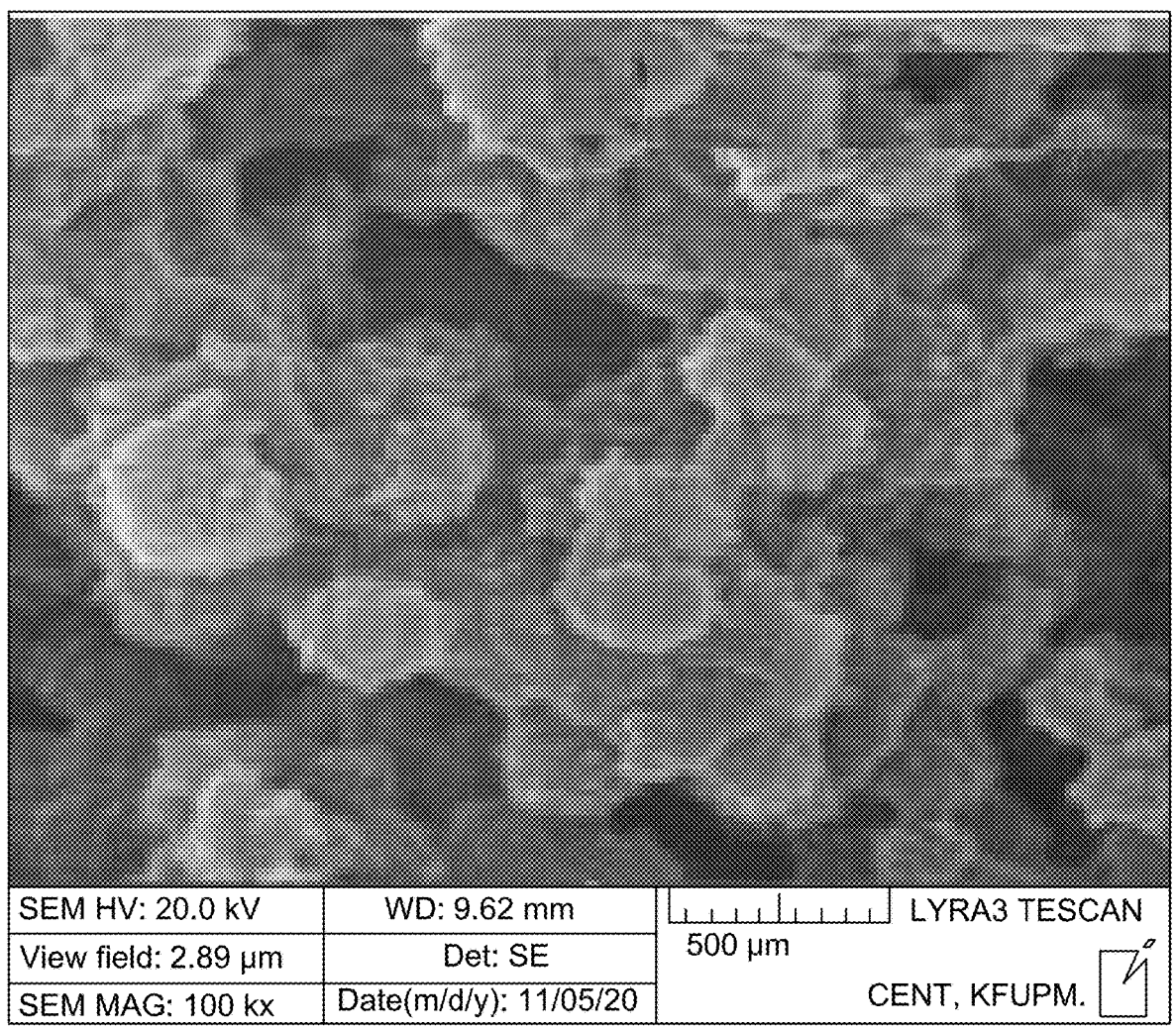
FIG. 6F is the SEM and EDS image of the PANI/CS, according to certain embodiments.
Figure 6F:
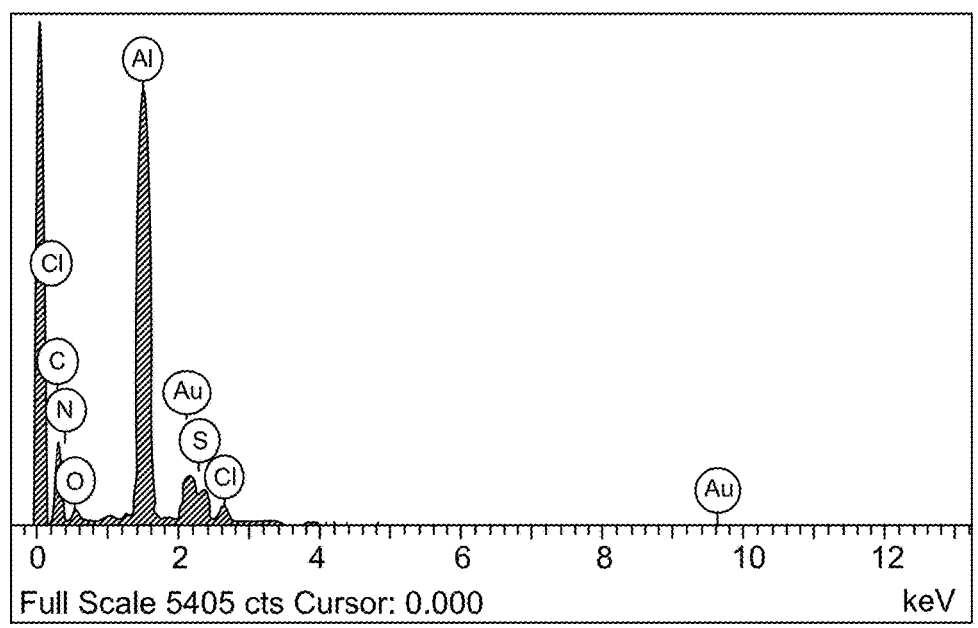
Figure 6G:
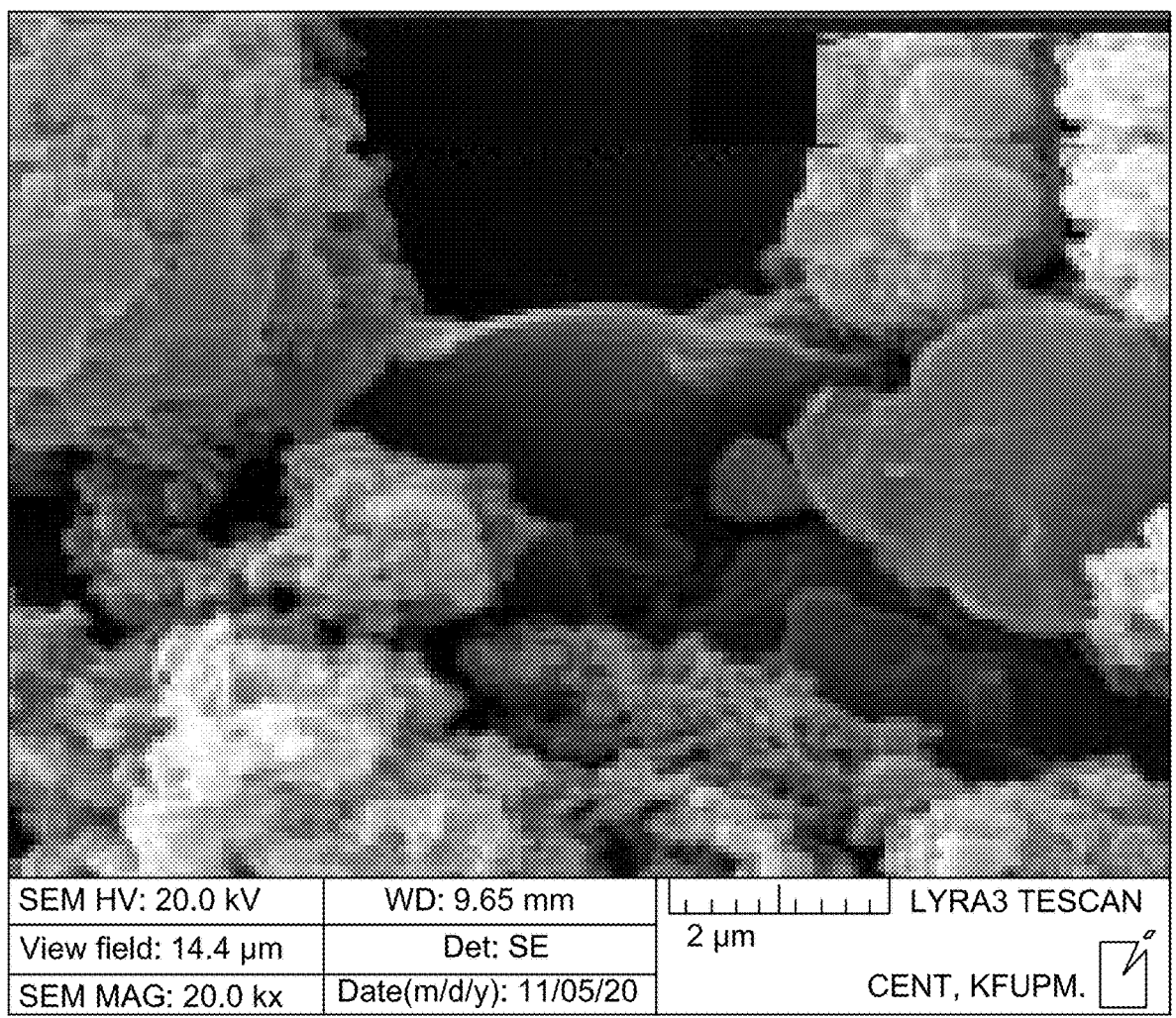
FIG. 6G is the SEM and EDS image of the PANI/CS/rGO, according to certain embodiments.
Figure 6G:
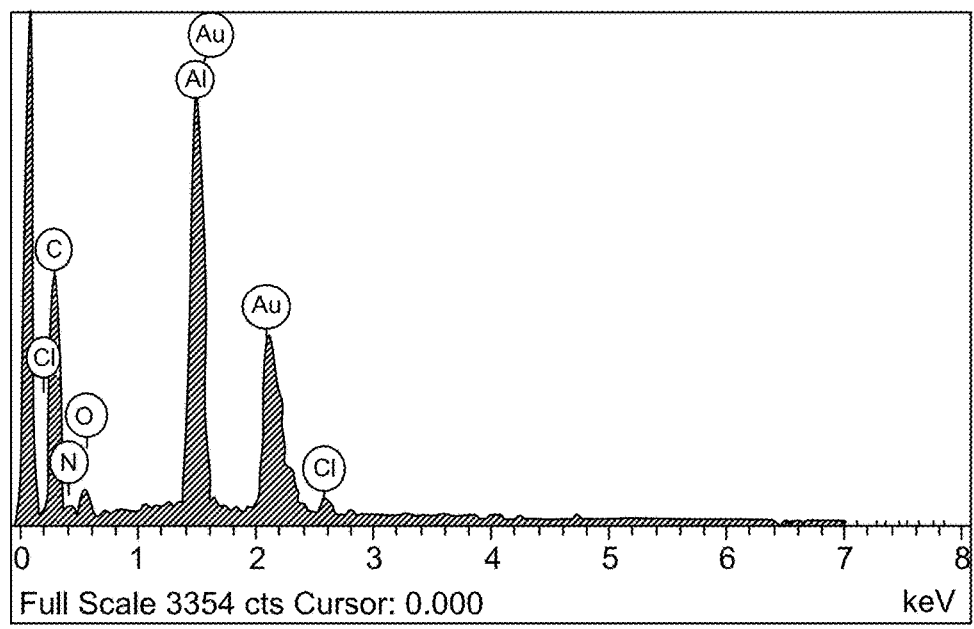

In-situ polymerization of the aniline occurred along with the rGO, and CS was confirmed by monitoring the SEM images of the prepared binary and ternary composites. The SEM images of the rGO, PANI/rGO, and PANI/CS/rGO are presented in FIGS. 6A-6C. The SEM image of the rGO (FIG. 6A) showed 2D layered hierarchical nanosheets with an average thickness of about 10 nm. Arrows indicate the PANI granular-like particles and rGO sheets in the PANI/rGO (FIG. 6B). Unlike the PANI/rGO, the synthesized ternary nanocomposites exhibited irregular globular particle nanofibrillar morphology, which can be ascribed to the influence of the CS and GO nanosheets. Further, the elemental composition of the rGO, PANI/rGO, PANI/CS, and PANI/CS/rGO was examined using the EDS analysis, and the obtained results and the SEM images are given in FIGS. 6D-6G, respectively. The appearance of C and O peaks in the rGO validated the partial reduction of oxygen functional groups on the GO surface. The existence of C, N, O, S, and Cl peaks in the binary and ternary nanocomposites revealed that the prepared composite contains the PANI with the sulfur and chlorides as dopants, as confirmed by the IR results.

Figure 6H:
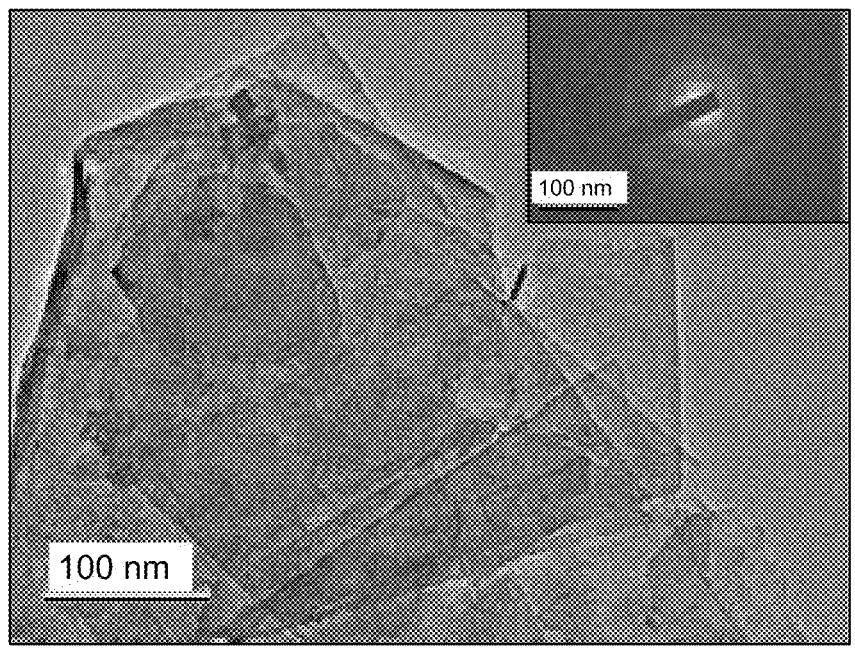
FIG. 6H is a transmission electron microscopic (TEM) image of the rGO, according to certain embodiments.
Figure 6I:
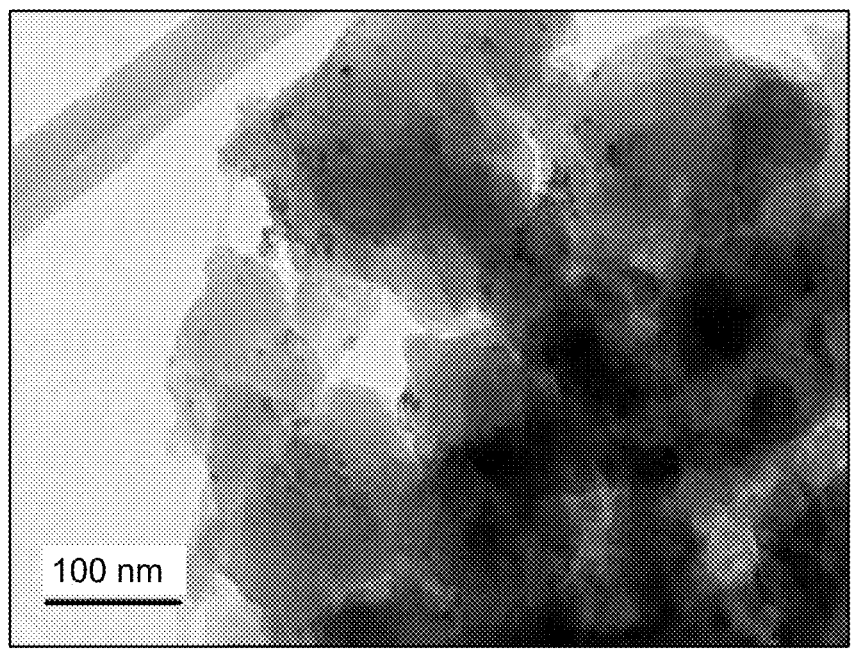
FIG. 6I is the TEM image of the PANI/rGO, according to certain embodiments.
Figure 6J:
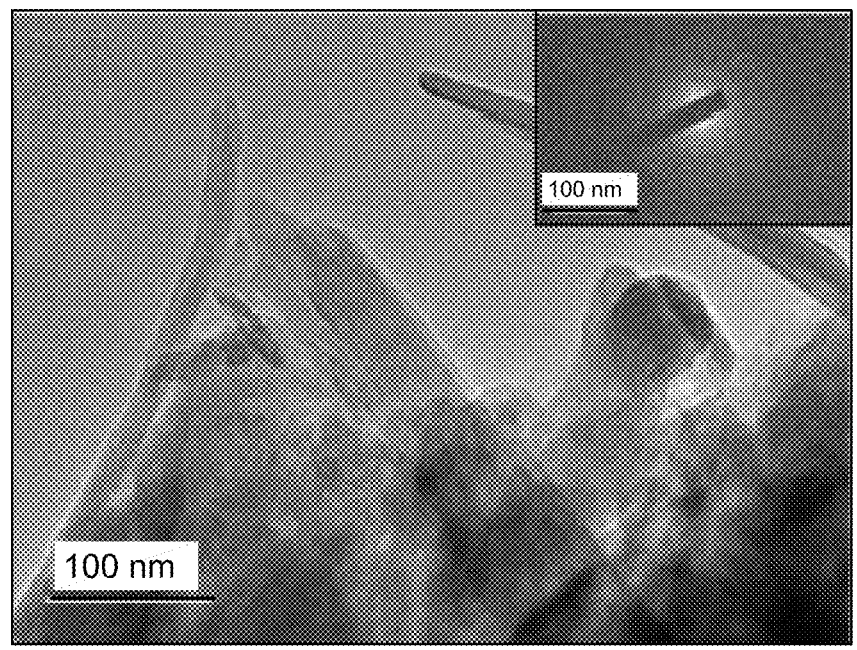
FIG. 6J is the TEM image of the PANI/CS/rGO, according to certain embodiments.

TEM observation was made to obtain surface microstructures of the binary and ternary nanocomposites. The obtained TEM micrographs are depicted in FIGS. 6H-6J. The TEM image of the rGO (FIG. 6H) revealed that the rGO was made up of wrinkled nanosheets stacked on top of each other, and the thickness of the wrinkled nanosheets was less than 10 nm. The selected area electron diffraction (SAED) pattern (inset in FIG. 6H) revealed the crystal structure of the rGO, and the diffraction rings illustrated that the prepared rGO exhibited turbostratic stacking. FIG. 6J shows that the PANI was uniformly deposited on the rGO surface, and the subsequent PANI/rGO turn opaquer than the rGO, which can be attributed to the PANI deposits and the slight accumulation of the rGO sheets. In addition, the PANI in the ternary composites (FIG. 6G) showed a 3D network structure, and opacity is relatively reduced. The 3D network structure is particularly beneficial as a nanofiller in polymeric coatings to restrict the permeation of corrosive species from an electrolyte.

Example 8: Water Contact Angle Analysis

Figure 7:
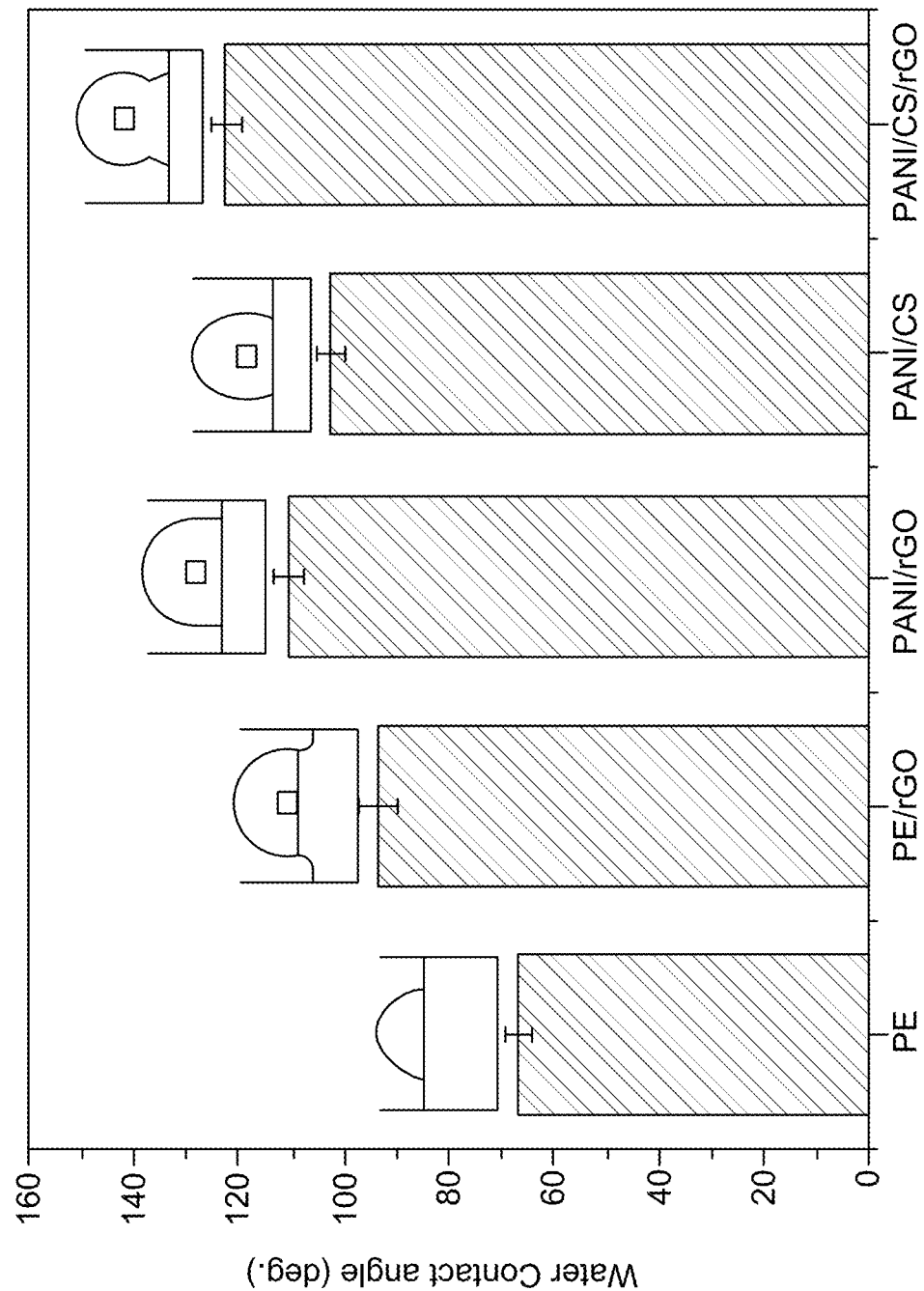
FIG. 7 is a graph depicting a water contact angle (WCA) of various nanocomposites, according to certain embodiments.

Protective coatings holding hydrophobic surfaces are generally effective against corrosion compared to coatings with a less hydrophobic surface. Thus, a correlation between the surface wettability and corrosion-resistant behavior was necessary to attain comprehensive evidence of the coating performance in an unfavorable environment. The surface wettability of different coatings was evaluated using contact angle (CA) experiments, and the obtained result is presented in FIG. 7. From the CA results, it can be understood that the reinforcement of the binary and ternary composites exhibited an essential impact on the wettability of coated samples. Pure epoxy-coated steel showed a CA value of 65°, indicating a weaker hydrophobic surface. However, upon the addition of the binary and ternary nanocomposite into the epoxy coatings, the value of the CA increased remarkably; the PANI/CS/rGO exhibited the highest CA value of 118°. The chemical composition of the surface is effectively altered by reinforcing the binary and ternary composites into the epoxy coatings, which may cause significant variation in the wettability of the coatings. In particular, the epoxy coatings containing the PANI/CS/rGO nanocomposite showed the highest CA among the investigated samples, which can be attributed to the synergetic effect between the constituents and alteration of the constituents on the surface chemistry of resultant epoxy coatings. Hence, the primary stage of corrosion, that is absorption of electrolyte on the surface of the coating, is efficiently hindered on epoxy nanocomposites coatings, and considerable improvement can occur based on its corrosion protective performance.

Example 9: Evaluation of Adhesion Strength of Coated MS Substrates

Figure 8:
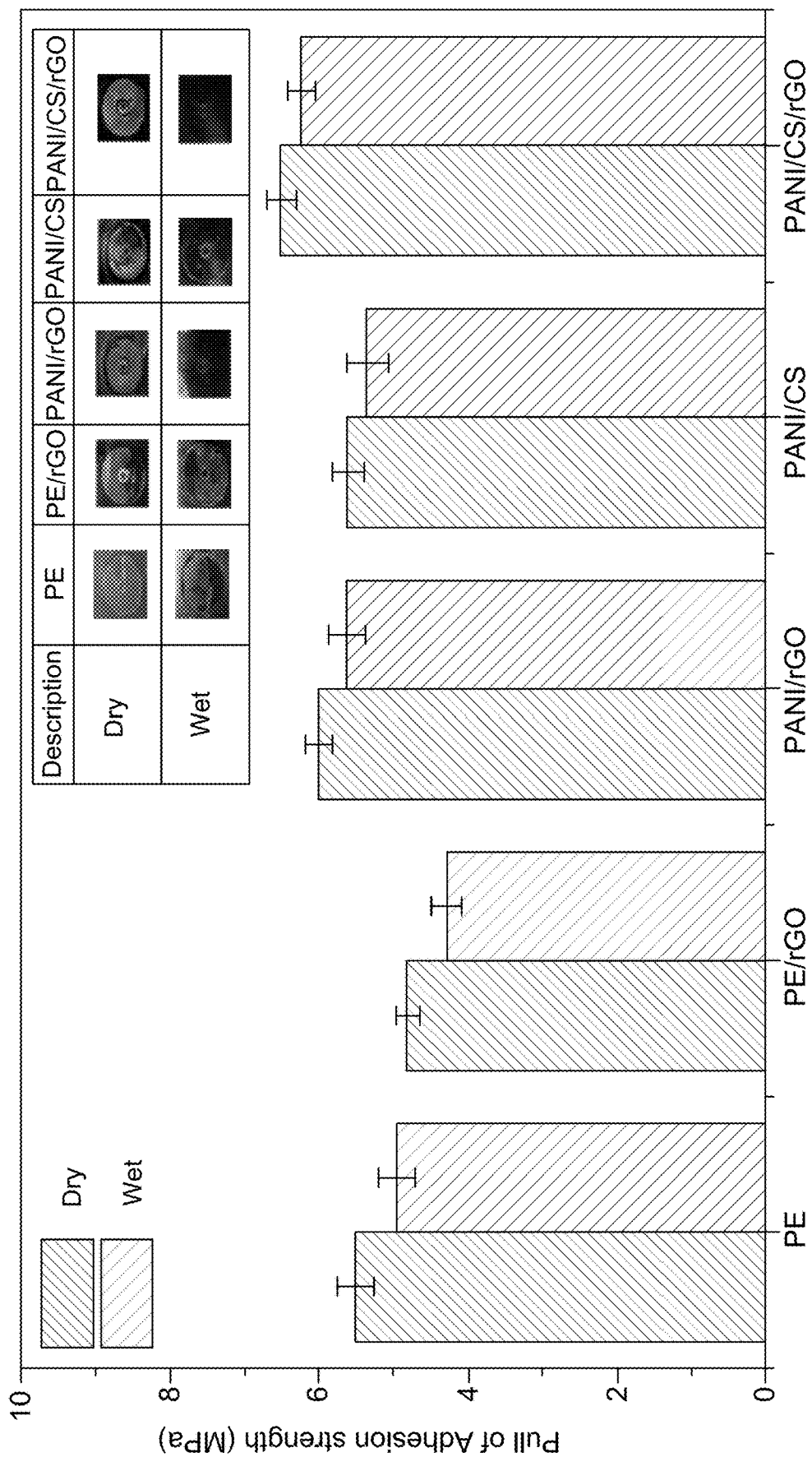
FIG. 8 is a graph depicting an adhesion strength of the various nanocomposites on mild steel (MS) substrates, according to certain embodiments.

The adhesion strengths of the coated substrates were investigated in both dry (before immersion) and wet (after immersion) conditions by a pull-off method, and the obtained results are presented in FIG. 8. Before immersion, the adhesion strength of the PE coating is found to be about 5.50 MPa. With the reinforcement of the rGO, the adhesion force of the PE coating is slightly decreased by 12.7%, which can be attributed to the heterogeneous distribution of the rGO inside the epoxy matrix. The obtained results (FIG. 8) revealed that cohesive and adhesive failures triggered the PE coating detachment from the steel surface. Generally, the cohesive failure happens while the adhesion strength of coatings to the steel surface is strong and adequate that the applied force overcomes the cohesive force of the coating.

In contrast, adhesion failure occurs when an interfacial adhesion strength is not efficiently strong. A mixture of the cohesive and adhesive failures can also be observed while the coating is neither adequate to fail cohesively nor weak to fail adhesively. Homogeneous reinforcement of nanomaterials (such as the PANI/CS/rGO) on the polymeric coatings may possess the capacity to seal micro defects (including pores, cracks, and voids) of the coating. After the reinforcement of the PANI/rGO and PANI/CS/rGO, the adhesion strength of the coating is conversely raised to about 9.1% and 18.2%, which is comparatively higher than that of the PE coating. The present enhancement of the adhesion strength may be ascribed to the homogeneous dispersion of nanocomposite materials into the epoxy coating. After 45 days of exposure to the NaCl solution, the adhesion strength of all investigated coated substrates shows a certain degree of decrease, revealing that the permeation of electrolytic species significantly influenced the bonding strength between coating and substrate. However, the adhesion strength of the ternary coating is much higher than that of the pure epoxy and binary coating in both dry and wet states. The adhesion strength loss (ASL %) of the sample was calculated by a relation, ASL (%)=(ΓD−ΓW)/ΓD×100%. In the present relation, ΓD and ΓW represent dry-adhesion and wet-adhesion magnitudes. The calculated ASL % results for the coated MS substrates are displayed in Table 1.

TABLE 1

Adhesion test results of coated substrates after and before corrosion test in 3.5% NaCl medium

| Samples | Dry adhesion (ΓD) | Wet adhesion (ΓW) | Adhesion strength loss (ASL %) |
| --- | --- | --- | --- |
| PE | 5.5 | 4.95 | 10 |
| PE/rGO | 4.8 | 4.28 | 10.83 |
| PANI/rGO | 6 | 5.63 | 6.16 |
| PANI/CS | 5.6 | 5.34 | 4.64 |
| PANI/CS/rGO | 6.5 | 6.23 | 4.15 |

Table 1 shows that the reinforcement of the PANI/CS/rGO into the epoxy coating enhances the adhesion strength of the coatings, which may be attributed to efficient compatibility of the PANI/CS/rGO with the epoxy matrix and improved interaction between functional polar groups of epoxies with the steel interface.

Figure 9A:
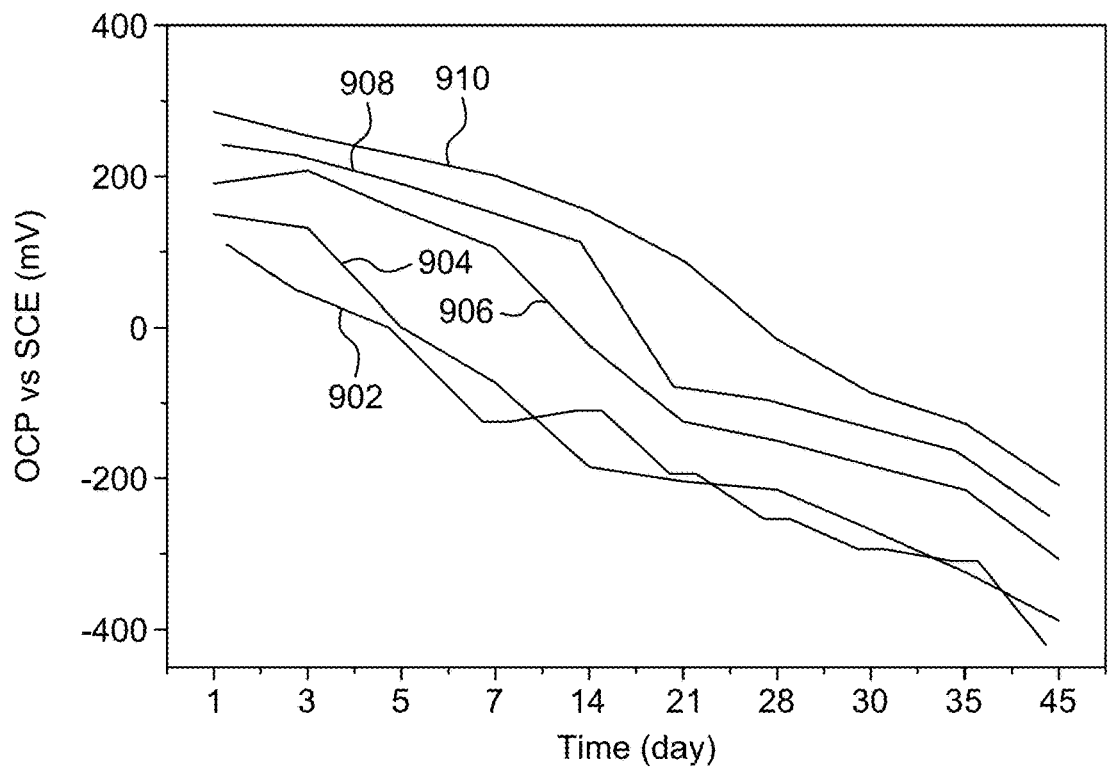
FIG. 9A is a graph depicting an open circuit potential (OCP) of the various nanocomposites on the MS substrates w.r.t time, according to certain embodiments.

Example 10: Electrochemical Corrosion Performance of the Epoxy Ternary Composite Coating The OCP and polarization resistance (Rp) values of the studied coated MS substrates were monitored during the immersion of 45 days using linear polarization resistance measurements and plotted as a function of an immersion time in FIGS. 9A-9B, respectively. FIG. 9A shows the OCP values of PE (902), PE/rGO (904), PANI/CS (906), PANI/rGO (908), PANI/CS/rGO (910) coatings. The OCP values of the samples shifted to a negative direction with an increase in immersion time, which revealed that the corrosive ions penetrated the epoxy coating and arrived at the coating/metal interface. The OCP value of the PE coating (902) shifted from 0.11 V (1 day) to −0.420 V (45 days) during immersion in the NaCl solution. Reinforcement of the synthesized binary and ternary composites led to the improved OCP value. FIG. 9A also shows that a variable rate on the OCP for the ternary epoxy coatings was less than pure epoxy and epoxy binary samples.

Figure 9B:
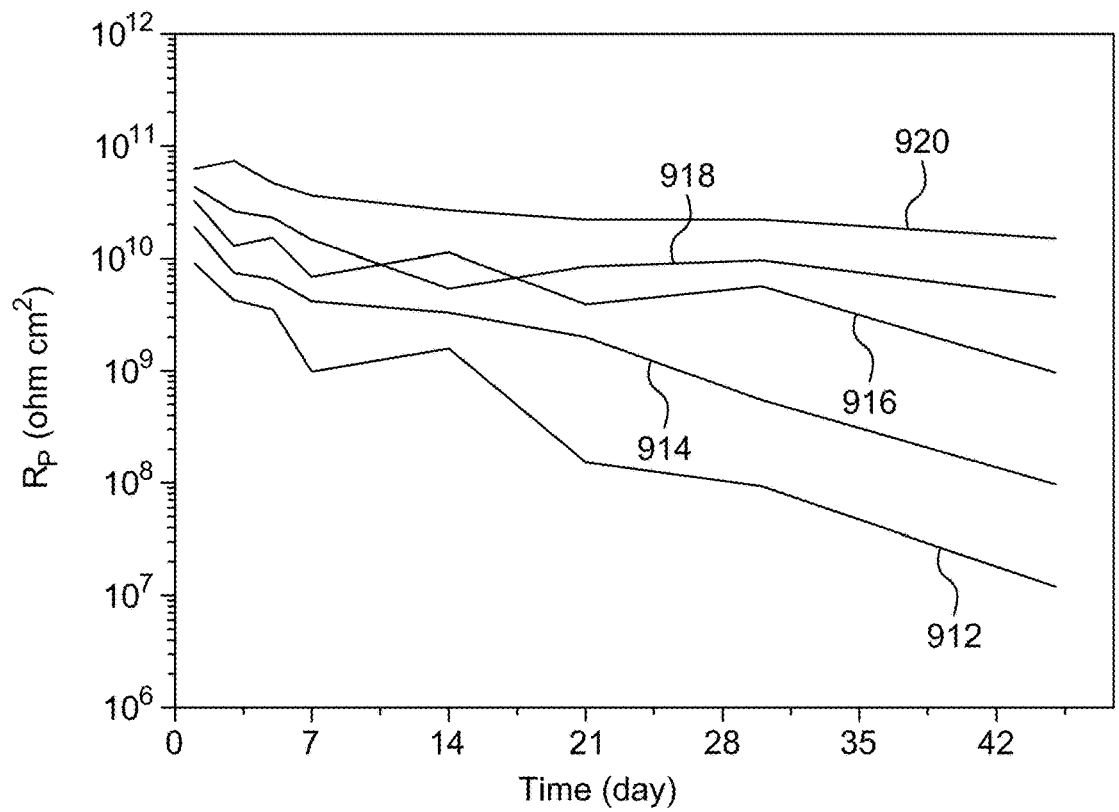
FIG. 9B is a graph depicting polarization resistance (Rp) of the various nanocomposites on the MS substrates w.r.t time, according to certain embodiments.

FIG. 9B refers to a plot of Rp values of the coated MS substrates as a function of the immersion time. FIG. 9B shows the Rp values of PE (912), PE/rGO (914), PANI/CS (916), PANI/rGO (918), PANI/CS/rGO (920) coatings. The Rp values increased significantly with the reinforcement of the binary and ternary nanocomposite. However, the rGO addition on the epoxy coatings exhibited almost similar Rp values, revealing that the rGO does not alter the barrier performance of the epoxy coatings. The similar values may be attributed to agglomerated and heterogeneous distribution of the rGO inside the polymer matrix. The Rp values of the PE coatings decreased on prolonged exposure, and the percentage variation was found to be comparatively lesser for the binary and ternary nanocomposite coatings. The results indicate that the reinforcement of the binary and ternary nanocomposite confirms an improved barrier characteristic compared to the pure PE coatings. The improvement may be attributed to the PANI/CS/rGO in the epoxy coating, causing an enhancement of barrier features and, subsequently, reduced diffusion of corrosive ions towards the base substrate.

Figure 10A:
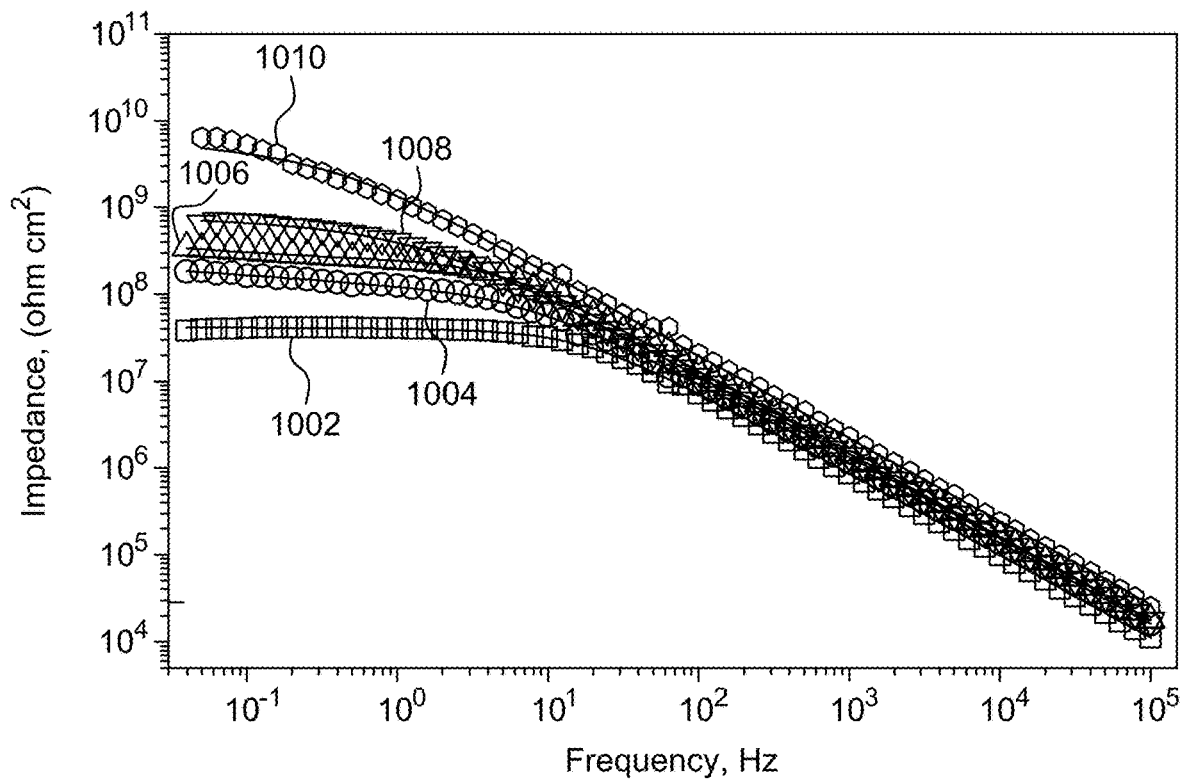
FIG. 10A is a bode plot depicting the impedance modulus of the various nanocomposites on the MS substrates w.r.t frequency, according to certain embodiments.
Figure 10B:
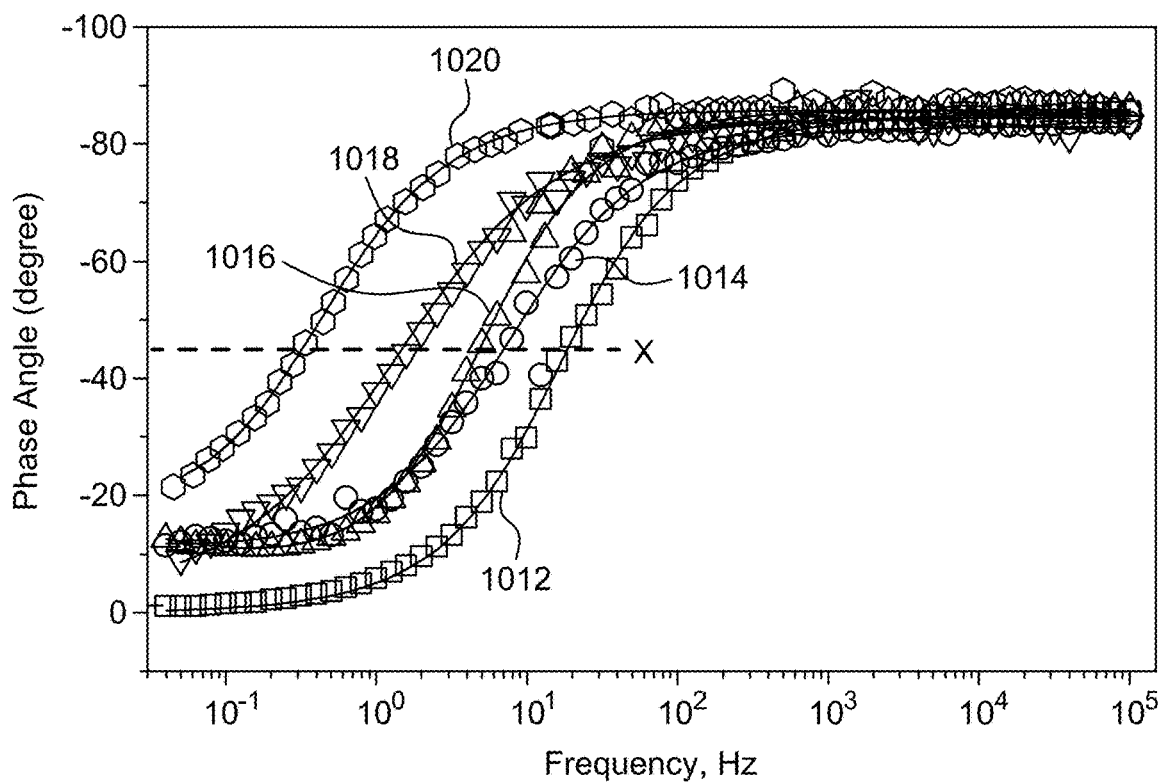
FIG. 10B is a bode plot depicting the phase angle of the various nanocomposites on the MS substrates w.r.t frequency, according to certain embodiments.
Figure 11A:
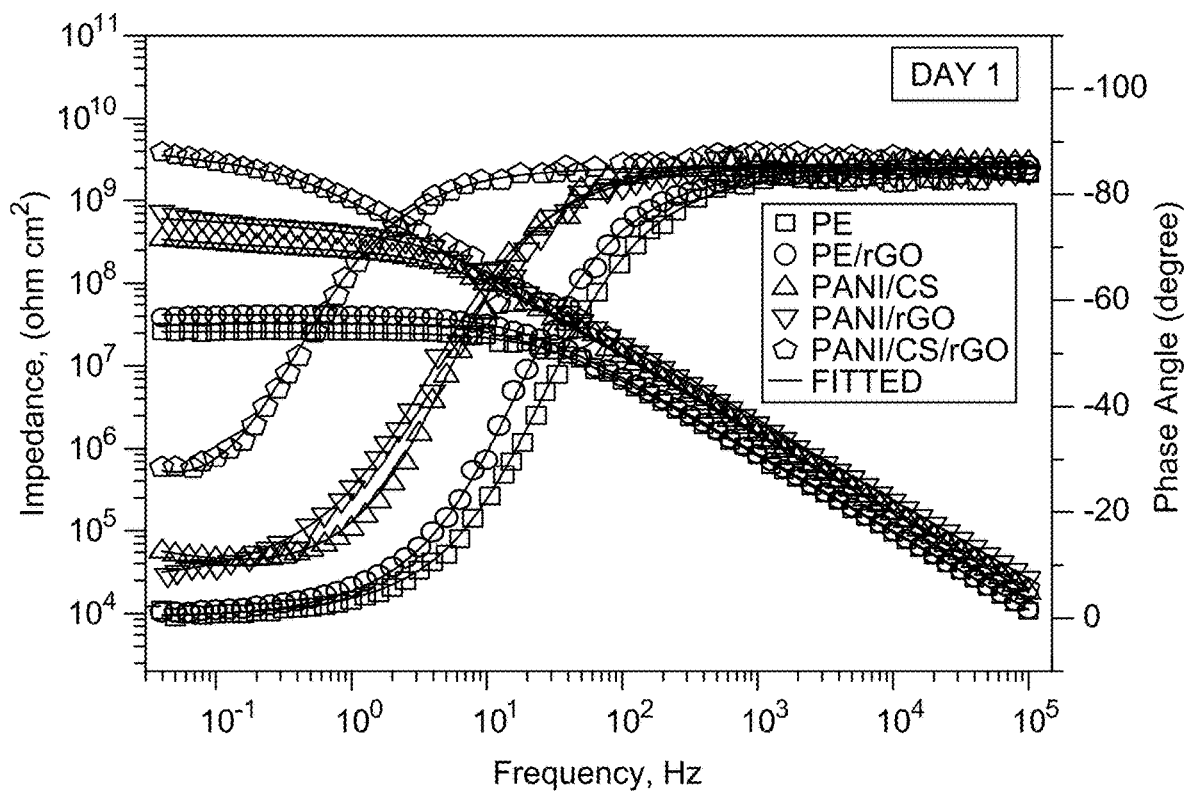
FIGS. 11A-11F depict bode plots of the various nanocomposites on the MS substrates during the 45 days of immersion in NaCl solution, according to certain embodiments.
Figure 11B:
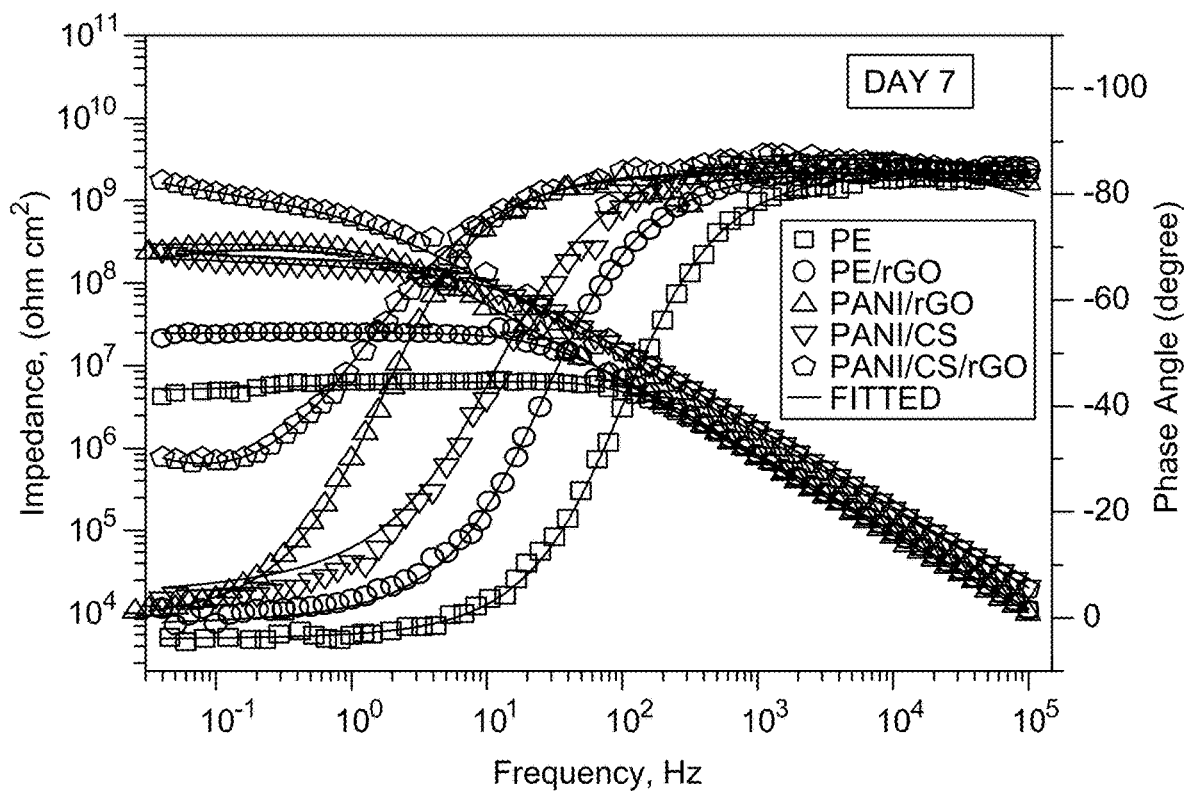
Figure 11C:
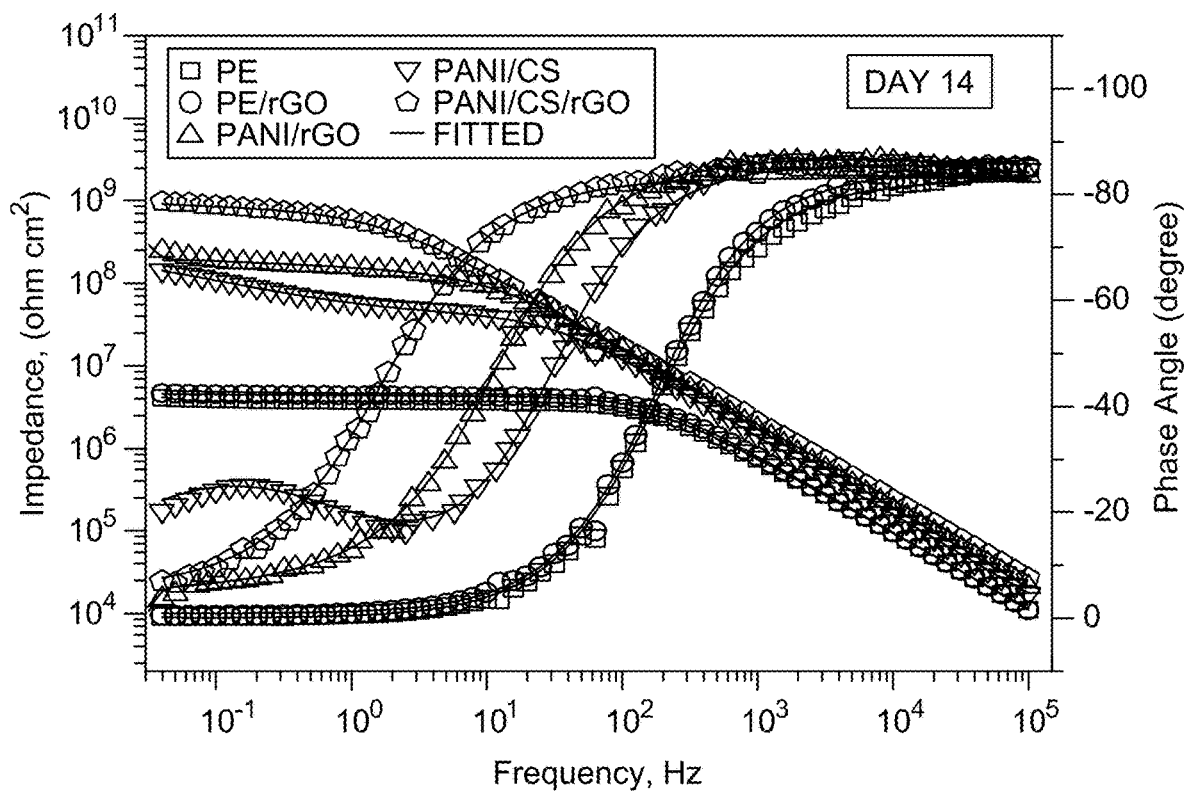
Figure 11D:
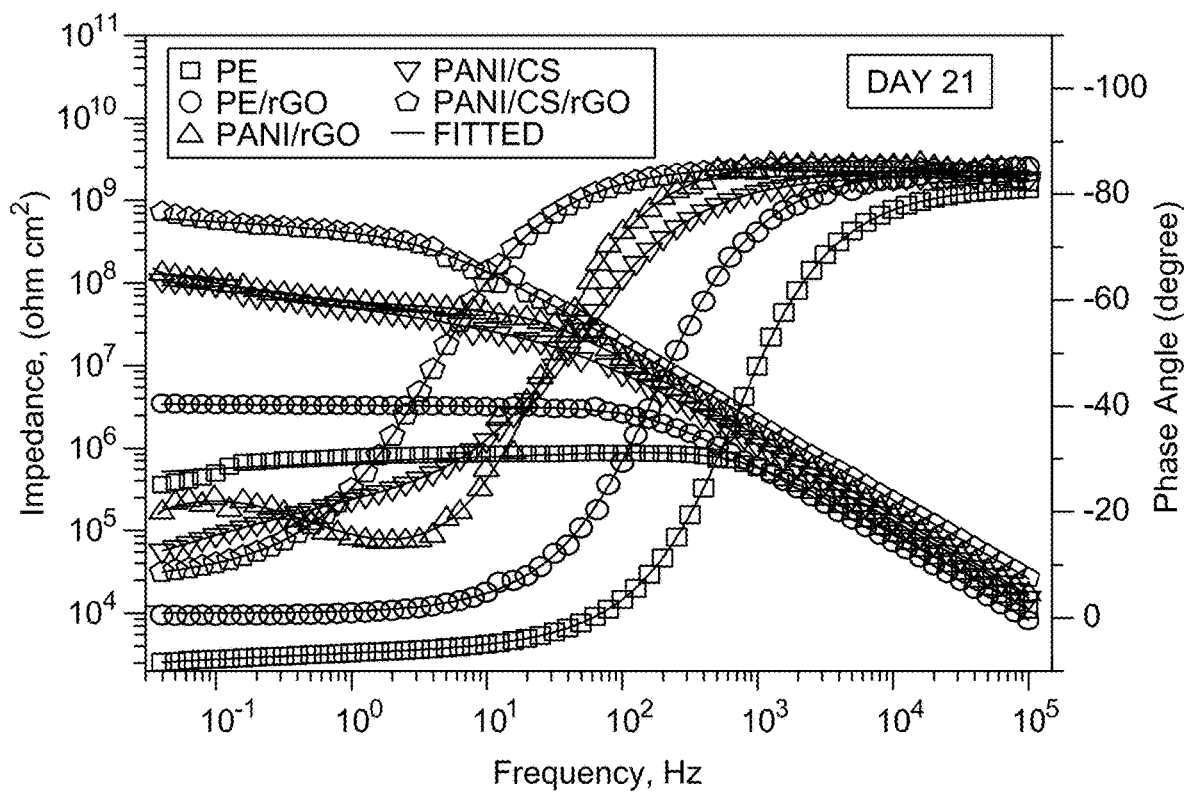
Figure 11E:
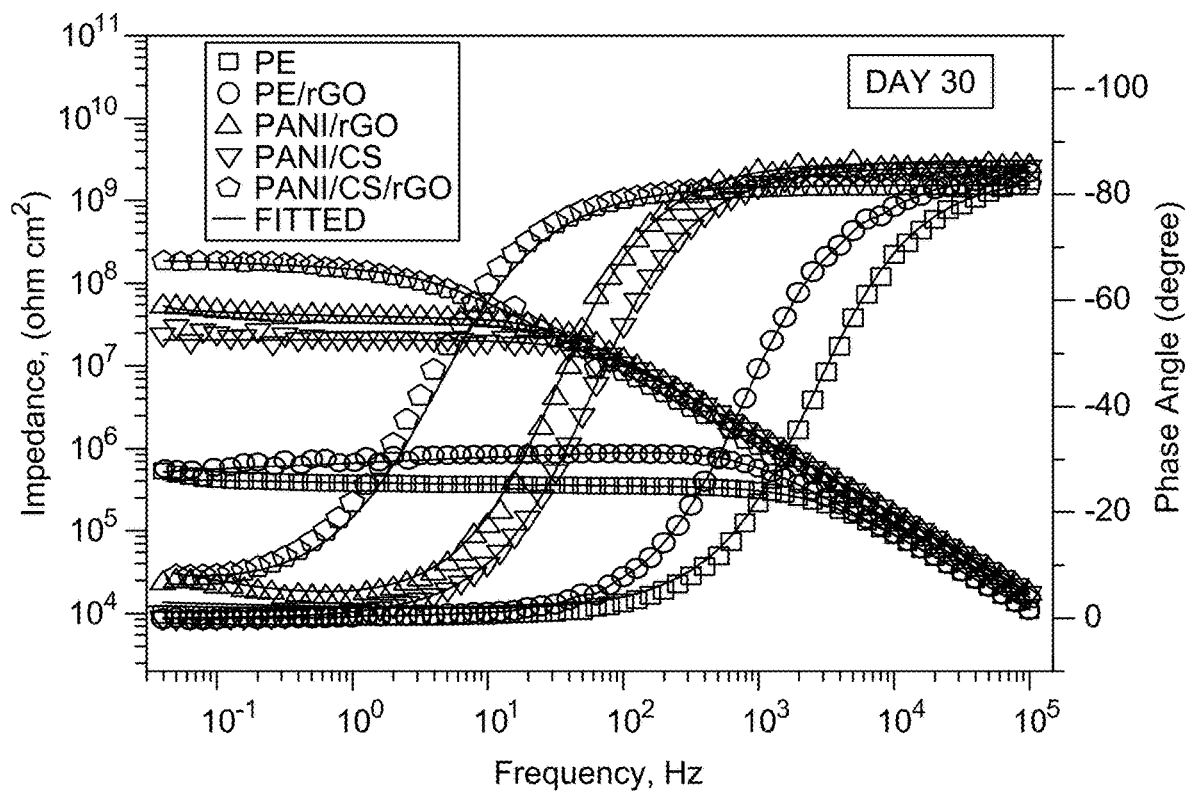
Figure 11F:
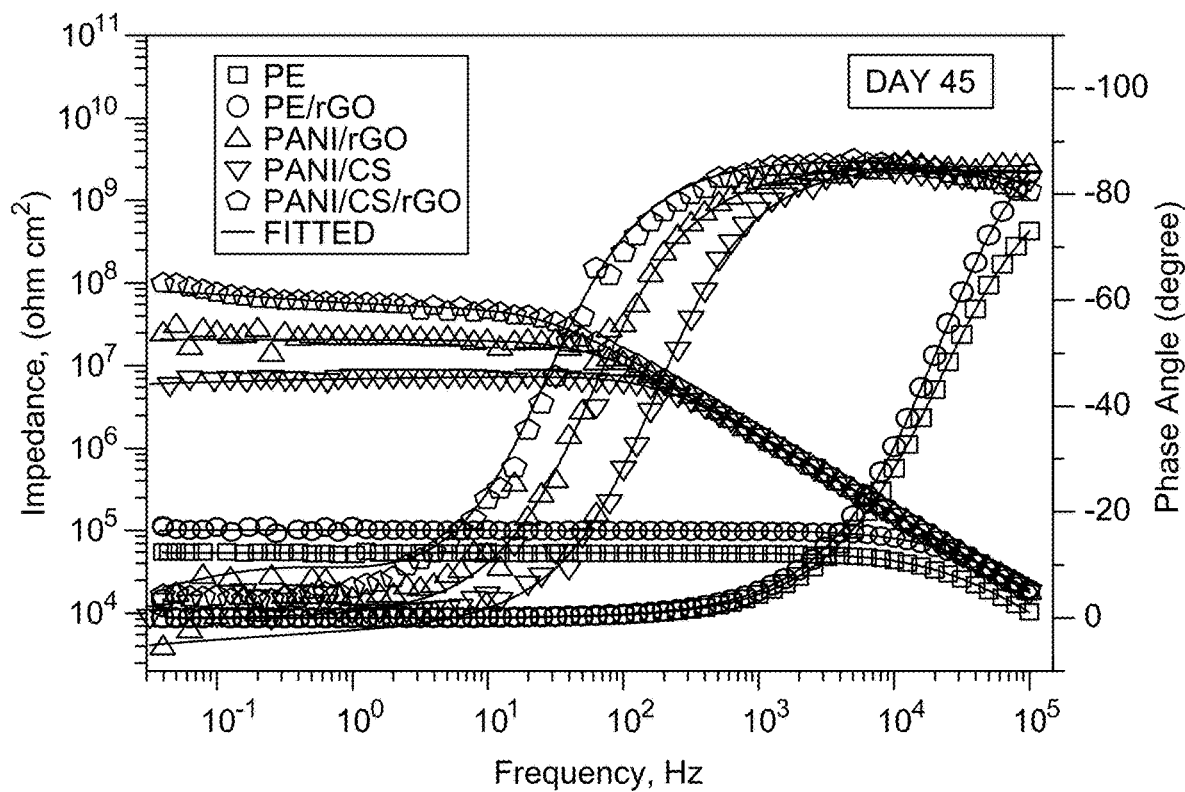

The influence of the reinforcement of the rGO, PANI, PANI/rGO, and PANI/CS/rGO on the electrochemical corrosion and barrier properties of the epoxy coating was assessed in the NaCl solution at various immersion periods by the EIS measurements. Bode (impedance modulus and phase angle against frequency) plots of the investigated substrates after 1-hour immersion in the NaCl solution are shown in FIGS. 10A-10B, respectively. FIGS. 10A-10B show impedance values of PE (1002), PE/rGO (1004), PANI/CS (1006), PANI/rGO (1008), PANI/CS/rGO (1010) coatings and phase angle values of PE (1012), PE/rGO (1014), PANI/CS (1016), PANI/rGO (1018), PANI/CS/rGO (1020) coatings, respectively. In general, the Bode impedance modulus (|Z|) at the lowest frequency (0.01 Hz) was utilized to get the semi-quantitative information about the barrier features of the coatings. FIGS. 10A-10B shows an increased value of |Z| at the lowest frequency by reinforcing the synthesized composite materials, which revealed a definite barrier feature to corrosive ions. The coatings with the ternary nanocomposites exhibited the highest impedance value of about $10^{10}$ $\Omega cm^2$, revealing that effective barrier performance was exerted by the highly dispersed PANI/CS wrapped rGO nanosheets. However, with the rGO, the impedance modulus was slightly reduced due to the heterogeneous dispersion of the rGO and destructing the coating compactness.

The |Z| at the lowest frequency for the PE coating was $2.43 \times 10^7$ $\Omega cm^2$ after 24 hours of exposure. However, on prolonging the exposure time, the impedance modulus of the PE coating at 0.01 Hz was found to reduce abruptly (FIGS. 11A-11F). The impedance modulus was found to be only $5.05 \times 10^4$ $\Omega cm^2$ after 45 days, which was about four orders of magnitude before the PE coating, thus validating the loss of barrier properties of the PE coating, which may be attributed to the coating defects. Similarly, a phase angle of the PE coatings was also shifted to higher frequencies, revealing the increased zones of the coated substrate to the electrolytic medium. In the case of the PE/rGO, PANI/rGO, PANI/CS, and PANI/CS/rGO, the total impedance modulus was found to be about $4.59 \times 10^7$, $7.61 \times 10^8$, $3.35 \times 10^8$, and $4.24 \times 10^9$ $\Omega cm^2$, respectively. The |Z| of the PANI/CS/rGO coating was higher than that of the other coatings. After 45 days of exposure, although the impedance modulus of the binary and ternary composite coatings reduced to $6.54 \times 10^6$, $2.68 \times 10^7$, and $1.12 \times 10^8$ $\Omega cm^2$, respectively, the obtained values were still higher compared to that of the PE coating. Particularly FIG. 11A-FIG. 11F show that the |Z| of the PANI/CS/rGO at the lowest frequency was found to be two orders of magnitude higher than other substrates, demonstrating that PANI/CS/rGO nanocomposite coatings provide the best corrosion-resistant performance among the investigated coated MS samples.

The obtained EIS curves were fitted by selecting an appropriate electrical equivalent circuit (EEC), and the extracted EIS parameters were plotted against the immersion period in FIGS. 12A-F. In the selected EEC model (FIG. 13), $R_s$, $R_f$ and $R_{ct}$ represent the electrolytic, coating, and charge transfer resistance, respectively. Furthermore, constant phase elements ($CPE_{dl}$ and $CPE_f$) have been utilized to compensate for the variation of a non-homogeneous surface from a perfect capacitance. The magnitude of CPE is denoted as $Z_{CPE} = [Y_0(j\omega)]^{-1}$, where $Y_0$ and n represent the frequency-independent parameters and $\omega$ signify the angular frequency. The value of n changes from 0 to 1, which is primarily ruled by the surface condition of the investigated metallic substrate. The $CPE_{dl}$ and $CPE_f$ describe a double-layer and coatings capacitance, respectively. Table 2 shows the extracted EIS parameters from the EIS circuit fitting analysis.

TABLE 2

| | | | | | | | | | | |
|---|---|---|---|---|---|---|---|---|---|---|
| EIS parameters from the EIS circuit fitting analysis | | | | | | | | | | |
| | | $R_{ct}$ | $CPE_{dl}$ | | | $R_f$ | $CPE_f$ | | | |
| Sample | Period | $\Omega$ $cm^2$ | $Y_0$ $(\Omega^{-1}$ $cm^{-2}s^n)$ | $n_{d1}$ | $C_{d1}$ $F/cm^2$ | $\Omega$ $cm^2$ | $Y_0$ $(\Omega^{-1}$ $cm^{-2}s^n)$ | $n_f$ | $C_f$ $F/Cm^2$ | $\chi^2 \times 10^{-5}$ |
| PE | | 2.43E+07 | 7.24E-08 | 0.96 | 7.41E-08 | 7.41E+06 | 5.41E-07 | 0.95 | 5.82E-07 | 5.325 |
| PE/rGO | | 4.60E+07 | 2.02E-09 | 0.97 | 1.87E-09 | 9.96E+06 | 3.44E-08 | 0.96 | 3.29E-08 | 5.148 |
| PANI/CS | | 3.35E+08 | 6.99E-12 | 0.97 | 5.79E-12 | 1.15E+07 | 8.19E-11 | 0.96 | 6.13E-11 | 6.254 |
| PANI/rGO | | 7.62E+08 | 4.24E-12 | 0.98 | 3.77E-12 | 3.28E+07 | 3.02E-11 | 0.97 | 2.44E-11 | 7.245 |
| PANI/CS/rGO | Day 1 | 4.25E+09 | 3.65E-10 | 0.98 | 3.68E-10 | 5.99E+07 | 1.14E-09 | 0.97 | 10.5E-09 | 5.128 |
| PE | | 3.67E+06 | 5.68E-08 | 0.91 | 4.86E-08 | 4.32E+06 | 2.32E-07 | 0.93 | 2.32E-07 | 4.982 |
| PE/rGO | | 2.34E+07 | 4.33E-07 | 0.94 | 5.01E-07 | 7.43E+06 | 2.29E-08 | 0.95 | 2.09E-08 | 5.268 |
| PANI/CS | | 1.65E+08 | 5.32E-11 | 0.95 | 4.15E-11 | 9.34E+06 | 1.08E-10 | 0.95 | 7.54E-11 | 3.548 |
| PANI/rGO | | 3.48E+08 | 3.22E-12 | 0.94 | 2.08E-12 | 2.99E+07 | 1.18E-11 | 0.94 | 7.11E-12 | 8.256 |
| PANI/CS/rGO | Day 7 | 1.63E+09 | 8.24E-10 | 0.97 | 8.31E-10 | 5.15E+07 | 2.33E-09 | 0.96 | 2.13E-09 | 7.569 |
| PE | | 3.32E+06 | 6.29E-08 | 0.89 | 5.19E-08 | 1.23E+06 | 8.93E-07 | 0.9 | 9.02E-07 | 4.562 |
| PE/rGO | | 5.51E+06 | 3.87E-09 | 0.91 | 2.65E-09 | 5.43E+06 | 7.27E-08 | 0.92 | 6.71E-08 | 6.542 |
| PANI/CS | | 1.15E+08 | 4.24E-11 | 0.9 | 2.34E-11 | 8.43E+06 | 2.16E-10 | 0.91 | 1.16E-10 | 7.235 |
| PANI/rGO | | 2.77E+08 | 8.65E-12 | 0.9 | 4.42E-12 | 2.11E+07 | 7.72E-11 | 0.91 | 4.09E-11 | 9.235 |
| PANI/CS/rGO | Day 14 | 9.78E+08 | 2.65E-09 | 0.95 | 2.79E-09 | 4.52E+07 | 1.03E-19 | 0.96 | 9.08E-11 | 8.254 |
| PE | | 4.23E+05 | 7.37E-08 | 0.87 | 4.39E-08 | 5.54E+05 | 9.48E-07 | 0.88 | 8.68E-07 | 2.654 |
| PE/rGO | | 3.43E+06 | 4.70E-07 | 0.87 | 5.04E-07 | 2.31E+06 | 1.20E-07 | 0.88 | 1.01E-07 | 4.235 |
| PANI/CS | | 1.06E+08 | 7.24E-09 | 0.89 | 7.00E-09 | 8.18E+06 | 5.53E-10 | 0.87 | 2.47E-10 | 6.128 |
| PANI/rGO | | 1.63E+08 | 2.99E-12 | 0.89 | 1.16E-12 | 2.55E+07 | 3.10E-11 | 0.86 | 9.70E-12 | 7.236 |
| PANI/CS/rGO | Day 21 | 7.96E+08 | 7.32E-10 | 0.92 | 6.99E-10 | 3.46E+07 | 3.73E-09 | 0.91 | 3.04E-09 | 8.256 |
| PE | | 1.16E+05 | 7.33E-07 | 0.83 | 4.42E-07 | 1.43E+05 | 4.41E-06 | 0.82 | 3.98E-06 | 3.546 |
| PE/rGO | | 5.77E+06 | 4.37E-08 | 0.86 | 3.49E-08 | 1.35E+06 | 7.85E-07 | 0.84 | 7.93E-07 | 5.269 |
| PANI/CS | | 2.30E+07 | 5.24E-11 | 0.86 | 1.75E-11 | 7.93E+06 | 9.42E-10 | 0.86 | 4.25E-10 | 8.336 |
| PANI/rGO | | 5.75E+07 | 9.32E-09 | 0.88 | 8.46E-09 | 1.66E+07 | 6.78E-11 | 0.87 | 2.46E-11 | 4.235 |

TABLE 2-continued

EIS parameters from the EIS circuit fitting analysis

| Sample | Period | $R_{ct}$ Ω cm² | $CPE_{d1}$ $Y_0$ (Ω⁻¹ cm⁻²s$^n$) | $n_{d1}$ | $C_{d1}$ F/cm² | $R_f$ Ω cm² | $CPE_f$ $Y_0$ (Ω⁻¹ cm⁻²s$^n$) | $n_f$ | $C_f$ F/Cm² | $\chi^2 \times 10^{-5}$ |
|---|---|---|---|---|---|---|---|---|---|---|
| PANI/CS/rGO | Day 30 | 2.32E+08 | 3.76E-07 | 0.91 | 5.84E-07 | 3.05E+07 | 1.47E-08 | 0.9 | 1.35E-08 | 8.236 |
| PE | | 5.51E+04 | 4.66E-09 | 0.8 | 5.76E-10 | 4.58E+04 | 6.60E-06 | 0.88 | 5.61E-06 | 7.658 |
| PE/rGO | | 1.15E+05 | 7.34E-08 | 0.83 | 2.76E-08 | 9.71E+04 | 3.17E-07 | 0.88 | 1.97E-07 | 5.487 |
| PANI/CS | | 6.54E+06 | 5.95E-11 | 0.85 | 1.49E-11 | 3.52E+06 | 6.46E-10 | 0.86 | 2.40E-10 | 6.584 |
| PANI/rGO | | 2.69E+07 | 3.94E-11 | 0.87 | 1.42E-11 | 1.02E+07 | 2.92E-11 | 0.88 | 9.67E-12 | 4.236 |
| PANI/CS/rGO | Day 45 | 1.12E+08 | 2.66E-11 | 0.89 | 1.28E-11 | 3.16E+07 | 7.20E-09 | 0.88 | 5.88E-09 | 6.125 |

Low chi-square values obtained from Table 2 indicated the adequate accuracy of the EIS fitting practice.

Figure 12A:
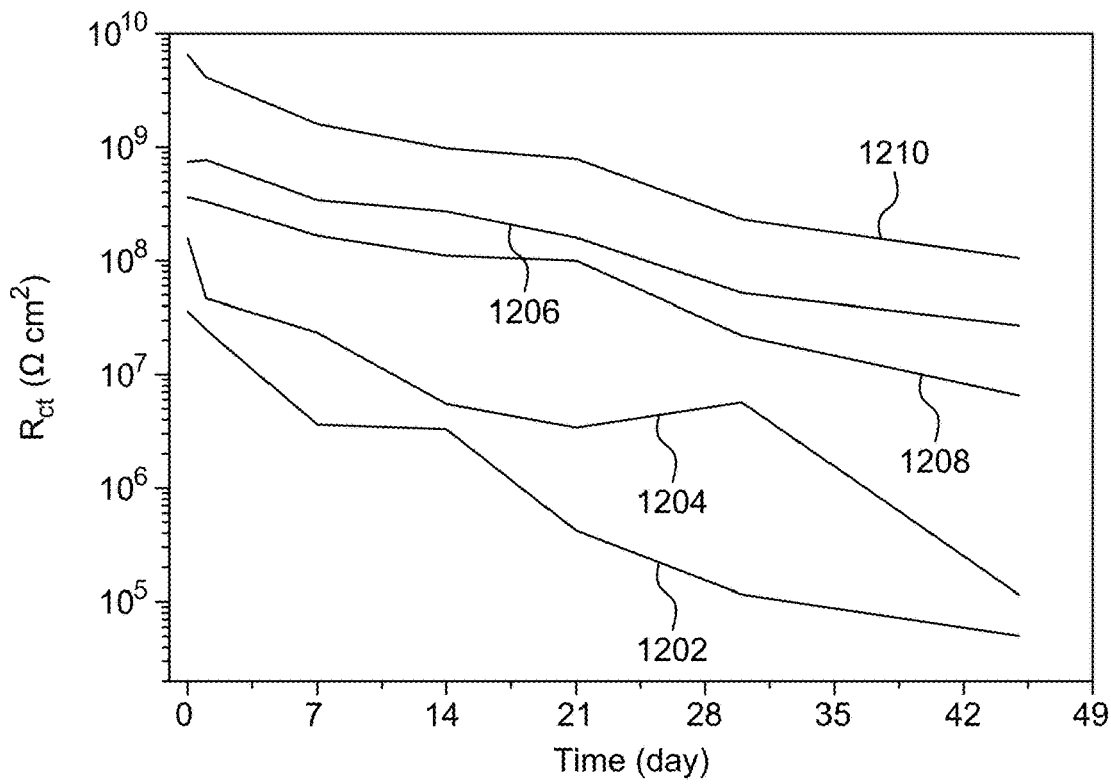
FIG. 12A is a plot depicting charge transfer resistance (Rct) of the various nanocomposites on the MS substrates during the 45 days of immersion in NaCl solution, according to certain embodiments.
Figure 13:
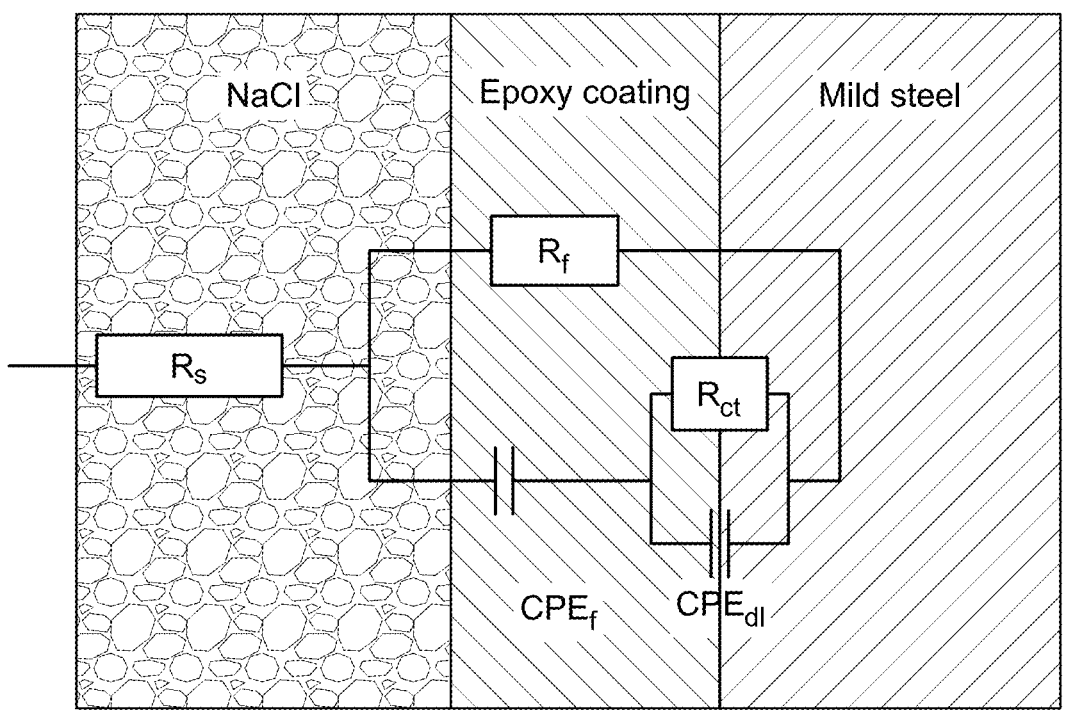
FIG. 13 is an exemplary image of an electrical equivalent circuit (EEC), according to certain embodiments.

FIG. 12A shows $R_{ct}$ values (1$R_{ct}$, where 1 is standard deviation varied between 3.35 and 4.75%) of PE (1202), PE/rGO (1204), PANI/rGO (1206), PANI/CS (1208) and PANI/CS/rGO (1210) coatings. FIG. 12A shows that the surfaces with PE coatings display a significant reduction in the values of the $R_{ct}$ during the exposure period. However, the decreasing rate in the $R_{ct}$ values for the binary and ternary coatings showed insignificant changes with the exposure time. The PE coating exhibited a rapid reduction in the $R_{ct}$ values from $2.43 \times 10^7$ Ωcm² to $3.67 \times 10^6$ Ωcm² after 7th-day exposure. After that, the $R_{ct}$ values fluctuated and stabilized at the lowest value of $5.05 \times 10^4$ Ωcm² at the end of the exposure period. By contrast, after 7th-day exposure, the $R_{ct}$ of the PANI/rGO coating diminished from $7.61 \times 10^8$ Ωcm² to $3.48 \times 10^8$ Ωcm². After the 30$^{th}$ day of exposure, the values of the $R_{ct}$ kept almost constant, around $5.75 \times 10^7$ Ωcm². The $R_{ct}$ of the PANI/CS/rGO coating marginally reduced up to the 14th day and then continued almost constant at about $1.12 \times 10^8$ Ωcm² in the whole immersion period. The PANI/CS and rGO nanosheets can fill the micro defected areas of the coatings and increase the pathways for the penetration of corrosive ions from the electrolytic medium and thus, limiting the delamination phenomenon of coatings.

Figure 12B:
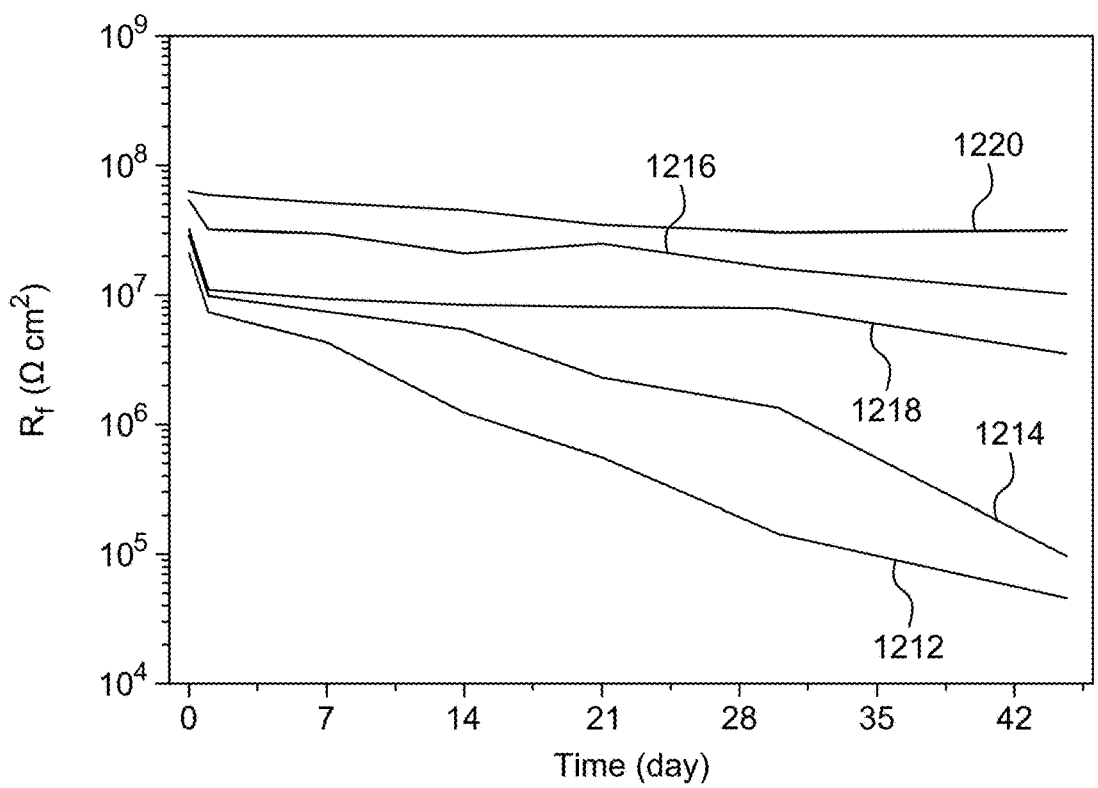
FIG. 12B is a plot depicting coatings resistance (Rf) of the various nanocomposites on the MS substrates during the 45 days of immersion in NaCl solution, according to certain embodiments.

Further, coatings resistance ($R_f$) is an essential parameter in evaluating the corrosion-resistant performance of the coated metallic substrates in corrosive media. FIG. 12B shows $R_f$ values (1 $R_f$, where 1 is the standard deviation varied between 3.35 and 4.75%) of PE (1212), PE/rGO (1214), PANI/rGO (1216), PANI/CS (1218) and PANI/CS/rGO (1220) coatings w.r.t time. FIG. 12B shows that $R_f$ values gradually reduced on increasing the immersion period. After 45-days of exposure, the $R_f$ of the PANI/rGO was slightly higher than the pure epoxy and PE/rGO, whereas the observed $R_f$ of PANI/CS/rGO was about two orders of magnitude higher compared to that of pure epoxy coating. The enhancement in the $R_f$ is accredited to the uniform reinforcement of the ternary nanocomposites into the epoxy coating. As the porosity of coatings is associated with the pore resistance of the coating, the obtained data indicated that the PANI/CS/rGO nanocomposite could seal the pores produced through the curing reaction of the epoxy matrix. The heterogeneous distribution of the rGO nanosheets in the epoxy matrix may lead to a difference in the porosity of the PE/rGO and PANI/rGO coating. Generally, higher $R_{ct}$ and $R_f$ values with lower $CPE_f$ and $CPE_{d1}$ are required for an identical, defect-free coating with efficient surface protective performance against corrosion. Compared with the PE coating, the gradual reduction of the CPE values of epoxy coatings containing the PANI/rGO, PANI/CS, and PANI/CS/rGO further confirmed the alteration of the barrier properties of the binary and ternary nanocomposites on the MS substrates.

Figure 12C:
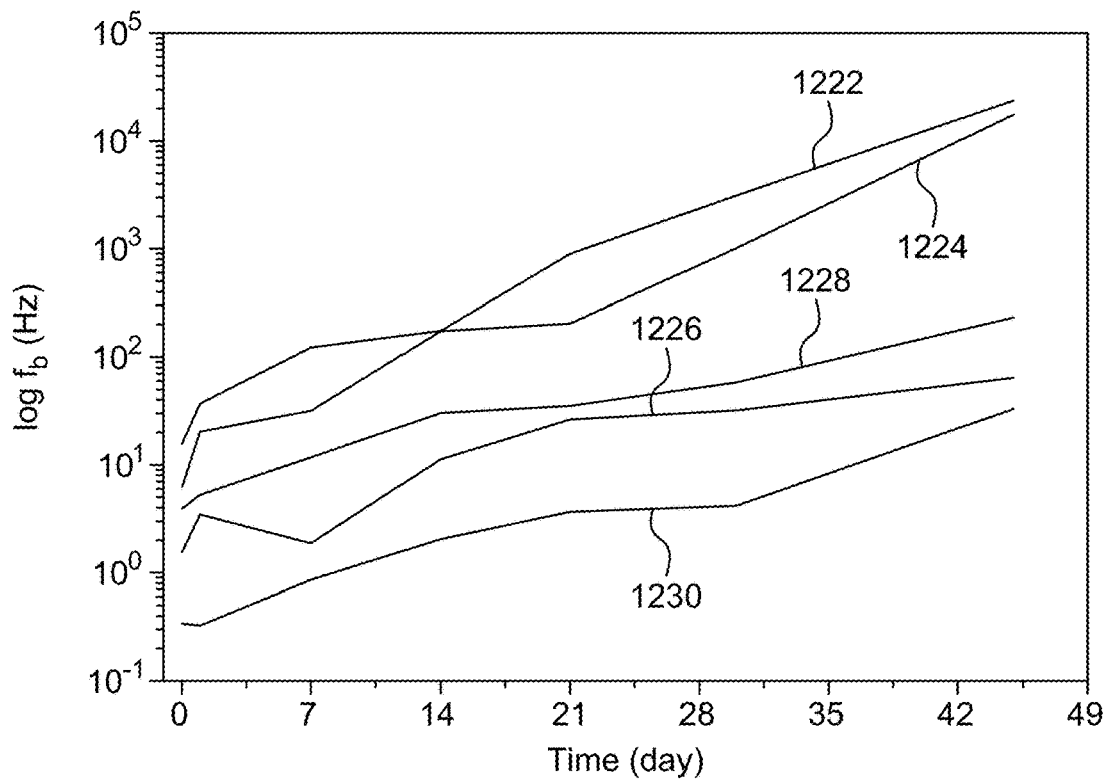
FIG. 12C is a plot depicting a breakpoint frequency (fb) of the various nanocomposites on the MS substrates during the 45 days of immersion in NaCl solution, according to certain embodiments.

Breakpoint frequency ($f_b$) is utilized to assess a delaminated zone on the investigated coatings, and the higher values of $f_b$ represent more delaminated zones. As displayed in FIG. 10B, the breakpoint frequency is located at a point (frequency) 'X' in which the phase angle falls to 45°. In general, coatings exhibited capacitive behavior when the frequency was larger than $f_b$, and coatings displayed electrical resistance behavior when the frequency was not larger than $f_b$. The increasing value of $f_b$ specifies the expansion of delamination sites on the coatings. Thus, less delaminated and more penetration resistance of the coatings was indicated by the smaller $f_b$. The $f_b$ values (2$f_b$, where 2 is the standard deviation varied between 5.24% and 6.70%) for PE (1222), PE/rGO (1224), PANI/rGO (1226), PANI/CS (1228), and PANI/CS/rGO (1230) coatings as a function of the immersion period are provided in FIG. 12C. FIG. 12C shows that the $f_b$ is the highest in the PE coating and displays an increasing deep slope with an exposure period.

The change in $f_b$ is much lower during the immersion periods in the binary and ternary composite coatings than that of the PE coatings. Particularly, the PANI/CS/rGO nanocomposite coating exhibited the lowest change in $f_b$ among the investigated coatings, indicating improved penetration resistance which can be attributed to the physical shielding protective film to obstruct harsh species from electrolytes to the steel surface. The present findings revealed that by incorporating the binary and ternary composites into the PE, the delamination of the PE coating was nearly restricted.

Figure 12D:
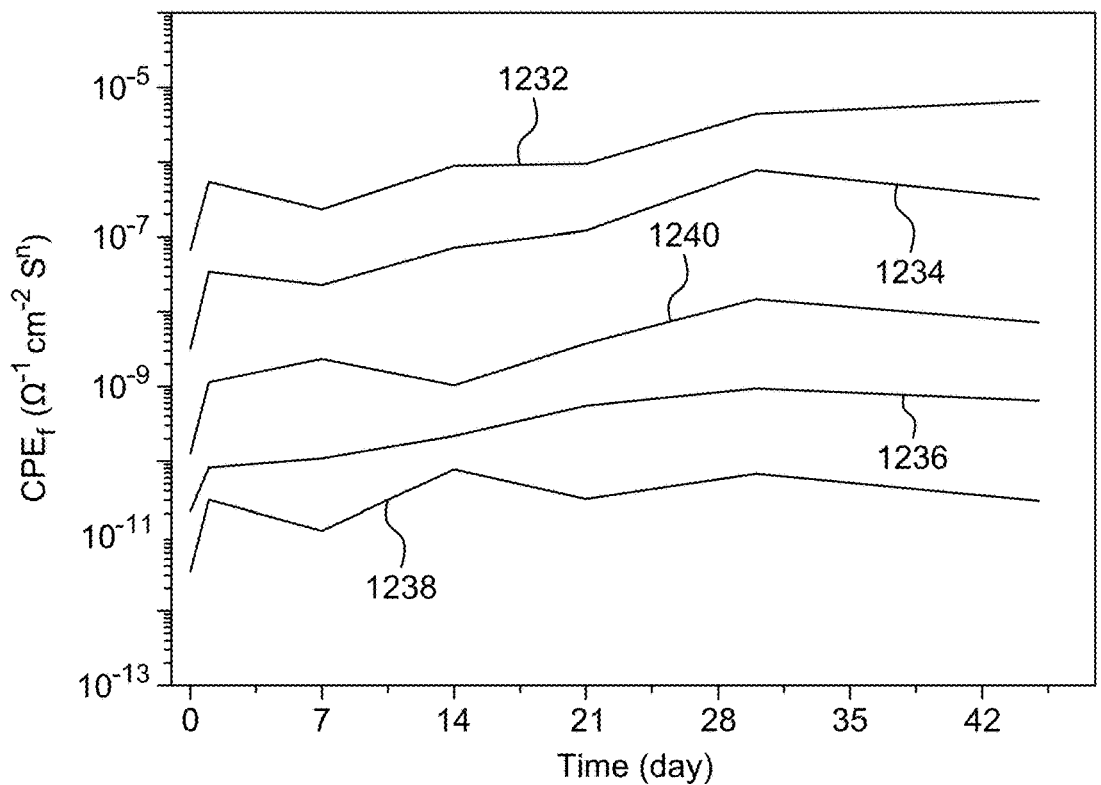
FIG. 12D is a plot depicting a film constant phase element ($CPE_f$) of the various nanocomposites on the MS substrates during the 45 days of immersion in NaCl solution, according to certain embodiments.

CPE of film capacitance of the coatings is often employed to evaluate corrosive ions' permeation into the polymeric films. The obtained $CPE_f$ values (3 $CPE_f$, where 3 is the standard deviation varied between 4.55% and 6.20%) of PE (1232), PE/rGO (1234), PANI/rGO (1236), PANI/CS (1238), and PANI/CS/rGO (1240) coatings during the exposure period are shown in FIG. 12D. The value of $CPE_f$ for the PE coatings increases with immersion time, indicating that water is freely penetrating through the epoxy film. The $CPE_f$ of the PE/rGO and PANI/CS marginally varies throughout the exposure period. The $CPE_f$ of the PANI/rGO increases after 21 days of exposure, indicating that the barrier protective performance of the PANI/rGO coating was lost, which can be attributed to the prolonged exposure. Values of the $CPE_f$ gradually increased in the continuing immersion period. However, they were still lesser than other coatings, indicating that the diffusion of corrosive ions from the testing medium is comparatively hard in the coating. In contrast, the $CPE_f$ of the PANI/CS/rGO was almost unchanged during the whole exposure period, indicating that the PANI/CS/rGO coatings own a stable metal/coating interface without any signs of corrosion.

Figure 12E:
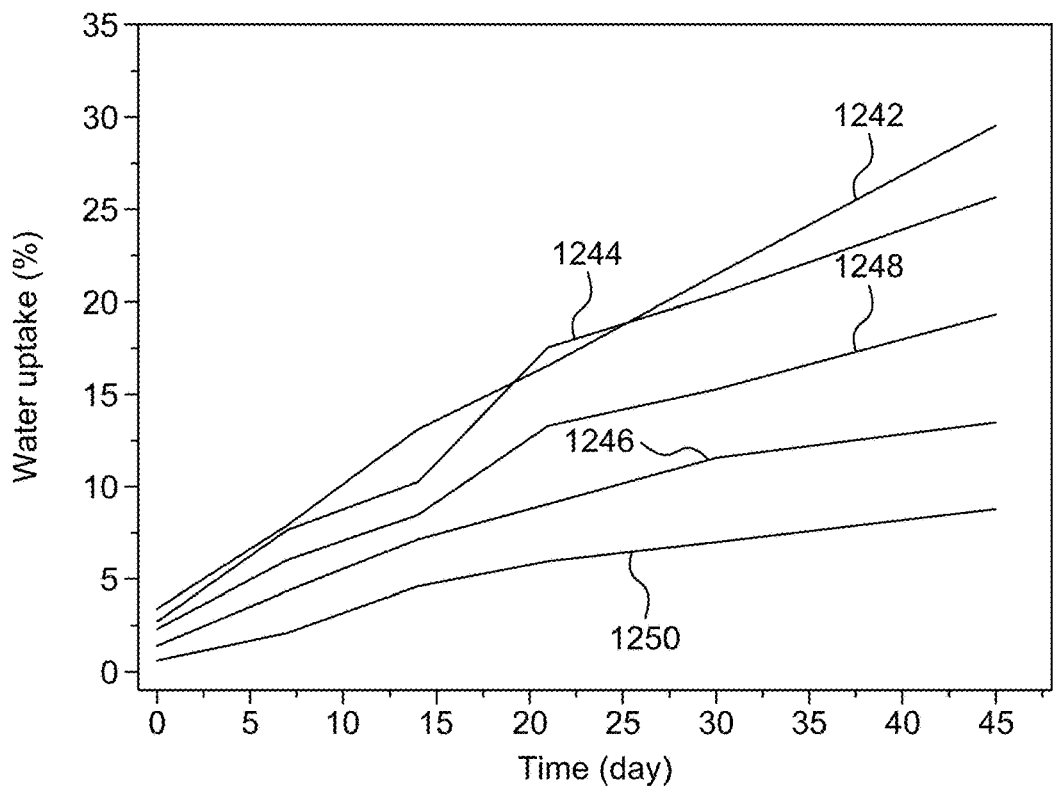
FIG. 12E is a plot depicting water absorption of the various nanocomposites on the MS substrates during the 45 days of immersion in NaCl solution, according to certain embodiments.

Further, the quantity of water absorption ($\Phi$) is generally assessed by a relation, $\Phi=(\log(C_t/C_0))/\log(\varepsilon_w)$, where $C_t$ and $C_0$ represent the coating capacitance at time t and t=0 and $\varepsilon_w$ signifies dielectric constant of water (80 at RT). Since the CPE is utilized to replace the double layer and film capacitances in the EIS model, which can be attributed to the non-ideal interface state of the surface, the conversion to capacitance from the CPE parameters (Q) and the exponent (a) is required to substitute in the relations as mentioned above, to calculate the quantity of water absorption. FIG. 12E represents the water absorption (3 water absorption, where 3 is the standard deviation varied between 4.55% and 6.20%) of PE (1242), PE/rGO (1244), PANI/rGO (1246), PANI/CS (1248), and PANI/CS/rGO (1250) coatings estimated using the EIS results. Pure epoxy coatings displayed the highest water uptake of 29.55% after 45th-day exposure, whereas, for the epoxy coatings with the rGO and PANI/rGO, the water uptake was 25.67% and 13.48%, respectively. Furthermore, the PANI/CS/rGO coatings displayed the lowest water uptake of 8.79% after 45 days of immersion. FIG. 12E shows that the reinforcement of the ternary composites hinders the penetration of corrosive ions through the epoxy matrix, further enhancing the barrier characteristics of the epoxy coating and, consequently, reducing a corrosion process at the metal/coating interface.

Figure 12F:
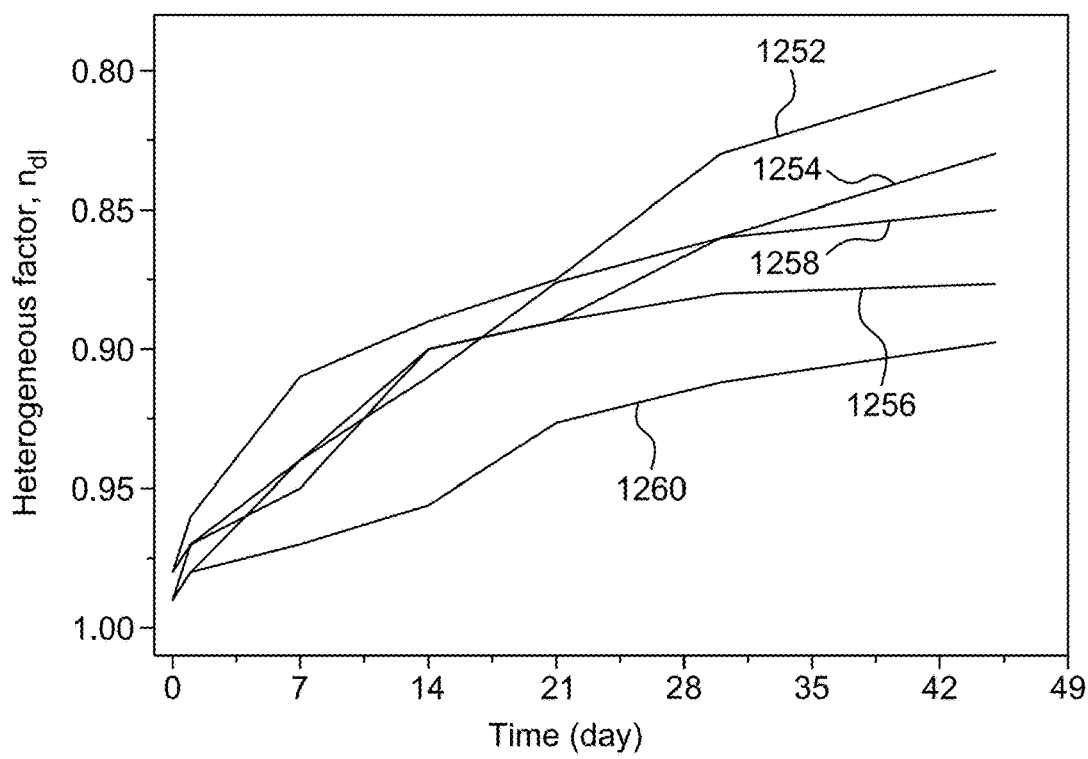
FIG. 12F is a plot depicting $n_{dl}$ of the various nanocomposites on the MS substrates during the 45 days of immersion in NaCl solution, according to certain embodiments.

FIG. 12F refers to n values ($4n_{dl}$, where 4 is the standard deviation varied between 2.43% and 3.72%) of PE (1252), PE/rGO (1254), PANI/rGO (1256), PANI/CS (1258) and PANI/CS/rGO (1260) coatings w.r.t time. In comparison with the n values of $CPE_{dl}$ during the whole immersion period (FIG. 12F), the n values acquired for the pure epoxy coatings were remarkably reduced during exposure, indicating the heterogeneous interfacial surface which can be attributed to the accumulation of corrosion products at the interface between the coatings and MS substrate. Conversely, the present values marginally decreased with an increasing exposure period for epoxy coatings to reinforce the binary and ternary composites. In particular, the epoxy coatings reinforced with the PANI/CS/rGO showed the highest n values during the entire exposure period compared to the other samples, revealing effective barrier features attributed to the presence of compact and defect-free layers.

The present disclosure provides the coating with enhanced adhesion strength and anticorrosive behavior. The homogeneous distribution and efficient compatibility of the PANI/CS/rGO in the epoxy matrix improves an effective physical barrier that causes the substantial enhancement in corrosion protective behavior of the epoxy coatings. The PANI/CS/rGO seals the micro defects and free volumes of the epoxy film, reducing the penetrability of the epoxy by zigzagging a dispersion path and making the dispersion pathway of the electrolyte more discursive. The PANI also participates in redox reactions at the MS/epoxy interface and provides a passive state to the MS substrates. The PANI chain transforms doped (oxidized form) and de-doped states (reduced form) by consuming released electrons from anodic reactions, which spontaneously decreases the rate of cathodic reaction. Furthermore, incorporating the CS molecules and rGO into the PANI provides an impenetrable and denser surface with an increased surface area, which increases the tendency of the ternary composite to interact with the released ions from the corrosion process. The addition of bio-polymers such as the CS and metal oxide nanoparticles alters the conducting polymers' doping-de-doping chemistry, such as the PANI. Hence, the presence of the CS makes the PANI chain more active in electrochemical reactions. The reinforcement of the PANI/CS/rGO enhanced the adhesion strength and corrosion protection performance of the epoxy coatings on the MS substrates.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A saltwater corrosion resistant composite coating, comprising:
   chitosan;
   reduced graphene oxide (rGO) having a nanosheet morphology in which a plurality of wrinkled nanosheets are turbostratically stacked on top of each other;
   a conductive polymer uniformly deposited on a surface of the nanosheet of the rGO; and
   a cured epoxy,
   wherein the rGO and the chitosan are dispersed in particles of the conductive polymer to form a 3D network, the 3D network comprising 85-95 wt. % of the conductive polymer, 0.5-5 wt. % of the rGO, and 1-10 wt. % of the chitosan, based on a total weight of the conductive polymer, the rGO, and the chitosan,
   at least a portion of the chitosan is covalently bound to the rGO,
   at least a portion of the conductive polymer is covalently bound to the chitosan,
   the 3D network is dispersed in the cured epoxy, and
   the saltwater corrosion resistant composite coating comprises 1-10 wt. % of the conductive polymer, the rGO, and the chitosan in total, and 90-99 wt. % of the cured epoxy, based on a total weight of the conductive polymer, the rGO, the chitosan, and the cured epoxy.

2. The saltwater corrosion resistant composite coating of claim 1, wherein the 3D network comprises:
   89-91 wt. % of the conductive polymer;
   2-3 wt. % of the rGO; and
   4-6 wt. % of the chitosan, based on the total weight of the conductive polymer, the rGO, and the chitosan.

3. The saltwater corrosion resistant composite coating of claim 1, comprising:
   4-6 wt. % of the conductive polymer, the rGO, and the chitosan in total; and
   94-96 wt. % of the cured epoxy, based on the total weight of the conductive polymer, the rGO, the chitosan, and the cured epoxy.

4. The saltwater corrosion resistant composite coating of claim 1, wherein the conductive polymer is at least one selected from a group consisting of a polyaniline (PANI), a polypyrrole (PPy), a polythiophene (PTh), a polyphenylene sulfide (PPS), a polyacetylene (PA), a polyphenylene vinylene (PPV), a poly(3,4-ethylenedioxythiophene) (PEDOT), a polycarbazole (PCz), a polyindole (PIn), a polyazepine, a polypyrene (PP), a polyazulene (PAz), and a polynaphthalene.

5. The saltwater corrosion resistant composite coating of claim 1, wherein the conductive polymer is polyaniline.

6. The saltwater corrosion resistant composite coating of claim 1,
   wherein the nanosheet has a thickness of 1-20 nanometers (nm).

7. The saltwater corrosion resistant composite coating of claim 1, wherein the cured epoxy comprises 80-95 wt. % of at least one epoxy resin and 5-20 wt. % of at least one hardener, based on a total weight of the epoxy resin and the hardener.

8. The saltwater corrosion resistant composite coating of claim 7, wherein the epoxy resin is at least one selected from a group consisting of a bisphenol A based epoxy resin and a bisphenol F based epoxy resin.

9. The saltwater corrosion resistant composite coating of claim 7, wherein the hardener is at least one selected from a group consisting of phenols, aromatic amines, aliphatic amines, and thiols.

10. The saltwater corrosion resistant composite coating of claim 1, further comprising:
    at least 50 parts per million (ppm) of sulfur and/or chloride.

11. A saltwater corrosion resistant surface, comprising:
    a substrate; and
    a layer of the saltwater corrosion resistant composite coating of claim 1 at least partially coated on a surface of the substrate.

12. The saltwater corrosion resistant surface of claim 11, wherein the layer has a thickness of 10 to 500 micrometers (μm).

13. The saltwater corrosion resistant surface of claim 11, wherein the surface of the substrate is made from at least one material selected from a group consisting of iron, steel, copper, aluminum, nickel, zinc, cobalt, lead, chromium, tantalum, titanium, zirconium, silver, and niobium.

14. The saltwater corrosion resistant surface of claim 11, wherein the saltwater corrosion resistant surface is more hydrophobic than the surface of the substrate not coated with the saltwater corrosion resistant composite coating.

15. The saltwater corrosion resistant surface of claim 11, wherein an adhesion strength between the substrate and the layer of the saltwater corrosion resistant composite coating is 5-7 megapascals (MPa).

16. The saltwater corrosion resistant surface of claim 11, having an open circuit potential value of 0.2-0.4 volts (V) as measured by using saturated calomel as a reference electrode and graphite plates as auxiliary electrodes.

17. The saltwater corrosion resistant surface of claim 11, having an impedance modulus (|Z|) of $1\times10^{8-10}$ ohm square centimeter ($\Omega cm^2$) as measured by using an alternating current amplitude of 10 mV.

18. The saltwater corrosion resistant surface of claim 17, wherein
    the impedance modulus (|Z|) of the saltwater corrosion resistant surface is maintained after 45 days in a solution of 1-10% NaCl dissolved in water at room temperature.

19. A method of making the saltwater corrosion resistant composite coating of claim 1, comprising:
    mixing chitosan and rGO in an acid to form a dispersion;
    adding a conductive polymer monomer to the dispersion to form a mixture;
    adding an oxidizing agent into the mixture and stirring for at least 2 hours at a temperature of 15-25 degrees Celsius (° C.) to form a reaction mixture;
    filtering and washing the reaction mixture with a polar protic solvent to form a wet powder;
    drying the wet powder at a temperature 50-80° C. for at least 10 hours to form a dry powder;
    sonicating the dry powder in an aprotic solvent for at least 5 minutes to form a suspension;
    mixing the suspension with a hardener and sonicating for at least 5 minutes to form a uniform suspension;
    evaporating the aprotic solvent from the uniform suspension to leave a paste;
    mixing the paste with an epoxy resin and degassing at a temperature greater than 25° C. for at least 10 minutes to form the saltwater corrosion resistant composite.

20. The saltwater corrosion resistant composite coating of claim 1,
    wherein the chitosan and the conductive polymer form a globular or nanofibrillar particle,
    the globular or nanofibrillar particle is greater than 2 μm in size, intercalates between the wrinkled nanosheets of the rGO, and enfolds at least 90% of the rGO, and
    the conductive polymer is a polyaniline having an emeraldine form.

* * * * *